US008826282B2

(12) United States Patent
Motoyama et al.

(10) Patent No.: US 8,826,282 B2
(45) Date of Patent: Sep. 2, 2014

(54) PROJECT TASK MANAGEMENT SYSTEM FOR MANAGING PROJECT SCHEDULES OVER A NETWORK

(75) Inventors: Tetsuro Motoyama, Cupertino, CA (US); Avery Fong, Castro Valley, CA (US)

(73) Assignee: Ricoh Company, Ltd., Tokyo (JP)

(*) Notice: Subject to any disclaimer, the term of this patent is extended or adjusted under 35 U.S.C. 154(b) by 1140 days.

(21) Appl. No.: 11/724,963

(22) Filed: Mar. 15, 2007

(65) Prior Publication Data
US 2008/0229313 A1    Sep. 18, 2008

(51) Int. Cl.
G06F 9/46 (2006.01)
G06F 9/54 (2006.01)
G06Q 10/06 (2012.01)

(52) U.S. Cl.
CPC . *G06F 9/54* (2013.01); *G06Q 10/06* (2013.01)
USPC ......................................................... 718/100

(58) Field of Classification Search
CPC combination set(s) only.
See application file for complete search history.

(56) References Cited

U.S. PATENT DOCUMENTS

| 5,197,001 | A | 3/1993 | Mukherjee |
| 5,682,473 | A | 10/1997 | Carson et al. |
| 5,699,310 | A | 12/1997 | Garloff et al. |
| 5,706,502 | A | 1/1998 | Foley et al. |
| 5,826,252 | A | 10/1998 | Wolters et al. |
| 5,909,689 | A | 6/1999 | Van Ryzin |
| 6,049,776 | A | 4/2000 | Donnelly et al. |
| 6,101,481 | A | 8/2000 | Miller |
| 6,222,530 | B1 | 4/2001 | Sequeira |
| 6,308,164 | B1 | 10/2001 | Nummelin et al. |
| 6,334,097 | B1 | 12/2001 | Yoshitake et al. |
| 6,415,259 | B1 | 7/2002 | Wolfinger |
| 6,487,469 | B1 | 11/2002 | Formenti |
| 6,901,579 | B1 | 5/2005 | Suguta |
| 6,954,737 | B2 | 10/2005 | Kalantar et al. |

(Continued)

FOREIGN PATENT DOCUMENTS

| JP | 7282129 A | 10/1995 |
| JP | 8153137 A | 6/1996 |

(Continued)

OTHER PUBLICATIONS

Claims, Foreign application No. 07109677.0-1238, 3 pages, 2008.

(Continued)

*Primary Examiner* — Meng An
*Assistant Examiner* — Eric C Wai
(74) *Attorney, Agent, or Firm* — Hickman Palermo Truong Becker Bingham Wong LLP; Edward A. Becker

(57) ABSTRACT

A client-server based project schedule management system comprises multiple editors accessible through a web browser to perform various scheduling tasks by members of a project. Client-executable code is generated by the server for the client, which is passed to the client along with schedule-related information for populating the respective editors. The client executes the server-generated code to display the respective editor with pertinent information populated therein, and to manage and maintain any new or updated information in response to user interactions with the editor. Rows of tasks are represented by corresponding objects, where editor elements are object attributes which are directly accessible by the respective objects. Database queries are generated by the server based on constant strings containing placeholders which are replaced with information used by the query.

24 Claims, 39 Drawing Sheets

(56) References Cited

U.S. PATENT DOCUMENTS

| | | | |
|---|---|---|---|
| 6,957,189 B2 | 10/2005 | Poage et al. | |
| 7,051,036 B2 | 5/2006 | Rosnow et al. | |
| 7,073,175 B2 | 7/2006 | Rehg et al. | |
| 7,107,268 B1 | 9/2006 | Zawadzki et al. | |
| 7,167,893 B1 | 1/2007 | Malone et al. | |
| 7,210,119 B2 | 4/2007 | Pothos et al. | |
| 7,219,107 B2* | 5/2007 | Beringer | 1/1 |
| 7,251,693 B2 | 7/2007 | Stull et al. | |
| 7,269,798 B2 | 9/2007 | Nonaka et al. | |
| 7,283,975 B2 | 10/2007 | Broughton | |
| 7,406,432 B1 | 7/2008 | Motoyama | |
| 7,496,886 B2* | 2/2009 | Puttaswamy et al. | 717/101 |
| 7,546,228 B2 | 6/2009 | Cullick et al. | |
| 7,668,800 B2 | 2/2010 | Motoyama et al. | |
| 7,721,290 B2 | 5/2010 | Horikawa | |
| 7,836,040 B2 | 11/2010 | Lee | |
| 2002/0004734 A1 | 1/2002 | Nishizawa | |
| 2002/0077879 A1 | 6/2002 | Uchida et al. | |
| 2002/0078007 A1 | 6/2002 | Herrero | |
| 2002/0082889 A1 | 6/2002 | Oliver | |
| 2002/0143601 A1 | 10/2002 | Sinex | |
| 2002/0169739 A1 | 11/2002 | Carr et al. | |
| 2002/0178019 A1 | 11/2002 | Anderson et al. | |
| 2002/0194048 A1 | 12/2002 | Levinson | |
| 2003/0014409 A1 | 1/2003 | Shukoor | |
| 2003/0046134 A1 | 3/2003 | Frolick et al. | |
| 2003/0046345 A1 | 3/2003 | Wada et al. | |
| 2003/0135481 A1 | 7/2003 | Helmes et al. | |
| 2003/0191681 A1 | 10/2003 | Gallion et al. | |
| 2003/0225611 A1 | 12/2003 | Wilson et al. | |
| 2004/0017400 A1 | 1/2004 | Ly et al. | |
| 2004/0039723 A1* | 2/2004 | Lee et al. | 707/1 |
| 2004/0078257 A1 | 4/2004 | Schweitzer et al. | |
| 2004/0111705 A1 | 6/2004 | Motoyama et al. | |
| 2004/0117046 A1 | 6/2004 | Colle et al. | |
| 2004/0143472 A1 | 7/2004 | Estrada et al. | |
| 2004/0162750 A1 | 8/2004 | Motoyama | |
| 2004/0260782 A1 | 12/2004 | Affleck et al. | |
| 2004/0267595 A1 | 12/2004 | Woodings et al. | |
| 2005/0022198 A1 | 1/2005 | Olapurath et al. | |
| 2005/0027386 A1 | 2/2005 | Weigand et al. | |
| 2005/0028158 A1 | 2/2005 | Ferguson et al. | |
| 2005/0033669 A1 | 2/2005 | Stremler et al. | |
| 2005/0080714 A1 | 4/2005 | McHale et al. | |
| 2005/0137920 A1 | 6/2005 | O'connor et al. | |
| 2005/0138031 A1 | 6/2005 | Wefers | |
| 2005/0160084 A1 | 7/2005 | Barrett | |
| 2005/0216328 A1 | 9/2005 | Clark | |
| 2006/0053043 A1 | 3/2006 | Clarke | |
| 2006/0053125 A1 | 3/2006 | Scott | |
| 2006/0070019 A1 | 3/2006 | Vishnumurty et al. | |
| 2006/0074844 A1 | 4/2006 | Frankel et al. | |
| 2006/0090071 A1 | 4/2006 | Sinzig et al. | |
| 2006/0111953 A1 | 5/2006 | Setya | |
| 2006/0136461 A1 | 6/2006 | Lee et al. | |
| 2006/0173879 A1 | 8/2006 | MacFarlane et al. | |
| 2006/0212327 A1 | 9/2006 | Norman | |
| 2006/0223509 A1 | 10/2006 | Fukazawa et al. | |
| 2006/0248166 A1* | 11/2006 | Milosevic et al. | 709/219 |
| 2006/0265690 A1 | 11/2006 | Motoyama et al. | |
| 2007/0067196 A1 | 3/2007 | Usui | |
| 2007/0073695 A1 | 3/2007 | Conlan et al. | |
| 2007/0143827 A1 | 6/2007 | Nicodemus et al. | |
| 2007/0146791 A1* | 6/2007 | Murase | 358/1.16 |
| 2007/0150327 A1 | 6/2007 | Dromgold | |
| 2007/0192156 A1 | 8/2007 | Gauger | |
| 2007/0203660 A1 | 8/2007 | North et al. | |
| 2007/0214450 A1 | 9/2007 | Motoyama et al. | |
| 2007/0282658 A1 | 12/2007 | Brintle | |
| 2007/0288283 A1 | 12/2007 | Fitzpatrick | |
| 2007/0288288 A1 | 12/2007 | Motoyama et al. | |
| 2007/0288289 A1 | 12/2007 | Motoyama et al. | |
| 2007/0288290 A1 | 12/2007 | Motoyama et al. | |
| 2007/0288334 A1 | 12/2007 | Creedle et al. | |
| 2007/0294617 A1 | 12/2007 | Kroeger | |
| 2008/0027779 A1 | 1/2008 | Kirwan | |
| 2008/0103871 A1 | 5/2008 | Ruehl et al. | |
| 2008/0201713 A1 | 8/2008 | Chaffee et al. | |
| 2008/0209416 A1 | 8/2008 | De Souza et al. | |
| 2008/0221952 A1 | 9/2008 | Mohri | |
| 2008/0255907 A1 | 10/2008 | Motoyama et al. | |
| 2008/0313024 A1 | 12/2008 | Kunichika et al. | |
| 2009/0217240 A1 | 8/2009 | Motoyama et al. | |
| 2009/0217241 A1 | 8/2009 | Motoyama et al. | |
| 2009/0222299 A1 | 9/2009 | Clemenson et al. | |
| 2009/0263769 A1 | 10/2009 | Sweeney | |
| 2009/0276260 A1 | 11/2009 | Douglas et al. | |
| 2009/0287521 A1 | 11/2009 | Motoyama et al. | |
| 2009/0287522 A1 | 11/2009 | Motoyama et al. | |
| 2009/0287718 A1 | 11/2009 | Motoyama et al. | |
| 2009/0287730 A1 | 11/2009 | Motoyama et al. | |
| 2009/0287731 A1 | 11/2009 | Motoyama et al. | |
| 2010/0010856 A1 | 1/2010 | Chua et al. | |
| 2010/0070321 A1 | 3/2010 | Motoyama | |
| 2010/0070328 A1 | 3/2010 | Motoyama | |

FOREIGN PATENT DOCUMENTS

| | | |
|---|---|---|
| JP | 2001-202405 A | 7/2001 |
| JP | 2002024495 A | 1/2002 |
| JP | 200207854 A | 7/2002 |
| JP | 2003058685 A | 2/2003 |
| JP | 2005284385 A | 10/2005 |
| JP | 2006244342 A | 9/2006 |
| WO | WO 98/49640 A1 | 11/1998 |

OTHER PUBLICATIONS

European Patent Office, "European Search Report", Foreign application No. 07109677.0-1238, received Oct. 29, 2007, 8 pages.

Angermeier, George, "Cooperative Project Management with RPLAN", XP-002345614, Copyright Projekt Magazin, Oct. 2002 edition, 6 pages.

Maurer, Frank et al., "Merging Project Planning and Web-Enabled Dynamic Workflow Technologies", XP-002345613, IEEE Internet Computing, Jun. 2000, 10 pages.

Buchbinder et al., "Oracle Project Management, Release 11i", XP-002345049, Oracle, User guide, part No. B10895-02, May 2004, 354 pages.

Janne, "Developing WWW-Based Project Management Tools for a Large Scale Project", dated Dec. 1997, Tampa University of Technology Department of Information Technology, 80 pages.

Christenberry, J. Reid, et al., "Project and Employee Time Tracking—For Information Systems and Technology", dated Nov. 14, 1996, Georgia University, 17 pages.

Mitchell, Karen, "Managers get a needed boost with project linking", dated Dec. 15, 1987, PC Week, v4, n50, Copyright The Gale Group, Dialog Accession No. 03021023, 4 pages.

Steinbrecher "Project management software allows managers to plan, schedule, and control any project", Feb. 1987, Today's Office v21n9, Dialog file 15, Accession 00351477, pp. 8-14.

Giridhar "The computerized project planning system", Dec. 1998, Transactions of AACE International, Dialog file 275, Accession No. 01103603, pp. PS13-PS16.

Edwards "Project Management With the PC", Oct. 1984, PC Magazine, v3, n21, pp. 109-117, Dialog file 275, Accession No. 01103603.

Goldmann, S., "Procura: a project management model of concurrent planning and design", 5$^{th}$ International Workshops on Enabling Technologies: Infrastructure for Collaborative Enterprises, 1996, printed May 13, 2007, 2 pages.

Janne, "Developing WWW-Based Project Management Tools for a Large Scale Project", Tampere University of Technology, Department of Information Technology, Master of Science Thesis, Jan. 1998, 80 pages.

Petrie, Charles et al., "Agent-Based Project Management", Center for Design Research, Stanford University, Sep. 1999, 25 pages.

Uyttewaal, et al., "Dynamic scheduling with Microsoft Office Project 2003: The book by and for professionals", 2005, J. Ross publishing and International Institute for Learning, 4 pages.

(56) References Cited

OTHER PUBLICATIONS

Business Editors & High-Tech Writers, "SGP International Introduces E2doPro Enterprises Collaboration System Facilitates Project Management", Business Wire, Oct. 2002, 3 pages.

Leslie, "Cost Forecasting—Beyond the Crystal Ball", Transactions of AACE International, Dialog file 15, Accession No. 01615178, Dec. 1996, 13 pages.

U.S. Appl. No. 11/724,723, filed Mar. 15, 2007, Notice of Publication, Sep. 18, 2008.

U.S. Appl. No. 11/724,757, filed Sep. 15, 2004, Notice of Publication, Oct. 16, 2008.

U.S. Appl. No. 11/449,133, filed Jun. 7, 2006, Notice of Publication, Dec. 13, 2007.

U.S. Appl. No. 11/800,844, filed May 7, 2007, Notice of Publication, Sep. 13, 2007.

U.S. Appl. No. 11/449,116, filed Jun. 7, 2006, Notice of Publication, Dec. 13, 2007.

U.S. Appl. No. 11/449,130, filed Jun. 7, 2006, Notice of Publication, Dec. 13, 2007.

U.S. Appl. No. 11/449,116, filed Jun. 7, 2006, Office Action, Jul. 25, 2011.

U.S. Appl. No. 12/211,286, filed Sep. 16, 2008, Office Action, Jul. 26, 2011.

U.S. Appl. No. 12/122,514, filed May 16, 2008, Office Action, Aug. 15, 2011.

U.S. Appl. No. 12/122,392, filed May 16, 2008, Office Action, Jan. 3, 2012.

U.S. Appl. No. 12/122,497, filed May 16, 2008, Office Action, Sep. 11, 2012.

U.S. Appl. No. 12/122,392, filed May 16, 2008, Notice of Allowance, Aug. 1, 2012.

Aries, Yugenkaisya, Microsoft Project 2003 Official Manual, Instruction and Management Services, 1$^{st}$ Edition, Nikkei BP Soft Press, dated Jun. 21, 2004, 9 pages.

Office Action in Application No. 2007-152150, Applicant Ricoh Company Ltd., dated Nov. 29, 2011, 2 pages.

U.S. Appl. No. 12/211,341, filed Sep. 16, 2008, Office Action, Feb. 26, 2013.

U.S. Appl. No. 12/122,497, filed May 16, 2008, Final Office Action, Feb. 25, 2013.

Chin et al., Elsevier, Automation in Construction, vol. 13, Issue 2, Mar. 2004, 19 pages.

U.S. Appl. No. 12/122,533, filed May 16, 2008, Office Action, Mar. 12, 2012.

U.S. Appl. No. 12/122,392, filed May 16, 2008, Final Office Action, Apr. 19, 2012.

U.S. Appl. No. 12/211,341, filed Sep. 16, 2008, Final Office Action, Sep. 27, 2011.

U.S. Appl. No. 11/724,757, filed Mar. 15, 2007, Final Office Action, Dec. 12, 2011.

U.S. Appl. No. 12/211,286, filed Sep. 16, 2008, Final Office Action, Mar. 2, 2012.

U.S. Appl. No. 12/211,341, filed Sep. 16, 2008, Office Action, Feb. 28, 2012.

U.S. Appl. No. 12/122,533, filed May 16, 2008, Final Office Action, Nov. 21, 2011.

U.S. Appl. No. 12/122,514, filed May 16, 2008, Notice of Allowance, Nov. 20, 2013.

U.S. Appl. No. 12/211,341, filed Sep. 16, 2008, Final Office Action, Sep. 24, 2013.

U.S. Appl. No. 12/122,497, filed May 16, 2008, Examiner's Answers, Aug. 15, 2013.

U.S. Appl. No. 11/449,130, filed Jun. 7, 2006, Notice of Allowance, Mar. 20, 2014.

U.S. Appl. No. 11/449,130, filed Jun. 7, 2006, Office Action, Mar. 4, 2014.

U.S. Appl. No. 11/449,130, filed Jun. 7, 2006, Interview Summary, Mar. 4, 2014.

U.S. Appl. No. 11/724,757, filed Mar. 15, 2007, Final Office Action, Jan. 15, 2014.

\* cited by examiner

Figure 1A

Task Assignment

| Task | Member Assignment |
|---|---|
| Planning | |
| Project Plan | T1 |
| Project Initiation | MGR |
| Requirements | |
| Requirements for System | T2 |
| Requirements Matrix for System | T2 |
| Guideline Documents | |
| Implementation and Unit Test Plan Guideline | T3 |
| Procedure for Source Code Control | T3 |
| Organization and Use of Project Directory | T3 |
| Design Document Guideline | T1 |
| Code Convention | T1 |
| Package Design | |
| Top Level Design | |
| Interface | T1 |
| Architecture | MGR |
| Database | |

Project Schedule

| | Tasks | Identified Date | Planned Start | Planned End | Actual Start | Actual End |
|---|---|---|---|---|---|---|
| | Planning | 2006-04-21 | 2005-09-20 | 2005-10-13 | 2005-09-20 | |
| | | 2005-09-19 | 2005-10-03 | 2005-10-14 | | |
| MGR | Project Initiation | 2005-09-20 | 2005-09-20 | 2005-09-29 | 2005-09-20 | |
| T1 | Project Plan | 2005-09-19 | 2005-10-06 | 2005-10-13 | | |
| | Top Level Design | 2006-04-21 | 2005-10-04 | 2005-11-11 | | |
| | | 2005-09-19 | 2005-10-31 | 2005-11-18 | | |
| MGR | Architecture | 2005-09-20 | 2005-10-04 | 2005-10-12 | | |
| T1 | Interface | 2005-09-19 | 2005-10-31 | 2005-11-11 | | |
| | Guideline Documents | 2006-04-21 | 2005-10-16 | 2005-10-28 | | |
| | | 2005-09-19 | 2005-10-17 | 2005-10-28 | | |
| T1 | Code Convention | 2005-10-27 | 2005-10-16 | 2005-10-23 | | |
| | | 2005-09-19 | 2005-10-17 | 2005-10-23 | | |
| | Design Document Guideline | 2005-09-19 | 2005-10-21 | 2005-10-28 | | |
| | Requirements | 2005-09-19 | 2005-10-17 | 2005-10-25 | | |
| | Class Specification | 2005-09-19 | 2005-11-18 | 2005-12-22 | | |
| | Package Design | 2005-09-19 | 2005-11-21 | 2005-12-09 | | |
| | Implementation and Unit Test Plan | 2006-04-21 | 2005-12-23 | 2006-01-09 | | |

Figure 2B

Task Schedule

Guideline Documents

| Tasks | Identified Date | Planned Start | Planned End | Actual Start | Actual End |
|---|---|---|---|---|---|
| Implementation Guideline | 2005-09-01 | 2005-08-09 | 2005-09-01 | | 2005-09-01 |
| | 2005-08-11 | 2005-08-11 | 2005-01-01 | | |
| | 2005-08-08 | 2005-08-09 | 2005-01-01 | | |
| Draft | 2005-09-20 | 2005-10-07 | 2005-10-10 | 2005-10-10 | 2005-10-07 |
| Design Document Guideline | 2005-09-01 | 2005-09-01 | 2005-09-02 | 2005-09-01 | 2005-09-02 |
| | 2005-08-08 | 2005-08-07 | 2005-01-01 | | |

Iteration 2

| Tasks | Identified Date | Planned Start | Planned End | Actual Start | Actual End |
|---|---|---|---|---|---|
| design | 2006-01-25 | 2006-01-25 | 2006-02-08 | 2006-01-25 | |
| arch | 2006-01-25 | 2006-01-25 | 2006-02-01 | 2006-01-25 | |
| package | 2006-01-25 | 2006-02-01 | 2006-02-08 | | |

Remaining NonProject Tasks

| Tasks | Identified Date | Planned Start | Planned End | Actual Start | Actual End |
|---|---|---|---|---|---|
| Patent RSID 1-333 | 2006-01-25 | 2006-01-26 | 2006-01-30 | | |
| Review | | 2006-01-26 | 2006-01-27 | | |
| Response | 2006-01-25 | 2006-01-27 | 2006-01-30 | | |

Figure 3B

Constant Query Strings Containing Placeholder Strings define("C_SelectHighestRevForMemberTaskQuery", "SELECT nLevel1TaskID, max(nScheduleRevNumber) FROM Level1MemberTask WHERE sProjectNumber='%%ProjectNumber%%' AND sMemberLabel='%%MemberLabel%%' AND nProjectTaskID=%%ProjectTaskID%% GROUP BY nLevel1TaskID");

define("C_SelectAllForMemberTaskQuery", "SELECT * FROM Level%%Level%%MemberTask WHERE sProjectNumber='%%ProjectNumber%%' AND nLevel%%Level%%TaskID=%%LevelTaskID%% ORDER BY nScheduleRevNumber DESC");

Constant For Placeholder Strings define("C_ProjectNumberKey", "%%ProjectNumber%%");
define("C_MemberLabelKey", "%%MemberLabel%%");
define("C_ProjectTaskIDKey", "%%ProjectTaskID%%");
define("C_TaskLevelKey", "%%Level%%");
define("C_LevelTaskID", "%%LevelTaskID%%");

Figure 27

Script to generate query string $loc_sQuery = C_SelectHighestRevForMemberTaskQuery;  (1)

$loc_sQuery = str_replace(C_ProjectNumberKey, "J17", loc_sQuery);  (2)

$loc_sQuery = str_replace(C_MemberLabel, "T1", loc_sQuery);  (3)

$loc_sQuery = str_replace(C_ProjectTaskIDKey, "40", loc_sQuery);  (4)

String resulting from replacements (1) SELECT nLevel1TaskID, max(nScheduleRevNumber) FROM Level1MemberTask WHERE sProjectNumber='%%ProjectNumber%%' AND sMemberLabel='%%MemberLabel%%' AND nProjectTaskID=%%ProjectTaskID%% GROUP BY nLevel1TaskID (2) SELECT nLevel1TaskID, max(nScheduleRevNumber) FROM Level1MemberTask WHERE sProjectNumber='J17' AND sMemberLabel='%%MemberLabel%%' AND nProjectTaskID=%%ProjectTaskID%% GROUP BY nLevel1TaskID (3) SELECT nLevel1TaskID, max(nScheduleRevNumber) FROM Level1MemberTask WHERE sProjectNumber='J17' AND sMemberLabel='T1' AND nProjectTaskID=%%ProjectTaskID%% GROUP BY nLevel1TaskID (4) SELECT nLevel1TaskID, max(nScheduleRevNumber) FROM Level1MemberTask WHERE sProjectNumber='J17' AND sMemberLabel='T1' AND nProjectTaskID=40 GROUP BY nLevel1TaskID

Figure 28

| | TaskAssignEditor.htm, PostTaskAssign.htm | | |
|---|---|---|---|
| Task Assignment Processor | TaskAssignmentPHPProcessor | CTaskAssignmentManager<br>CTaskAssignmentInitialData<br>CTaskAssignmentTaskRowData — 3602<br>CTaskAssignmentJavaScriptInterface<br>CTaskAssignmentEditorDBInterface<br>TaskAssignmentPHPProcessorConstants | ⎫<br>⎬ 3600<br>⎭ |
| | TaskAssignmentJavaScriptProcessor | CTaskAssignmentEditorManager<br>CTaskAssignmentTable<br>CTaskAssignmentRow — 3604<br>CTaskCell<br>CAssignmentCell | |
| | PostTaskAssignmentPHPProcessor | CTaskAssignmentManager — 3606<br>CTaskAssignmentUpdater<br>CPostTaskAssignmentDBInterface<br>CPostTaskAssignmentDBQueryGenerator<br>PostTaskAssignmentPHPConstants | |
| | TaskAssignmentWebPageGenerator | CTaskAssignmentWebPageManager<br>CTaskAssignmentTable — 3608 / 3610<br>CTaskAssignmentWebPageGeneratorDBInterface<br>AssignmentWebPageGeneratorConstants | |
| | ProjScheduleEditor.htm, PostProjSchedule.htm | | |
| Project Schedule Processor | ProjectSchedulePHPProcessor | CProjectScheduleManager<br>CProjectScheduleInitialData — 3612<br>CProjectScheduleTaskRowData<br>CProjectEditorDBInterface<br>CProjectEditorDBQueryGenerator<br>CJavaScriptInterface<br>ProjectSchedulePHPProcessorConstants | |
| | ProjectScheduleJavaScriptProcessor | CProjectEditorManager<br>CProjectTableManager<br>CProjectScheduleRow<br>CTaskCell — 3614<br>CMemberCell<br>CDateCell<br>SProjectTaskInfo | |
| | PostProjectSchedulePHPProcessor | CProjectTaskManager<br>CProjectTaskUpdater<br>CPostProjectDBInterface — 3616<br>CPostProjectDBQueryGenerator<br>PostProjectSchedulePHPProcessorConstants | |
| | ProjectScheduleWebPageGenerator | CProjectScheduleWebPageManager<br>CProjectScheduleTable<br>CProjectTaskRow — 3618 / 3620<br>CProjectWebPageDBInterface<br>CProjectWebPageDBQueryGenerator<br>ProjectScheduleWebPageGeneratorConstants | |
| | MembScheduleEditor.htm, PostMembSchedule.htm | | |
| Member Schedule Processor | MemberSchedulePHPProcessor | CMemberScheduleManager<br>CMemberScheduleInitialData — 3622<br>CMemberScheduleTaskRowData<br>CEditorDBInterface<br>CJavaScriptInterface<br>MemberSchedulePHPProcessorConstants | |
| | MemberScheduleJavaScriptProcessor | CEditorManager<br>CTableManager<br>CMemberScheduleTable<br>CMemberScheduleRow<br>CTaskCell — 3624<br>CDateCell<br>CDetailTaskInfo<br>SMemberTaskInfo | |
| | PostMemberSchedulePHPProcessor | CMemberTaskManager<br>CMemberTaskUpdater<br>CPostDBInterface<br>CPostDBQueryGenerator — 3626<br>PostMemberSchedulePHPProcessorConstants | |
| | MemberScheduleWebPageGenerator | CMemberScheduleWebPageManager<br>CMemberScheduleTable — 3628<br>CProjectTaskRow<br>CWebPageDBInterface — 3630<br>CWebPageDBQueryGenerator<br>MemberScheduleWebPageGeneratorConstants | |

Figure 36

PROJECT TASK MANAGEMENT SYSTEM FOR MANAGING PROJECT SCHEDULES OVER A NETWORK

CROSS REFERENCE TO RELATED APPLICATIONS

This application is related to U.S. patent application Ser. No. 11/724,723, entitled "Database Query Generation For Project Task Management System For Managing Project Schedules Over A Network", filed Mar. 15, 2007; and U.S. patent application Ser. No. 11/724,757, entitled "Class Object Wrappers For Document Object Model (DOM) Elements For Project Task Management System For Managing Project Schedules Over A Network", filed Mar. 15, 2007; the content of all of which are incorporated by reference in their entirety for all purposes as if fully disclosed herein.

This application is also related to U.S. patent application Ser. No. 11/449,116, entitled "Use of Schedule Editors In a Network-Based Project Schedule Management System", filed Jun. 7, 2006; U.S. patent application Ser. No. 11/449,130, entitled "Consolidation of Member Schedules With a Project Schedule In a Network-Based Project Schedule Management System", filed Jun. 7, 2006; U.S. patent application Ser. No. 11/449,133, entitled "Use of a Database In a Network-Based Project Schedule Management System", filed Jun. 7, 2006; U.S. patent application Ser. No. 09/881,250, now issued as U.S. Pat. No. 7,191,141, entitled "Automated Management Of Development Project Files Over A Network", filed Jun. 13, 2001; and U.S. patent application Ser. No. 10/059,694, entitled "Project Management Over A Network With Automated Task Schedule Update", filed Jan. 28, 2002; the content of all of which are incorporated by reference in their entirety for all purposes as if fully disclosed herein.

FIELD OF THE INVENTION

The present invention relates generally to project management and, more specifically, to a task management system for managing project schedules with a client-server network architecture.

BACKGROUND OF THE INVENTION

Product development projects typically require significant effort to monitor and manage. Furthermore, computer software development projects are inherently difficult to manage. This difficulty is partly due to the large number of tasks and associated deliverables that comprise a software package and the vastness of paperwork and project files associated with these tasks and deliverables. Another contributing factor involves the complex set of interdependencies established between individual tasks and deliverables during the development cycle of a software package. Yet another contributing factor is the need to generate and maintain a design specification associated with the software being developed.

Management of development projects typically includes organizing, maintaining, and controlling access to project documents, schedules, and the like. Furthermore, there are often multiple development projects occurring concurrently within an enterprise organization, thus significantly expanding the document management efforts. Historically, management of a master project schedule entails, among other tasks, manually entering data into a scheduling application, manually creating links between schedules, and manually aggregating individual developers' task schedules into the master project schedule. These are cumbersome and error-prone tasks, with little to no oversight and quality control.

A master project schedule is often in a state of flux, whereby management solicits the developers for task statuses and related schedule updates. Often, the feedback provided to management by the developers has little oversight and is not according to a rigid policy, procedure, or verification process. Thus, the actual status of a project schedule is often difficult to ascertain since the progress of individual tasks are dictated by subjective, and often self-supporting, progress reports by those individuals that are assigned to the task.

Public and private networks provide a useful and simple communication mechanism for members of a project team to obtain all the information related to a project. Maintaining web pages associated with the schedules of a project and of project members allows members of a project team to easily access the schedule to determine the status of the project. However, the tasks involved with creating and updating schedules for individual members of a project team and the tasks involved with consolidating all the schedules of individual members into a single project schedule are not trivial.

One approach to project schedule management involves creating all the schedules manually using an HTML editor. The project manager could create the overall project schedule showing the major project tasks. The project tasks could be divided into subtasks and the subtasks could be informally assigned to members of a project team. Then, each member of a project team could create a member schedule, with a risk of no uniformity in the format of the individual member schedules. From all the members' schedules, the project manager could aggregate all the subtasks schedules associated with the project schedule and update the overall project schedule. Furthermore, all schedules could maintain a history of all the schedules of the tasks. With a small group, scheduling is tedious. With a large group, scheduling is complicated as well as tedious, especially the aggregation of all the subtask schedules with the project task schedules.

Another approach to project schedule management involves automating interdependent processes via a network-based project schedule management system. For example, a procedural computer programming language could be used to develop a network-based project schedule management system. With such an automated system, global functions could perform all the tasks of the project schedule management system. However, modifying or correcting features of the system could pose challenges, such as with locating where in the program changes need to be made. Furthermore, changes in one part of the system could affect another part of the system which, if not implemented correctly, could break the system's functionality. Still further, separate code might need to be developed for similar system components and functionality, such as for multiple editor pages, where implementation of global changes to the system or addition of components to the system could require changes to each of the separate code modules or development of new code.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY OF EMBODIMENTS OF THE INVENTION

Managing a project schedule in a client-server based project schedule management system involves certain functions performed by each of the client and the server and certain communications between the client and the server. According to an embodiment, in response to receiving a request to view an editor associated with the schedule management system, the server accesses schedule-related information from a database. The server then generates and passes to the client some client-executable code for displaying the information in the editor and for managing the editor by the client. Thus, the client can execute the server-generated code to display the retrieved information in association with the editor and to manage and maintain data incoming from a user via the editor.

According to an embodiment, upon the client receiving incoming data via the editor, the client manages and maintains this information by executing some of the server-generated client-executable code. At some point, the client passes the new information to the server for storage in the database. In response to a the client subsequently requesting a web page associated with the editor, the server accesses the pertinent editor specific information from the database and generates more client-executable code for displaying the retrieved information in the web page associated with the editor. The information and code are passed to the client for execution, to display the information in the web page.

According to an embodiment, the server activities are based on execution of PHP (Hypertext Preprocessor) script code by the server, and the client activities are based on execution by the client of JavaScript code generated by the server.

According to an embodiment, automatically generating database queries in a network-based project schedule management system involves locating a particular "constant query" string associated with a particular editor, from the project schedule management system, with which a request is associated. The constant query string may contain one or more placeholder strings, where each placeholder string identifies with what variable value is the placeholder string replaced in order to generate a database query for submission to a database. A database query is automatically generated by replacing any placeholder strings with corresponding variable values, whereby the generated query can be submitted to the database and results returned. Furthermore, "constant for placeholder" strings may be used to search a constant query string for any embedded placeholder strings and to assist in identifying the appropriate value for replacing such placeholder strings. The values used to replace placeholder strings may be obtained from a user editor session and/or from the database. According to an embodiment, the constant query strings are defined in class packages associated with functional aspects of each respective editor component of the project schedule management system.

According to an embodiment, management of schedule tasks in a project schedule system involves responding to events that affect a row of a table in which schedule information is stored, where each row of the table corresponds to a task associated with a project schedule and stores values corresponding to elements of an editor associated with the project schedule system. In response to such an event, a class object corresponding to the affected row manipulates values corresponding to elements of the editor, based on the event. Because the elements of the editor are configured as attributes of the class object, the class object can directly access object attributes which correspond to the elements and can directly manipulate, based on the event, values for attributes of the class. Manipulating such attributes may comprise changing a value for an attribute, which could change the display of the attribute.

BRIEF DESCRIPTION OF THE DRAWINGS

The present invention is illustrated by way of example, and not by way of limitation, in the figures of the accompanying drawings and in which like reference numerals refer to similar elements and in which:

FIG. 1A is a screenshot of a task assignment editor, according to an embodiment of the invention;

FIG. 1B is a screenshot of a sample of a task assignment web page, according to an embodiment of the invention;

FIG. 2A is a screenshot of a project schedule editor, according to an embodiment of the invention;

FIG. 2B is a screenshot of a sample of a project schedule web page, according to an embodiment of the invention;

FIG. 3B is a screenshot of a sample of a member's schedule web page, according to an embodiment of the invention;

FIG. 27 illustrates example constant strings that are used to generate database queries, according to an embodiment of the invention;

FIG. 28 illustrates an example script used to generate the database query from the constant strings of FIG. 27, according to an embodiment of the invention;

FIG. 36 is a diagram illustrating part of the indexing of Table 7 focusing on the three major packages of the system corresponding to the editors, according to an embodiment of the invention.

DETAILED DESCRIPTION OF EMBODIMENTS OF THE INVENTION

Figure 3A:
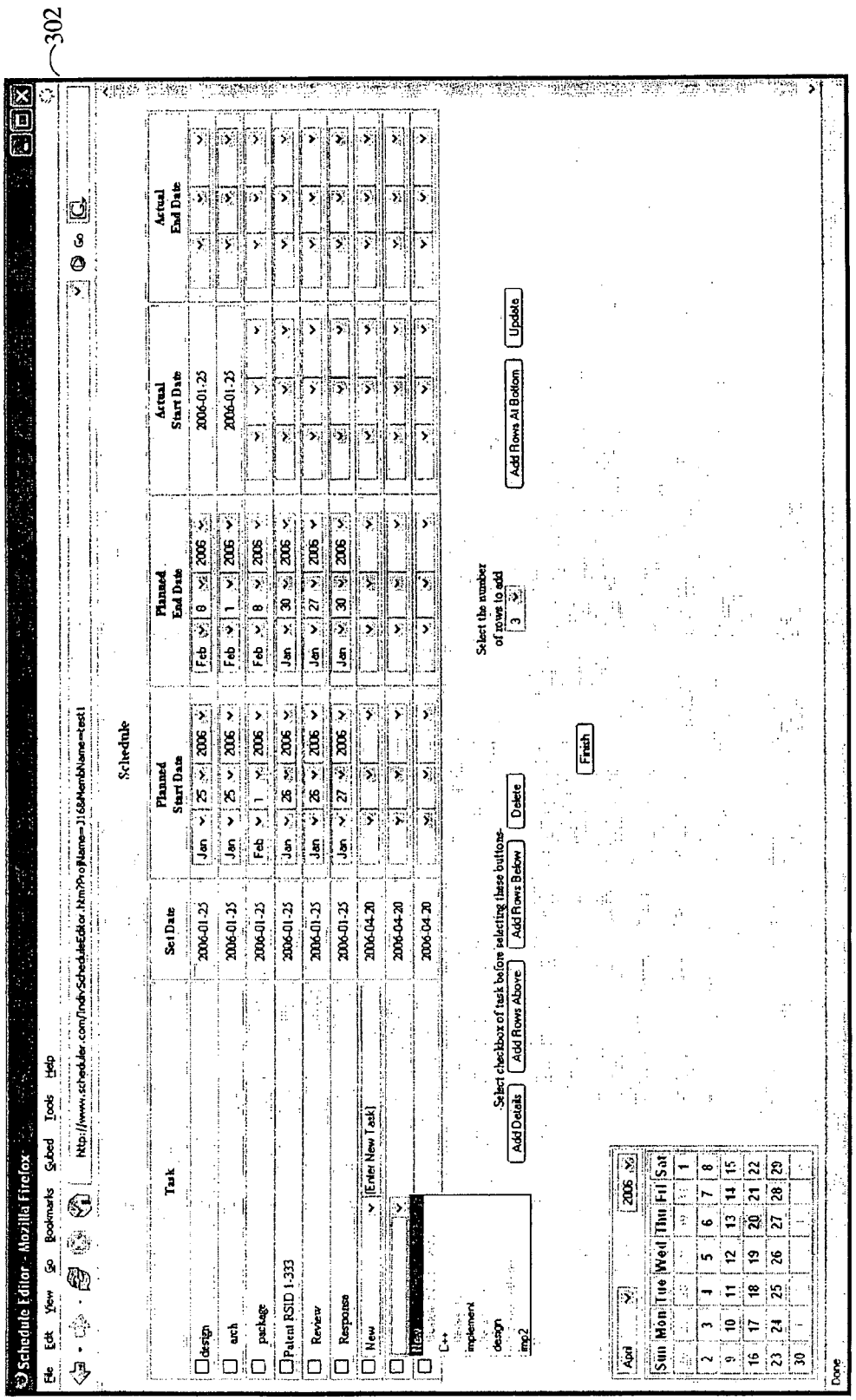
FIG. 3A is a screenshot of an individual member schedule editor, according to an embodiment of the invention.

Techniques are described for managing a project schedule with a client-server based project schedule management system. The techniques are described herein primarily in reference to a software development project, but those skilled in the art should recognize that the benefits of the invention are also available when applying the techniques to other development projects. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Task Assignment Editor

Figure 1A:
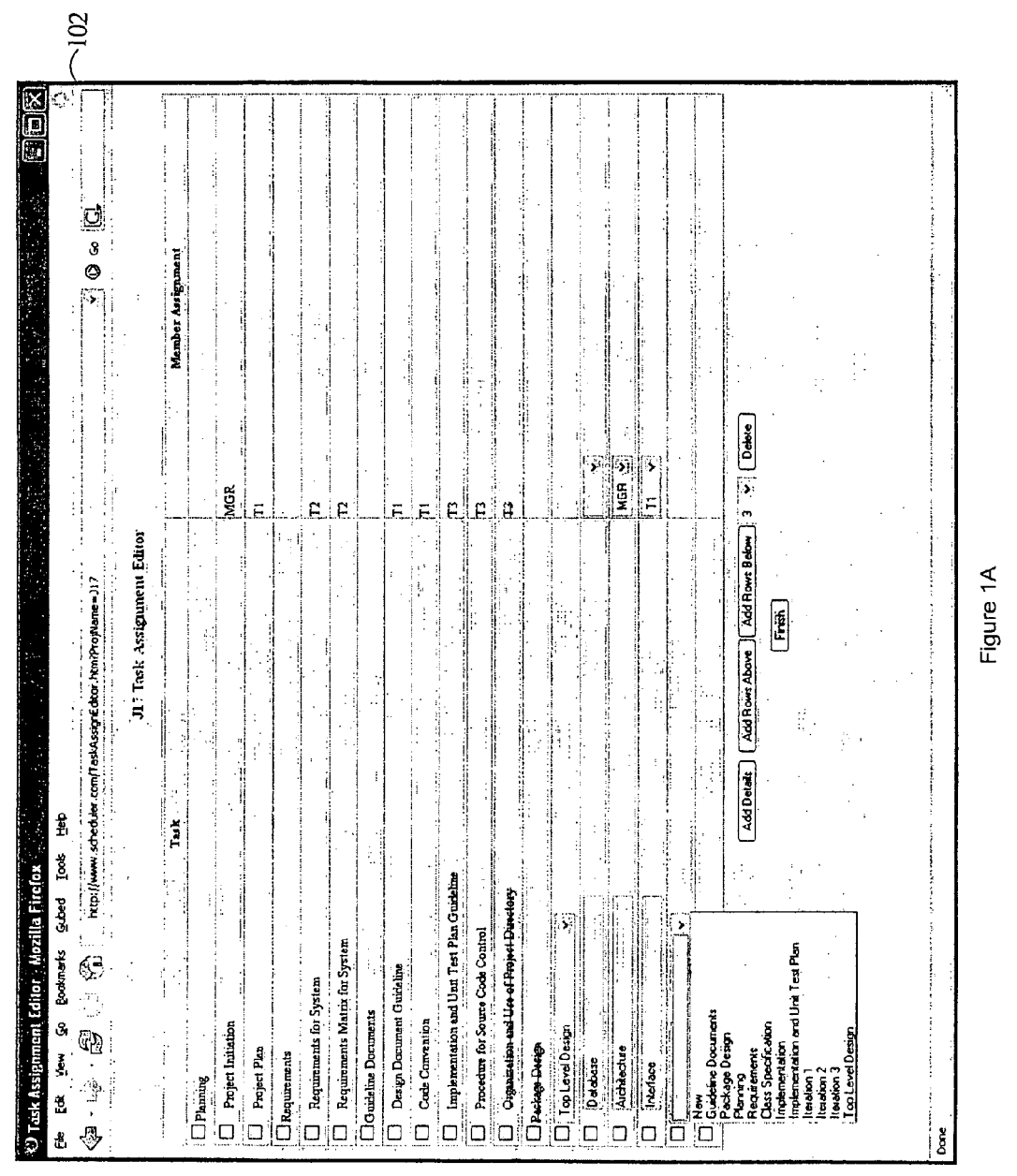

FIG. 1A is a screenshot of a task assignment editor, according to an embodiment of the invention. The task assignment editor 102 assists users in creating the project tasks that are to be completed in a project. With some organizations, there are default project tasks that are common to all projects that will be performed in association with the organization. Associated with the project tasks are subtasks which are assigned to project members. Typically, a project manager sets and assigns tasks to project members. The project manager can use this task assignment editor 102 to set up the project tasks for a project, create the subtasks for each project task, and assign the subtasks to the members. Information about the task assignment is stored and maintained in the task assignment editor 102 while the project manager is adding and assigning tasks. Upon the manager completing a session with the task assignment editor 102, the task assignment information is passed to, stored in, and maintained in a database.

In response to completion of a task assignment session, such as in response to a user selecting the "Finish" button on the task assignment editor 102 of FIG. 1A, a task assignment web page 104 is automatically created, at the web server, for displaying the tasks that are assigned to various project members. FIG. 1B is a screenshot of a sample of a task assignment web page, according to an embodiment of the invention. Task and task assignment information entered and edited via the task assignment editor 102 is displayed in a form in a web page when displayed in a web browser. All the tasks and the assignment of tasks are stored within one or more database tables, where each row preferably corresponds to a task, and displayed in the task assignment editor 102 and the task assignment web page 104.

According to one embodiment, the task assignment editor 102 (FIG. 1A) includes buttons (e.g., Add Details, Add Rows Above, Add Rows Below, Delete, and Finish) usable to perform various operations. The "Finish" button completes the editor session and submits the task assignment information to be stored and maintained in the database. The other buttons perform a respective operation on a task that must be selected by selecting the checkbox in the row corresponding to the task. An "Add Details" button adds rows beneath a project task so the manager can add and assign subtasks to project members. "Add Rows Above" and "Add Rows Below" buttons add rows above and below the row corresponding to the selected task (either project task or subtask) so the manager can add more project tasks or add and assign more subtasks. The number of rows added is set by a "number of rows" menu selection that is next to the "Add Rows Below" button. The "Delete" button deletes the selected task, and removes a project task from the project or removes the assignment of subtasks to a project member.

Project Schedule Editor

Figure 2A:
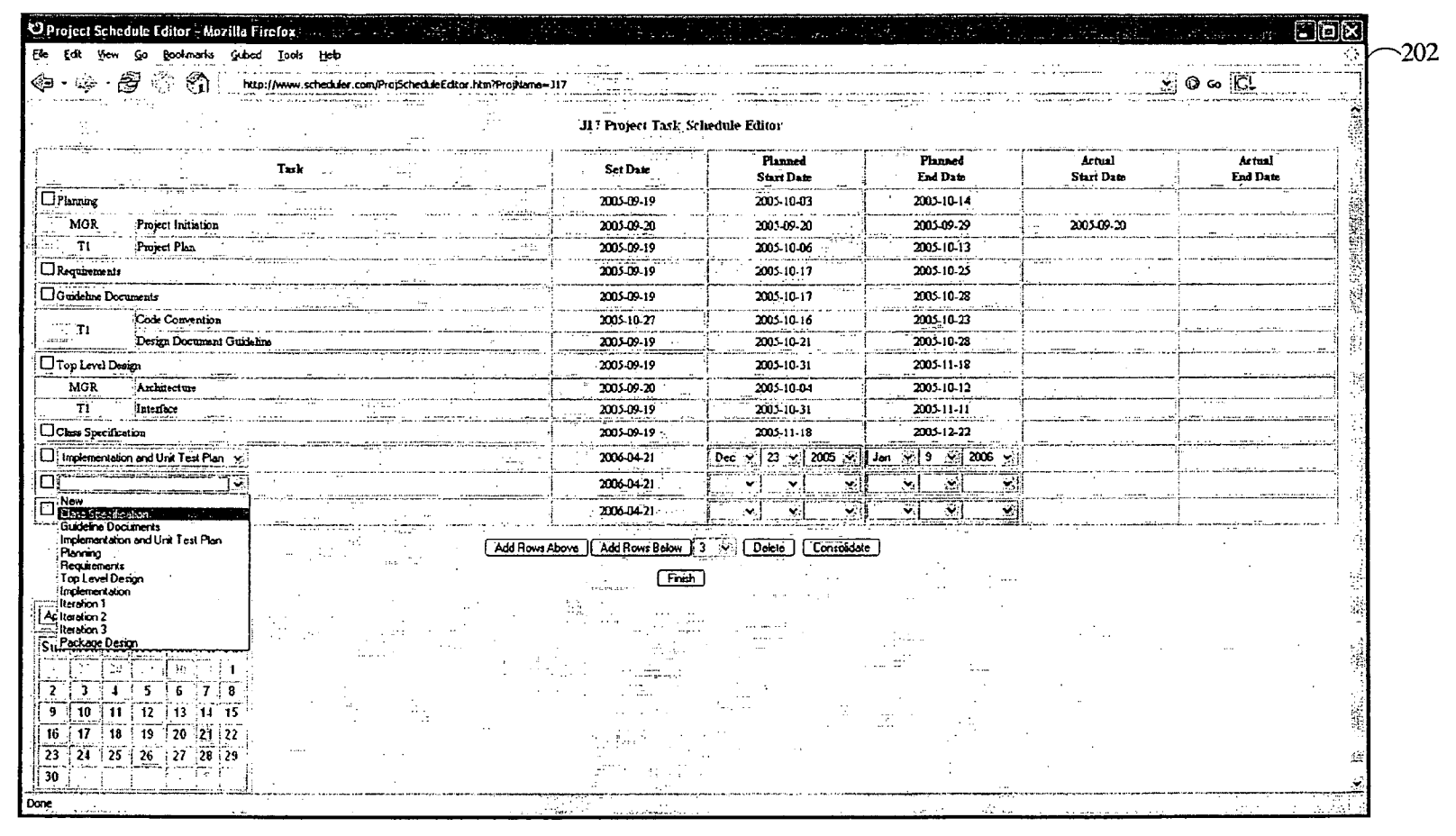

FIG. 2A is a screenshot of a project schedule editor, according to an embodiment of the invention. The project schedule editor 202 is used to set the schedule for the project tasks that are created in the task assignment editor 102 (FIG. 1A). A project task may be created and scheduled in the project schedule editor 202. However, in one embodiment, subtasks cannot be added to the project tasks to assign them to project members using the project schedule editor 202. Most likely, the project manager will use the project schedule editor 202 after the task assignment editor 102. The manager can use the project schedule editor 202 to set the initial project schedule for the major project tasks added in the task assignment editor 102. Information about the scheduling of project tasks is stored and maintained in the project schedule editor 202 while the project manager is adding and scheduling tasks. Upon the manager completing a project schedule editor session, the schedule information for the project tasks is passed, stored, and maintained in the database.

In response to completion of a project schedule session, such as in response to a user selecting the "Finish" button on the project schedule editor 202 of FIG. 2A, a project schedule web page 204 is automatically created, at the web server, for displaying a table for the project schedule. If the individual project members' schedules are created and/or updated for the project subtasks, the project schedule editor 202 displays each project task schedule along with all the subtask schedules. The project schedule editor 202 shows the subtasks with the project member to whom it was assigned. By completing the editor session or by selecting "Consolidate" on the project schedule editor 202 of FIG. 2A, all the subtask schedules for each project task are automatically consolidated or aggregated to update the schedule for the project task, and the project task schedule is updated in the database.

FIG. 2B is a screenshot of a sample of a project schedule web page, according to an embodiment of the invention. The project schedule web page 204 is created for displaying the schedule of the project tasks and its subtasks along with the member to whom a task or subtask is assigned. The project schedule web page 204 shows all the previous schedules (e.g., with strikethrough of previous dates) of each project task and subtask so that the project team can see the changes that occur in the schedule of a task. Project schedule information entered and edited via the project schedule editor 202 is displayed in a form in a web page when displayed in a web browser. All the project tasks' schedules and the subtasks' schedules are stored within one or more database tables, where each row preferably corresponds to a task, and displayed in the project schedule editor 202 and the project schedule web page 204.

According to one embodiment, the project schedule editor 202 (FIG. 2A) includes buttons (Add Rows Above, Add Rows Below, Delete, Consolidate, and Finish) which perform various operations. The "Finish" and "Consolidate" buttons complete the project schedule editor session and submit the project task schedule information to be stored and maintained in the database. The "Consolidate" button causes the members' schedules to be consolidated with the project schedule so that the project schedule is updated in the database. The "Consolidate" button causes the project schedule editor to be redisplayed in the project schedule web page with updated task schedules. The other buttons perform a respective operation on a task that is selected by selecting the checkbox in the row corresponding to the task. The operations can only be performed on project tasks and not the subtasks which are assigned to members. "Add Rows Above" and "Add Rows Below" buttons add rows above and below the row corresponding to the selected project so the manager can add more project tasks and set the schedules for the tasks. The number of rows added is set by the "number of rows" menu selection that is next to the "Add Rows Below" button. The "Delete" button deletes the selected project task.

Member Schedule Editor

FIG. 3A is a screenshot of a member schedule editor, according to an embodiment of the invention. The member schedule editor 302 (also referred to as "individual schedule editor") is used to create a schedule for an individual project member. According to one embodiment, the member schedule editor 302 displays only uncompleted tasks if the member schedule was previously created. The tasks of a member can be project subtasks and/or tasks unrelated to the project. The member can set the schedule, change the schedule, and update the results for a task via the member schedule editor 302. Each of the tasks of a member can be broken down into lower level tasks to schedule the minute details of the task. The addition or modification of lower level tasks may affect the schedule of the upper level task. Therefore, the upper level tasks schedules are updated when the "Update" button is selected. Information about the scheduling of tasks is stored and maintained in the member schedule editor 302 while the member is adding or modifying task schedules. Upon a member finishing a member schedule editor 302 session, the task schedule information is passed, stored, and maintained in the database. FIG. 3A shows the assigned tasks in the drop down list.

In response to completion of a member schedule session, such as in response to a user selecting the "Finish" button on the member schedule editor 302 of FIG. 3A, a member schedule web page 304 (labeled "Task Schedule" in the screen shot of FIG. 3B) is automatically created, at the web server, for displaying a table for the member schedule. FIG. 3B is a screenshot of a sample of a member's schedule web page, according to an embodiment of the invention. Individual schedule information entered and edited via the member schedule editor 302 is displayed in a form in a web page when displayed in a web browser. All the tasks' schedules are displayed within a table where each row corresponds to a task. The member schedule web page 304 shows the previous schedules (e.g., with strikethrough of previous dates) of each project task and subtask so that the project team can see the changes that occur in the schedule of a task.

In member schedule editor 302, buttons (Add Details, Add Rows At Bottom, Add Rows Above, Add Rows Below, Delete, Update, and Finish) are positioned near the table, which are used to perform various respective operations. The "Finish" button completes the member schedule editor session and submits the task schedule information to be stored and maintained in the database. Except for the "Update" button and the "Add Rows At Bottom" button, the other buttons perform an operation on a task that is selected by selecting the checkbox in the row corresponding to the task. The "Add Details" button adds rows beneath a task so the member can add subtasks (a task one level lower) to a task to give more details of the task. "Add Rows Above" and "Add Rows Below" buttons add rows above and below the row corresponding to the selected task so the member can add more tasks to the schedule at the same level. The number of rows added is set by the "number of rows" menu selection that is next to the "Add Rows Below" button. The "Delete" button deletes the selected task. The "Delete" button also removes a task, and all lower level tasks associated with the task, from the member's schedule. The "Add Rows At Bottom" button adds one or more highest level rows to the bottom of the schedule where the number of rows added is set in the "number of rows" menu selection. The "Update" button updates all the upper level task schedules with the lower level task schedules and updates the display of the member schedule editor 302 to show the new dates.

The schedule information for a task includes the plan start and end dates and the actual start and end dates. The plan and actual dates can be set and modified for tasks in the member schedule editor 302. However, only the plan dates can be set for the project tasks in the project schedule editor 202 (FIG. 2A) when the task is scheduled for the first time. The plan dates are automatically updated and the actual dates are automatically set based on the information in the members' schedule for the plan and actual dates of the project subtask, when consolidated. Though not shown, the project schedule editor 202 can be modified so that the planned dates can be changed. However, whatever changes are made in the planned dates of the project task will be overridden by the consolidation of the planned dates of the members' schedule of the project subtasks. Information in the database is used to update the actual dates of the project task when the project manager either completes a project editor session or via the "Consolidate" button of the project schedule editor 202.

Figure 4:
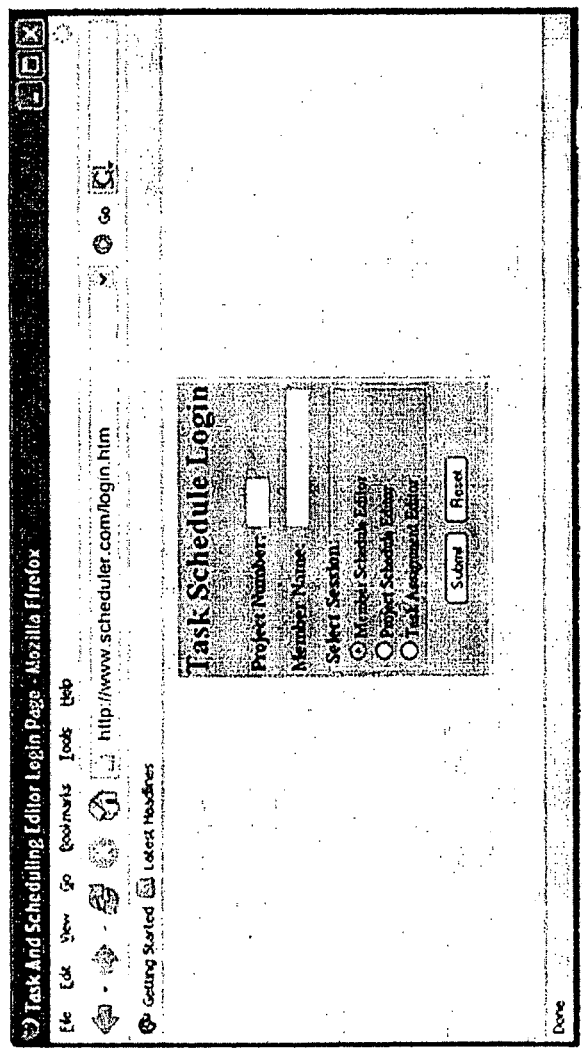
FIG. 4 is a screenshot of a login web page for a project member to log on to one of the editors, according to an embodiment of the invention.

FIG. 4 is a screenshot of a login web page for a project member to log on to one of the editors (task assignment, project schedule, member schedule), according to an embodiment of the invention. The member enters the project number, member name, and selects the appropriate editor, and then submits the information to access the editor. The project schedule management system validates the input and determines if the member is a valid member of the project and has an access right for the selected editor. If not, the member will be denied access to the editor. For tighter security, the login web page and editors can occur over secure HTTP (e.g., HTTPS) and the login page can require a password before logging in.

Project Schedule Management System

Figure 5:
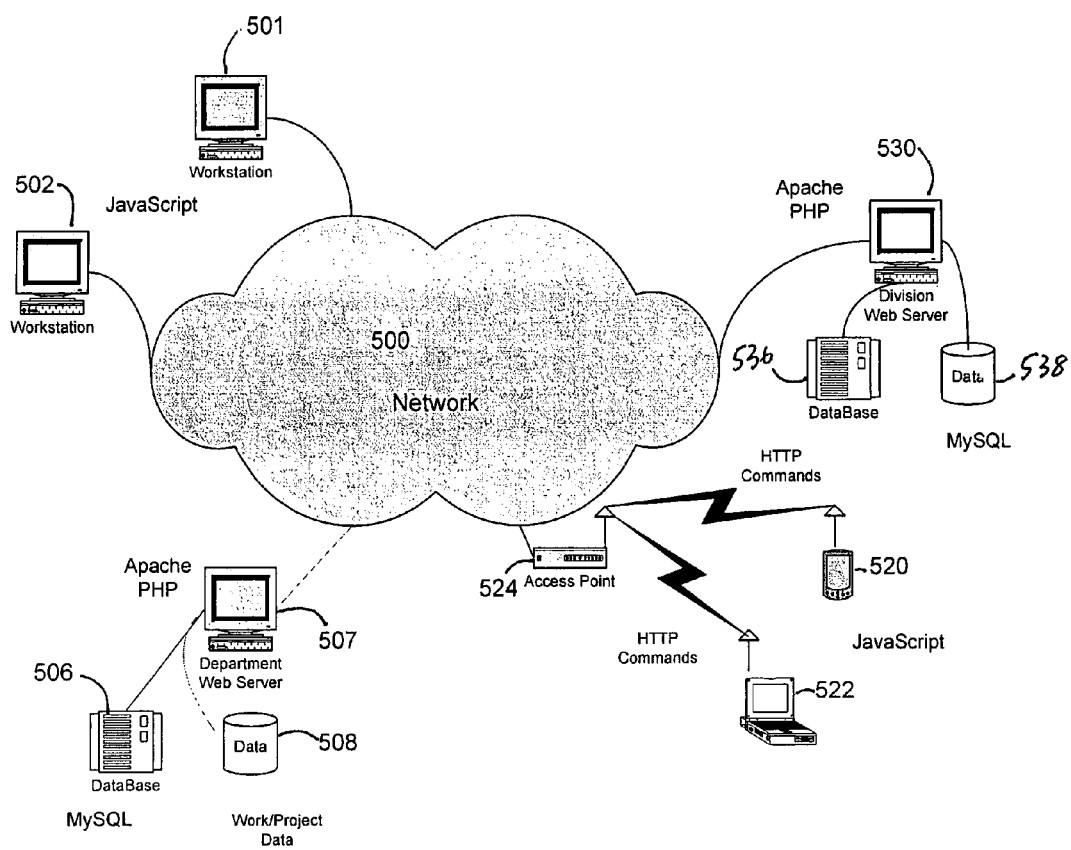
FIG. 5 is a diagram illustrating an operating environment in which an embodiment of the invention may be implemented.

FIG. 5 is a diagram illustrating an operating environment in which an embodiment of the invention may be implemented. The illustrated operating environment is illustrative of an overall system configuration for the project schedule management system described herein. The example operating environment comprises a plurality of workstations, one or more web servers, and one or more associated databases, which are all connected directly or indirectly to a software development network for communication.

Generally, web servers 507 and 530 comprise the resources for the display and management of the editors. The web servers 507, 530 interact with databases 506, 536, respectively, to store, maintain, and manage task assignment and task schedule information, e.g., data 508, 538. The depiction of two web servers and two databases is for purposes of example. Thus, the number of web servers and databases used in a project schedule management system as described herein may vary from implementation to implementation. Web browsers on computer workstations 501, 502 access the resources on the web servers 507, 530 to display the editors. Project members or managers can access the editors over the network 500 (LAN or WAN). The project management system can be used to manage projects at different levels within an organization, e.g., at project, department, division, and organization levels.

Figure 35:
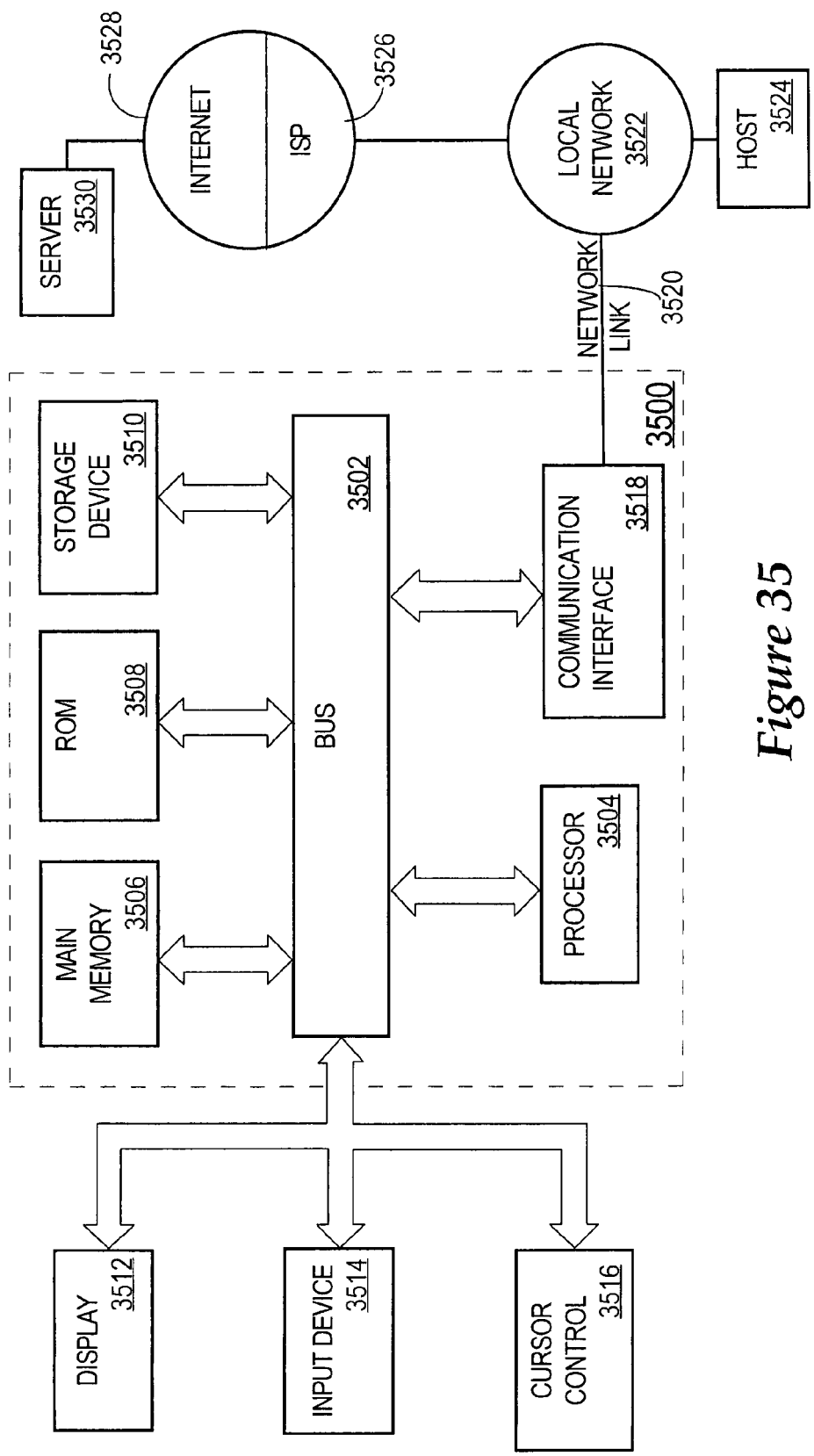
FIG. 35 is a block diagram illustrating a computer system upon which embodiments of the invention can be implemented.

Workstations 501, 502 are typically computer systems configured as illustrated by the computer system 3500 of FIG. 35, with one or more browsers, and are utilized, for example, by the engineers/developers to complete tasks associated with a product development project. Pertinent non-limiting examples of such tasks include initiating projects, preparing and maintaining task schedules, designing software architecture, creating specifications, creating software code, implementing and testing software code, inspecting various task products, etc. In addition, project managers utilize workstations 501, 502 for accessing information to review and manage the progress of the project. The developers and managers transmit communications through the network 500 to the other connected components, e.g., web servers 507, 530; databases 506, 536; and handheld device 520 and laptop 522, via access point(s) 524. The workstations 501 and 502, handheld devices 520, and laptop 522, which can access the web pages from the web servers 507 and 530, can process the JavaScript that the web page contains to manage the editors in the browser. The browsers can process the JavaScript.

Web servers 507, 530 depict a typical web server, which is a combination of computer hardware and software that, using the appropriate protocols (e.g., Hypertext Transfer Protocol [HTTP] and Transmission Control Protocol/Internet Protocol [TCP/IP]), serves the files that form web pages (e.g., Hypertext Markup Language [HTML] or Extensible Markup Language [XML] files), to users, such as developers or managers at a workstation 501, 502. For a non-limiting example, an Apache web server, which contains modules for the execution of PHP scripts, may be used as the web server application for the web server 507 and 530. In general, the majority of information exchanged and managed during the development project life cycle is served by the web servers 507, 530 over the network 500. Furthermore, aspects of the techniques described herein may be implemented and executed on the web servers 507, 530, although practice of the invention is not limited to such an implementation. The techniques could also be implemented on any other processing system, such as workstations 501, 502 or a similarly configured computer system as illustrated in FIG. 35.

Databases 506, 536 depict typical databases for storing data 508, 538 related to the development project, thus providing access to the information by authorized individuals at workstations 501, 502, through queries transmitted over the network 500. The type of data stored on databases 506, 536 is effectively limitless, wherein non-limiting examples include project initiation forms, member and project task schedules, specifications, software code, inspection reports, web page files, and document directories and indexes.

Network 500 depicts a conventional network, e.g., a packet-switched network, for facilitating the exchange of information between and among various connected components, such as workstations 501, 502, web servers 507, 530, and databases 506, 536. The network 500 may be a Local Area Network (LAN), such as a conventional Ethernet, Fast Ethernet, a token ring, or a wireless LAN such as specified in 802.11a and 802.11b (developed by a working group of the Institute of Electrical and Electronics Engineers [IEEE]), which may be implemented within an enterprise. In addition, network 500 may also be a Wide Area Network (WAN), such as the Internet, for facilitating communication with remote users through a Virtual Private Network (VPN), or the network 500 may represent a combination of a LAN and a WAN. In addition, network 500 can be formed using a variety of different mediums, including but not limited electrical wire or cable, optical, or wireless connections.

Figure 6:
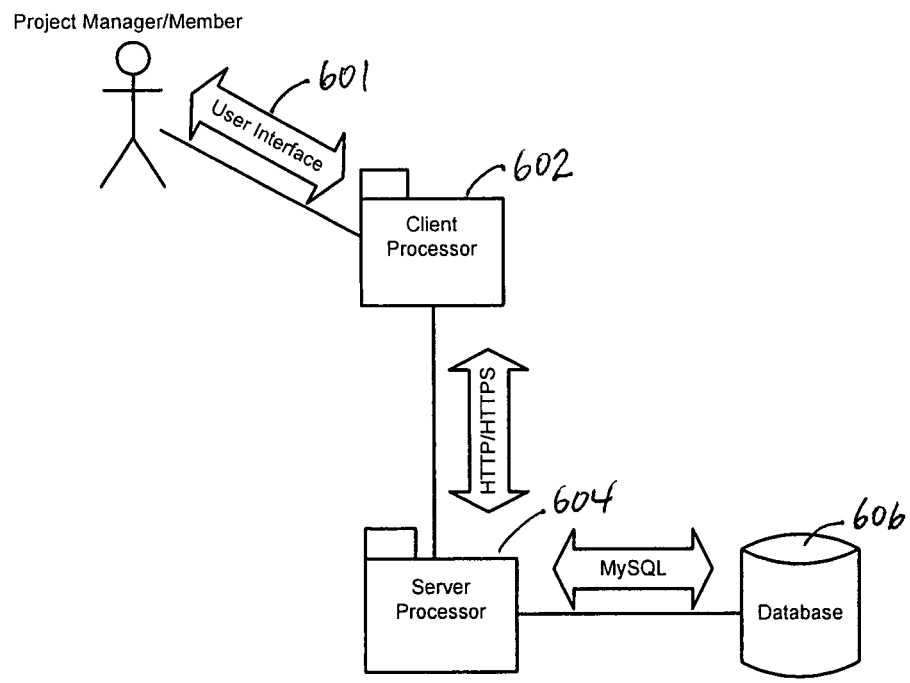
FIG. 6 is a diagram illustrating a communications architecture in which an embodiment of the invention may be implemented.

FIG. 6 is a diagram illustrating a communications architecture in which an embodiment of the invention may be implemented, including software components of an automated scheduling system. The client processor 602 corresponds to a web browser and the server processor 604 corresponds to a web server, such as web servers 507 and 530 (FIG. 5). A project member or manager interacts with the client processor 602 through a user interface 601. The client processor 602 manages and maintains the login web page (FIG. 4) and the various editor web pages (FIGS. 1A, 2A, 3A). The client processor 602 handles all events that occur in these web pages. According to one embodiment, the client processor 602 interacts with the server processor 604 through the HTTP protocol. According to one embodiment, the client processor 602 interacts with the server processor 604 through the secure HTTPS protocol.

The server processor 604 provides information to the client processor 602 to display the login web page (FIG. 4) and editor web pages (FIGS. 1A, 2A, 3A). The server processor

604 also processes the information in the login and editor web pages when the client processor 602 submits the information in these pages. The database 606 is a repository of project and task scheduling information. The server processor 604 interacts with the database 606 to obtain, add, or update information in the databases. According to one implementation, the server processor 604 interacts with the database 606. However, other databases and protocols can be used.

Client-Server Interfaces

Figure 7:
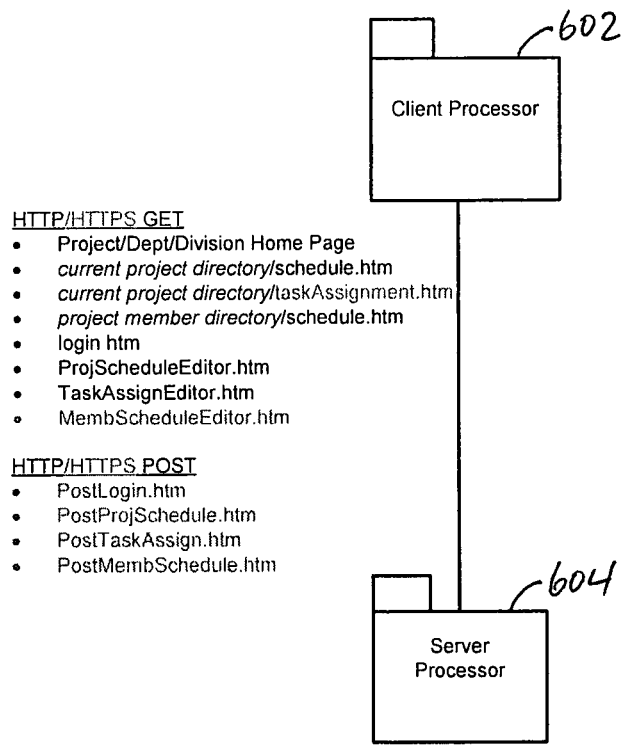
FIG. 7 is a diagram illustrating interfaces between the client processor and the server processor of the system, according to an embodiment of the invention.

FIG. 7 is a diagram illustrating interfaces between the client processor and the server processor of the system, according to an embodiment of the invention. The HTTP/HTTPS GET requests provide for the client processor 602 obtaining the home, login (FIG. 4), project schedule editor (FIG. 2A), member schedule editor (FIG. 3A), and task assignment editor (FIG. 1A) web pages from the server processor 604. The HTTP/HTTPS POST requests provide for the client processor 602 submitting information entered in the login (FIG. 4) and editor web pages (FIGS. 1A, 2A, 3A) to the server processor 604 for processing. The applicable HTTP/HTTPS GET and HTTP/HTTPS POST requests are described in greater detail hereafter.

HTTP/HTTPS GET Project/Dept/Division Home Page requests cause the server processor 604 to return to the client processor 602 a project home page associated with a department or division, respectively. The home page contains links (e.g., hyperlinks) for linking to and viewing the respective web page for the schedules, task assignment, and login to the editors.

HTTP/HTTPS GET current project directory/schedule.htm requests cause the server processor 604 to return to the client processor 602 a web page containing the project schedule for a current project, an example of which is depicted in FIG. 2B.

HTTP/HTTPS GET current project directory/taskAssignment.htm requests cause the server processor 604 to return to the client processor 602 a web page containing the task assignments of project tasks for the current project, an example of which is depicted in FIG. 1B.

HTTP/HTTPS GET project member directory/schedule.htm requests causes the server processor 604 to return to the client processor 602 a web page containing a project member's schedule for the current project, an example of which is depicted in FIG. 3B.

HTTP/HTTPS GET login.htm requests cause the server processor 604 to return to the client processor 602 a web page that allows a project member or manager to log on to one of the editors (project schedule, member schedule, task assignment). The member or manager enters information about the project, member name, and editor session type. FIG. 4 depicts a web page for logging into to one of the editors.

HTTP/HTTPS GET TaskAssignEditor.htm requests cause the server processor 604 to return to the client processor 602 a web page for the task assignment editor, which is used to assign tasks to the project members for the current project. A project manager requires access privileges to assign tasks to the project members before the server processor 604 returns the task assignment editor web page. This privilege is verified when the manager submits the information in the login web page (FIG. 4). According to one embodiment, TaskAssignEditor.htm includes Javascripts to display, manage, and handle events in the task assignment editor. According to one embodiment, TaskAssignEditor.htm includes PHP scripts to obtain information from the databases 506, 536 and pass the information to the Javascripts so the information is displayed in the task assignment editor, an example of which is depicted in FIG. 1A.

HTTP/HTTPS GET ProjScheduleEditor.htm requests cause the server processor 604 to return to the client processor 602 a web page for the project schedule editor, which is used to create or update the project schedule for the current project. A project manager must have access privileges to create the project schedule before the server processor 604 returns the project schedule editor. This privilege is verified when the manager submits the information in the login web page (FIG. 4). According to one embodiment, ProjScheduleEditor.htm includes Javascripts to display, manage, and handle events in the project schedule editor web page. According to one embodiment, ProjScheduleEditor.htm includes PHP scripts to obtain information from the databases 506, 536 and pass the information to the Javascripts so the information is displayed in the project schedule editor, an example of which is depicted in FIG. 2A.

HTTP/HTTPS GET MembScheduleEditor.htm requests cause the server processor 604 to return to the client processor 602 a web page for the member schedule editor, which is used to create or update a project member's schedule for the current project. According to one embodiment, the schedule editor displays only uncompleted tasks if the project member's schedule has been previously created. A project member must have privileges to create or edit the schedule before the server processor 604 returns this web page. This privilege is verified when the member submits the information in the login web page (FIG. 4). According to one embodiment, MembScheduleEditor.htm includes Javascripts to display, manage, and handle events in the project member's schedule editor. According to one embodiment, MembScheduleEditor.htm includes PHP scripts to obtain information from the databases 506, 536 and pass the information to the Javascripts so the information is displayed in the member schedule editor, an example of which is depicted in FIG. 3A.

HTTP/HTTPS POST login.htm interface allow the client processor 602 to access and display the various editors (project schedule, member schedule, task assignment). This interface is called when the "Submit" button is selected from the web page corresponding to login.htm. The information entered in login.htm is passed to PostLogin.htm in the server processor 604. The PostLogin.htm uses the information to validate the member for the project, and to determine if the member has access privileges to the requested editor. If the information is invalid or the member does not have access privilege to the editor, then PostLogin.htm returns a message to the client processor 602 that the project member cannot access the requested editor. Otherwise, PostLogin.htm returns the web page corresponding to one of the editors, i.e., the web browser is redirected to the web page corresponding to the requested editor.

HTTP/HTTPS POST PostTaskAssign.htm allows the client processor 602 to submit all the information entered in the task assignment editor (FIG. 1A) to the server processor 604. This interface is called when the "Finish" button is selected from the web page corresponding to TaskAssignEditor.htm. The information entered in the editor of TaskAssignEditor.htm is passed to PostTaskAssign.htm in the server processor 604. PostTaskAssign.htm adds and updates task assignment information in the appropriate database 506, 536. An appropriate message is displayed if any of the information entered is invalid or if the process fails to access or query the appropriate database. PostTaskAssign.htm also creates the task assignment web page, an example of which is depicted in FIG. 1B.

HTTP/HTTPS POST PostProjSchedule.htm allows the client processor 602 to submit all the information entered in the project schedule editor (FIG. 2A) to the server processor

604. This interface is called when the "Finish" button is selected from the web page corresponding to ProjSchedule-Editor.htm. The information entered in the editor of ProjScheduleEditor.htm is passed to PostProjSchedule.htm in the server processor 604. PostProjSchedule.htm adds and updates task schedule information in the appropriate database 506, 536. An appropriate message is displayed if any of the information entered is invalid or if the process fails to access or query the appropriate database. PostProjSchedule.htm also creates the project schedule web page, an example of which is depicted in FIG. 2B.

HTTP/HTTPS POST PostMembSchedule.htm allows the client processor 602 to submit all the information entered in the project member's schedule editor (FIG. 3A) to the server processor 604. This interface is called when the "Finish" button is selected from the web page corresponding to MembScheduleEditor.htm. The information entered in the editor of MembScheduleEditor.htm is passed to PostMembSchedule.htm in the server processor 604. PostMembSchedule.htm adds and updates task schedule information in the appropriate database 506, 536. An appropriate message is displayed if any of the information entered is invalid or if the process fails to access or query the database. PostMembSchedule.htm also creates the member's schedule web page, an example of which is depicted in FIG. 3B.

The web pages for the various editors (TaskAssignEditor.htm, ProjScheduleEditor.htm, and MembScheduleEditor.htm) include files that contain Javascript or PHP script, according to one non-limiting embodiment. The scripting languages used to perform the various functions described herein may vary from implementation to implementation. When a web browser (e.g., client processor 602) requests the web page of an editor, the editor web page and all the files corresponding to Javascript are passed to the web browser, whereby the web browser processes the Javascript. However, the files for the PHP script are not passed to the web browser. The PHP script are processed in the web server, such as web servers 507, 530 of FIG. 5, where only what the PHP script writes onto the web page is passed to the web browser.

Figure 8:
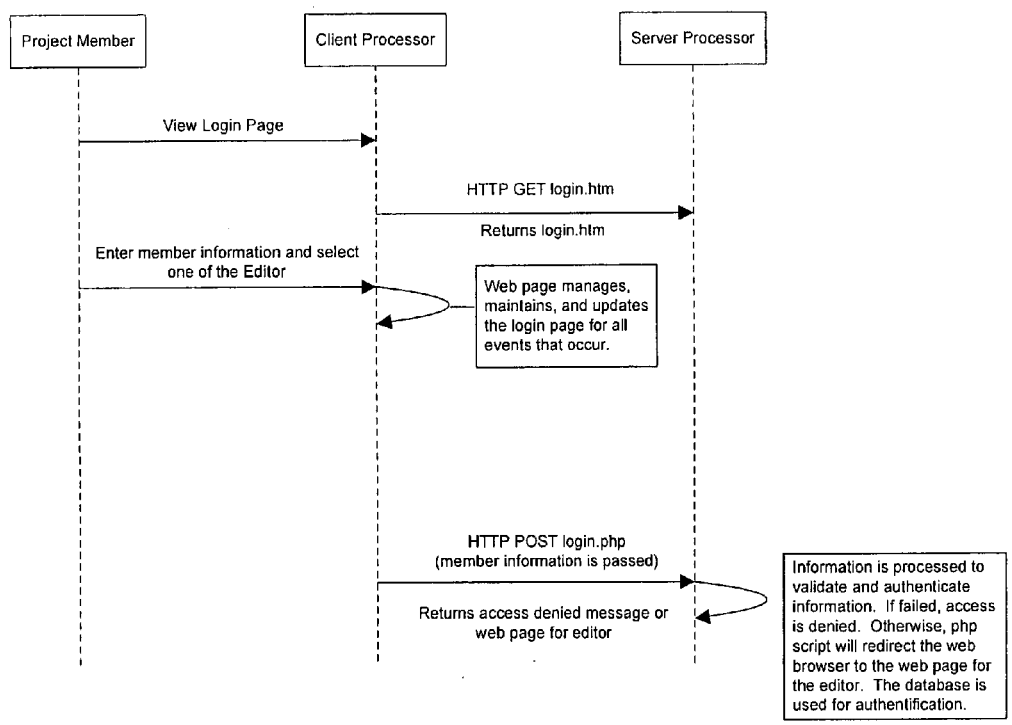
FIG. 8 illustrates a sequence diagram for a project member or manager to log on to one of the editors using the login web page, according to an embodiment of the invention.

FIG. 8 illustrates a sequence diagram for a project member or manager to log on to one of the editors using the login web page, according to an embodiment of the invention. The diagram shows the information passed between the components of the system before the editor is displayed to the member or manager. Processing occurs within the client processor 602 to handle all the events that occur on the login web page (FIG. 4). Processing occurs within the server processor 604 to validate the information entered in the login page and to verify the access privilege of the member for the editor. The server processor 604 obtains information from the appropriate database 506 or 536 for the verification of access privileges. Project members or managers perform this process before getting into any of the editors whose sequences are described in FIGS. 9-11.

Sequence Diagrams for Editors

Figure 9:
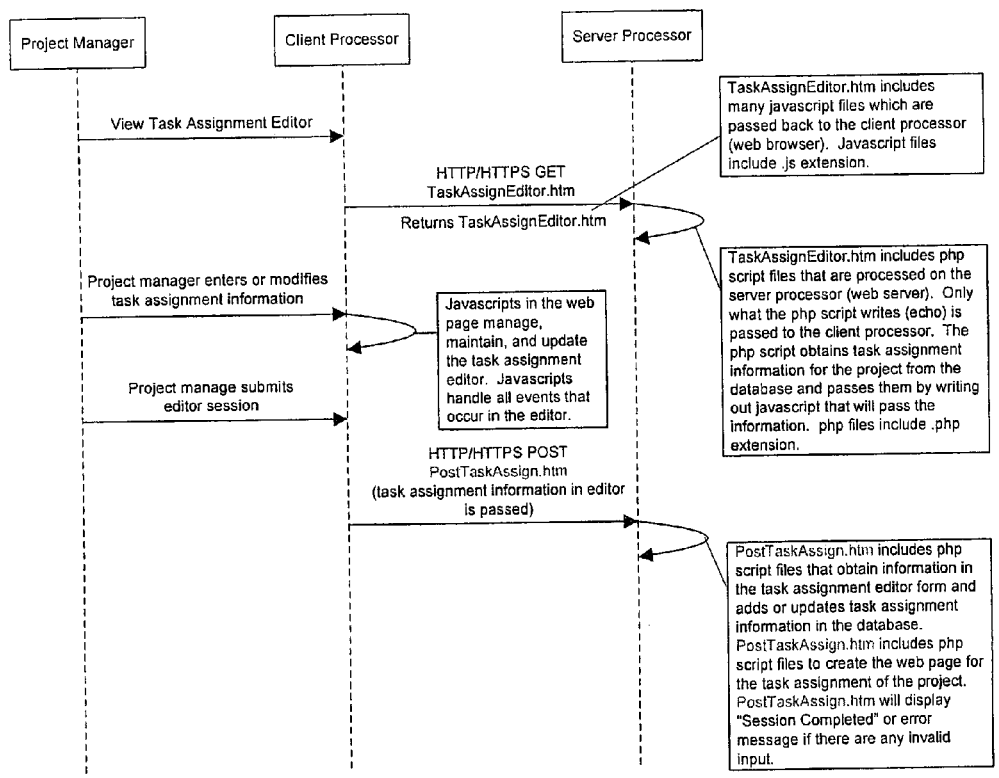
FIG. 9 illustrates a sequence diagram for a project manager in a session with a task assignment editor, according to an embodiment of the invention.
Figure 10:
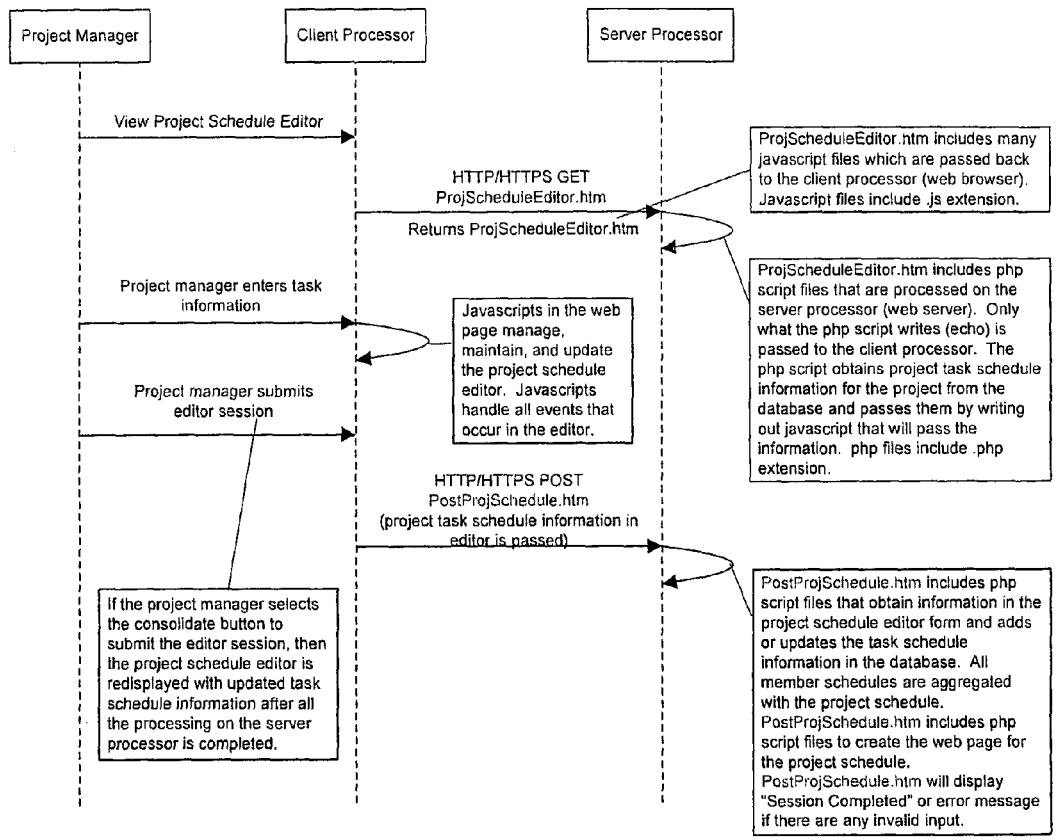
FIG. 10 illustrates a sequence diagram for a project manager in a session with a project schedule editor, according to an embodiment of the invention.
Figure 11:
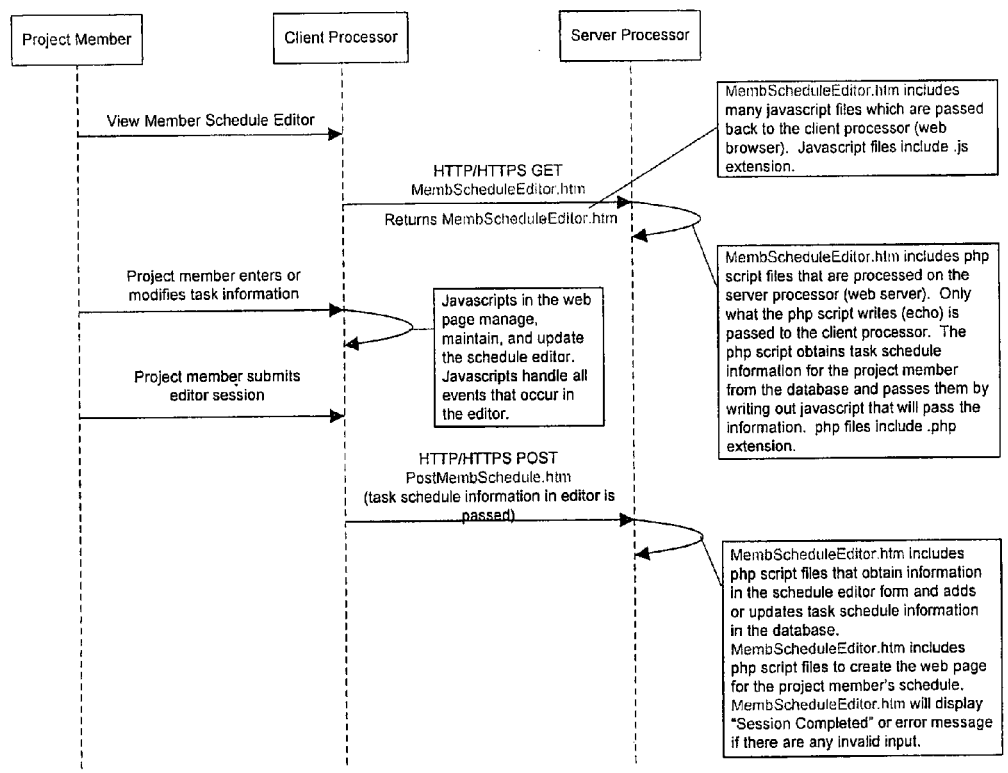
FIG. 11 illustrates a sequence diagram for a project member in a session with a project member schedule editor, according to an embodiment of the invention.

FIG. 9 (Task Assignment Editor), FIG. 10 (Project Schedule Editor) and FIG. 11 (Member Schedule Editor) show the sequences for displaying the respective editors in the web browser and for posting the information in the editors when a session is completed. All the editors follow a similar sequence. To obtain the initial display of an editor in the web browser of the client processor, the appropriate task assignment/schedule information is obtained from the database in the server processor (using PHP script). The server processor will pass the web page containing code (JavaScript) that the client processor can execute to manage and maintain the editor along with code that the server processor generates (using PHP script) that will display the initial editor in the client processor. The server processor will generate code to pass to the client processor the task assignment/schedule information the server processor obtained from the database.

FIG. 9 illustrates a sequence diagram for the project manager in a session with the task assignment editor, according to an embodiment of the invention. When the client processor 602 requests TaskAssignEditor.htm, the file TaskAssignEditor.htm and all the included files containing Javascript (shown with .js extension) are passed from the server processor 604 to the client processor 602. The included files containing PHP script (shown with .php extension) are processed in the server processor 604. The PHP script obtains task assignment information from the appropriate database 506 or 536 and writes Javascript into the web page of TaskAssignEditor.htm, in order to pass the information to the client processor 602. The client processor 602 processes the Javascript in all the files it receives, in order to display the corresponding task assignment editor. All interactions between the project manager and the task assignment editor are handled by the Javascript to manage, maintain, and update the task assignment editor. When the project manager finishes the session (e.g., selects "Finish"), all task assignment information in the task assignment editor is passed from the client processor 602 to the server processor 604 through the interface PostTaskAssign.htm. The server processor 604 processes the information by adding or updating the information in the appropriate database. Using the task assignment information in the database, the server processor 604 automatically creates a web page for the project task assignment, an example of which is depicted in FIG. 1B.

FIG. 10 illustrates a sequence diagram for the project manager in a session with the project schedule editor, according to an embodiment of the invention. When the client processor 602 requests ProjScheduleEditor.htm, the file ProjScheduleEditor.htm and all the included files containing Javascript are passed from the server processor 604 to the client processor 602. The included files containing PHP script are processed in the server processor 604. The PHP script obtains project task schedule information from the appropriate database and writes Javascript into the web page of ProjScheduleEditor.htm, in order to pass the information to the client processor 602. The client processor 602 processes the Javascript in the files it receives, in order to display the project schedule editor. All interactions between the project manager and the project schedule editor are handled by the Javascript, in order to manage, maintain, and update the editor. When the manager finishes the session (e.g., selects "Finish"), all project task schedule information in the project schedule editor is passed from the client processor 602 to the server processor 604 through the interface PostProjSchedule.htm. The server processor 604 processes the information by adding or updating the information in the appropriate database. The server processor 604 also automatically aggregates the project members' schedules with the project schedule and adds or updates the project schedule in the database. Using the project task schedule information in the database, the server processor 604 automatically creates a web page for the project schedule, an example of which is depicted in FIG. 2B.

The behavior of the system in response to a selection of the "Consolidate" button is the same as for a selection of the "Finish" button. Both buttons cause (a) the addition and updating of the appropriate database with information from the project schedule editor, (b) the aggregation of the members' individual schedules with the project schedule, (c) the addition and updating of the project schedule in the database, and (d) the creation of the project schedule web page. Further, "Consolidate" redisplays the project schedule editor with the updated project schedule by requesting ProjScheduleEditor.htm again.

FIG. 11 illustrates a sequence diagram for the project member in a session with the project member schedule editor (i.e., member schedule editor), according to an embodiment of the invention. When the client processor 602 requests MembScheduleEditor.htm, the file MembScheduleEditor.htm and all the included files containing Javascript are passed from the server processor 604 to the client processor 602. The included files containing PHP script are processed in the server processor 604. The PHP script obtains member task schedule information from the appropriate database and writes Javascript into the web page of MembScheduleEditor.htm, in order to pass the information to the client processor 602. The client processor 602 processes the Javascript in the files it receives, in order to display the member schedule editor. Interactions between the project member and the member schedule editor are handled by the Javascript, in order to manage, maintain, and update the member schedule editor. When the member finishes the session (e.g., selects "Finish"), member task schedule information in the member schedule editor is passed from the client processor 602 to the server processor 604 through the interface PostMembSchedule.htm. The server processor 604 processes the information by adding or updating the information in the appropriate database. Using the member task schedule information in the database, the server processor 604 automatically creates a web page for the member schedule, an example of which is depicted in FIG. 3B.

Database Schema

Figure 12:
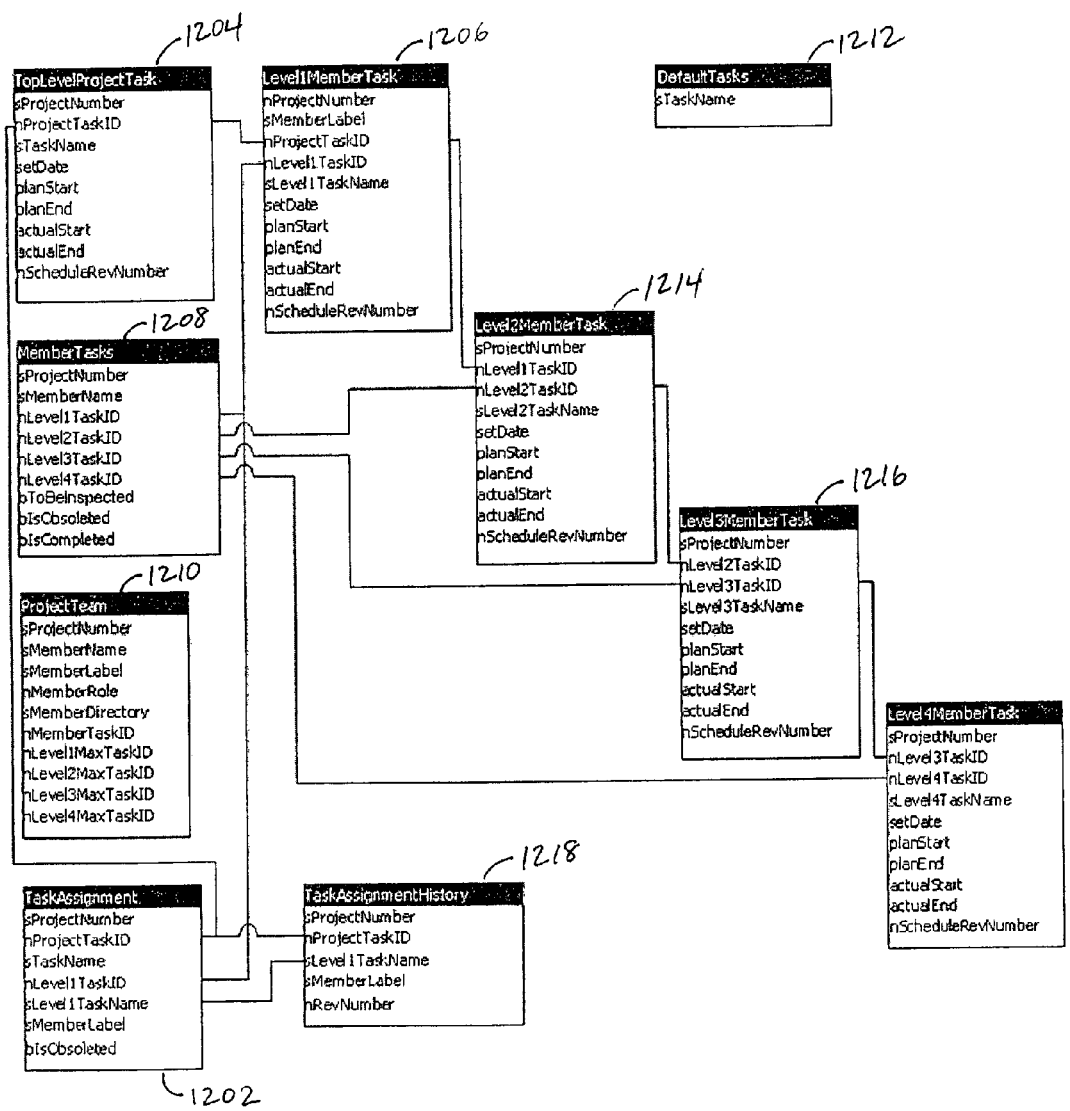
FIG. 12 illustrates a schema of database tables used to store and manage task assignment and task schedule information for projects and project members, according to an embodiment of the invention.

FIG. 12 illustrates a schema of database tables used to store and manage task assignment and task schedule information for projects and project members, according to an embodiment of the invention. The tables maintain information about the task assignments, the schedule for the project tasks, and the schedules for each project member. The tables are organized and linked such that the task assignments, project schedule, and members' schedule are all related.

The TaskAssignment table 1202 stores the project tasks and corresponding subtasks of a project. The TopLevelProjectTask table 1204 stores the schedule of the project tasks that are in the TaskAssignment table 1202. The Level1MemberTask table 1206 stores the schedule of the member tasks which are assigned in the TaskAssignment table 1202 and links to the schedule of its corresponding project task in the TopLevelProjectTask table 1204. These links between the tables enable the automatic aggregation of the member schedules with the project schedule. The Level1MemberTask table 1206 also stores the schedule of the member tasks that are not related to any project task. The LevelXMemberTask tables (where X is 1, 2, 3, and 4) and the MemberTasks table 1208 store and manage links between the various levels of tasks of a member. The lower level tasks are more detailed tasks of the upper level tasks. The organization of these tables maintains the schedule of a member. The ProjectTeam table 1210 contains information about the project members. The project member information for a project member includes (a) a role, to determine access privileges to the various editors, (b) a directory for determining the location at which the member schedule web page is stored, and (c) IDs used for determining the identifier of the member tasks at various levels.

The log in process uses information in the ProjectTeam table 1210 to determine access privileges to a requested editor before displaying the editor. The task assignment editor uses and/or updates information in the tables DefaultTasks 1212, TaskAssignment 1202, TaskAssignmentHistory 1218, TopLevelProjectTask 1204, and MemberTasks 1208. The project schedule editor uses and/or updates information in the tables DefaultTasks 1212, TaskAssignment 1202, TopLevelProjectTask 1204, MemberTasks 1208, and Level1MemberTask 1206. The member schedule editor uses and/or updates information in the tables ProjectTeam 1210, TaskAssignment 1202, TopLevelProjectTask 1204, MemberTasks 1208, and LevelXMemberTask.

Descriptions of the various tables depicted in FIG. 12, and used in an embodiment of the project schedule management system described herein, are as follows. However, the number and structure of the tables described in reference to FIG. 12 may vary from implementation to implementation.

DefaultTasks table 1212—this table contains the names of tasks that are typically tasks for all projects. In the context of software development projects, some examples of default tasks are Project Plans, Requirements, and Top Level Design.

ProjectTeam table 1210—this table contains information about project members for a project. sMemberLabel is a 2 to 4 character string used to identify a project member when displaying the project schedule, which shows the project tasks and associated member tasks as depicted in FIGS. 1A and 1B. In one embodiment, the initials of the project member are used for sMemberLabel. nMemberRole is a number used for indicating the role of the project member. For example, project manager=1, project leader=2, project administrator=3, and project member=4. The role indicates who has access to the editors. For example, a project member whose role number is 1 has access to all the editors. However, a project member whose role number is 4 can only access the member's schedule editor. The system can be configured to determine which role numbers have access to the respective editors. sMemberDirectory is used to determine where the HTML file for the member schedule is stored so that the project team can view the member's schedule. nMemberTaskID is a number assigned to a project member that is used to determine the ID of a task for that member. According to one embodiment, the nMemberTaskIDs are used as the start ID for a task. Depending upon the size of the project team, the ID can be MOD 10 (1, 2, . . . , 9) for a small team or MOD 100 (1, 2, . . . , 99) or higher for a large team. The task IDs are increments of the MOD. For example, if the nMemberTaskID of project member 'test1' is 1, then the task IDs of test1's task will be 11, 21, 31, and so forth (or 101, 201, 301, and so forth for a large team). The task ID uniquely identifies a task for a project member even if the name of some of the tasks are the same. The task ID also uniquely identifies a task at all levels. nLevelXMaxTaskID is a number used to maintain the highest task IDs that have been used so far for the different level tasks of a project member. These numbers provide the starting IDs used to determine the task IDs of tasks that are added in the member's schedule editor session. These values are retrieved and updated after each editor session. Except for the values for nLevelXMaxTaskID, the values for the other entries must be set prior to the beginning of a project.

TaskAssignment table 1202—this table contains information about the project tasks and its subtasks that are assigned to project members for a project. sTaskName is used for the names of the tasks and nProjectTaskID are the IDs associated with the tasks. The project start task ID is 0 so that the ID for its tasks will be increments of the MOD (10, 20, 30, . . . for small team). sLevel1TaskName is used for the names of the subtasks (member tasks) associated with the project tasks and nLevel1TaskID is used for the IDs associated with the subtasks. sMemberLabel is used to identify the project members that are assigned the subtasks. bIsObsoleted is used to indicate whether the task has been removed from the project. Even though a task is deleted from the schedule, information about the task is maintained in the database. Values for sTaskName, nProjectTaskID, sLevel1TaskName, and sMemberLabel can be added to the TaskAssignment table 1202 through a task assignment editor session. The project schedule editor session can add values for sTaskName and nProjectTaskID. Only the member schedule editor session can add values for nLevel1TaskID.

TopLevelProjectTask table 1204—this table contains information about the scheduling of project tasks. sTaskName is used for the names of the tasks and nProjectTaskID is used for the IDs associated with the tasks. planStart and planEnd are used for the expected dates for starting and completing the task. actualStart and actualEnd are used for the actual dates in which the task was started and completed. setDate is used for the date in which the planned dates were set or modified. nScheduleRevNumber is used for the revision number of the task schedule. The latest schedule for a project task corresponds to the highest revision number. All revisions of a project task are maintained in the TopLevelProjectTask table 1204 to track the changes in the project task's schedule. The revision is incremented only when the planned dates are changed in the project schedule editor on different days. All values for nProjectTaskID, sTaskName, dates, and nScheduleRevNumber are added or updated in the TopLevelProjectTask table 1204 through a project schedule editor session or a task assignment editor session.

MemberTasks table 1208—this table contains information about all the tasks (tasks at all levels) for all the project members. Associated with each member (sMemberName) of a project are the task Ids and nLevelXTaskID, which identify all the tasks and their relationship with one another. As with the TaskAssignment table, bIsObsoleted indicates if the task has been removed from the project member's schedule. bIsCompleted indicates if the tasks is completed. nLevelXTaskID is used for the tasks which are added to the MemberTasks table 1208 and are determined from the nLevelXMaxTaskID of the ProjectTeam table 1210 when new tasks are added in the member's schedule editor session. Values in the table can be updated or modified (bIsObsoleted or bIsCompleted) from the results of any of the three editor sessions (member schedule, project schedule, task assignment). The MemberTasks table 1208 is important to provide a link between the lower level task schedules with the upper level task schedules.

LevelXMemberTask table (e.g., Level1MemberTask table 1206, Level2MemberTask table 1214, Level3MemberTask table 1216)—this table contains information about the scheduling of member tasks. sLevelXTaskName is used for the name of the tasks and nLevelXTaskID is used for the IDs associated with the tasks. nLevelXTaskID for the tasks which are added to the table are determined from the nLevelXMaxTaskID of the ProjectTeam table 1210 when new tasks are added in the member's schedule editor session. planStart and planEnd are used for the expected dates for starting and completing the task. actualStart and actualEnd are used for the actual dates in which the task was started and completed. setDate is used for the date in which the planned dates were set or modified. nScheduleRevNumber is used for the revision number of the task schedule. The latest schedule for a member task corresponds to the highest revision number. All revisions of a member task are maintained in the table to track the changes in the member task's schedule. According to one embodiment, the revision is incremented only when the planned dates are changed in the member schedule editor. Each LevelXMemberTask table contains a task ID for upper level tasks (except for level 1, where a task either has a project task as its parent or no parent task). This provides for a task a link to its parent task and its child tasks. All values for parent task ID, sLevelXTaskName, nLevelXTaskID, dates, and nScheduleRevNumber are added or updated in the table through the member schedule editor session. Only Level1MemberTask table 1206 contains the sMemberLabel to provide a link to the TaskAssignment table 1202.

The database shows only lower levels down to level 4. However, the database can be modified to include lower levels for greater details in the task schedule.

TaskAssignmentHistory table 1218—this table contains information about the history of the assignment to project members of tasks associated with project tasks. This table maintains information about the project members that were previously assigned the tasks before the tasks were reassigned to other project members. nProjectTaskID are the IDs associated with the tasks. sLevel1TaskName are the names of the subtasks (member tasks) associated with the project. sMemberLabel are the project members that are assigned the subtasks. nRevNumber is the revision numbers of the assignment of tasks to project members. The nRevNumber shows the reassignment of the tasks in the project. The task assignment editor 102 (FIG. 1A) uses and/or updates information in the TaskAssignmentHistory table 1218.

Programming Package Diagrams for the Server

Figure 13:
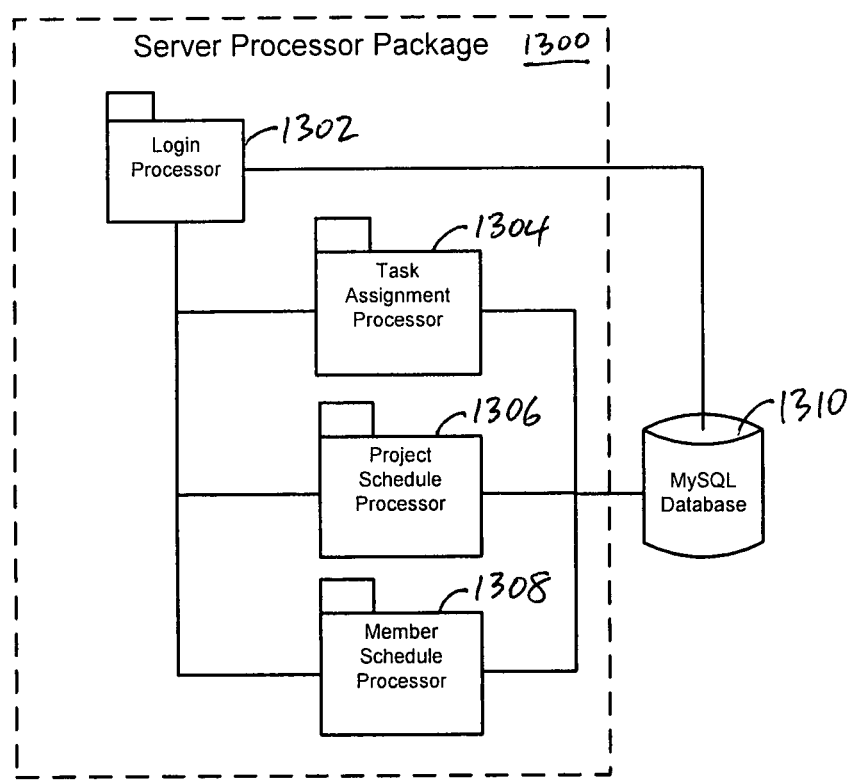
FIG. 13 is a diagram illustrating a programming package diagram of a server processor, according to an embodiment of the invention.

FIG. 13 is a diagram illustrating a programming package diagram of the server processor 604 of FIG. 6, according to an embodiment of the invention. The server processor package 1300 contains four packages, whereby each package corresponds to a web page/editor that is displayed to the user on the client processor 602 and through which the information entered by the user is processed when the user completes the login or editor session.

The LoginProcessor 1302 package provides the web page to display the form that allows a project member to log in to one of the editors. When the member submits the form, the LoginProcessor 1302 package processes the information entered by the member to validate the information. If the information is valid and if the member has the appropriate access privilege, the LoginProcessor 1302 package redirects the system to one of the packages corresponding to the editors.

The TaskAssignmentProcessor 1304 package provides the web page to display the task assignment editor 102 (FIG. 1A), which is used to add or modify the assignment of project tasks to project members. When the task assignment editor 102 is submitted, the TaskAssignmentProcessor 1304 package processes and stores the information from the task assignment editor 102 and creates the web page for the latest task assignment.

The ProjectScheduleProcessor 1306 package provides the web page to display the project schedule editor 202 (FIG. 2A), which is used to add or modify the schedule of project tasks. When the project schedule editor 202 is submitted, the ProjectScheduleProcessor 1306 package processes and stores the information from the project schedule editor 202 and creates the web page for the latest project schedule.

The MemberScheduleProcessor 1308 package provides the web page to display the member schedule editor 302 (FIG. 3A), which is used to add or modify the schedule of member tasks. When the member schedule editor 302 is submitted, the MemberScheduleProcessor 1308 package processes and stores the information from the member schedule editor 302 and creates the web page for the latest member schedule.

Except for the redirection of the LoginProcessor 1302 package to the editor packages, the processor packages are independent of each other and, generally, there is no interaction between the editor packages. Each of the processor packages 1302-1308 interacts with a database 1310 (e.g., databases 506, 536 of FIG. 5) to obtain, add, or update information. The Login Processor 1302 package accesses the database 1310 to determine if the member has access privileges. Each of the other processor packages 1304-1308 accesses the database 1310 to obtain task information to display in the corresponding editors and in the corresponding web page it generates, and to add or update corresponding task information. For a non-limiting example, the database 1310 may be implemented using MySQL; however, the database 1310 is not limited to implementation using MySQL.

According to an embodiment, each of the editor processor 1304-1308 packages comprises PHP script files, JavaScript files, and HTML files. The PHP script files obtain project and task information from the database 1310 and generate the JavaScript that displays the editor on the client processor 602 (FIG. 6). This allows the PHP script to interface with the JavaScript. JavaScript will create the editor and manage all the interactions between the editor and a project member. When the editor is submitted, the PHP script files process the information in the editors, and add or update the information in the database 1310, and create the web page corresponding to the editor.

Figure 14:
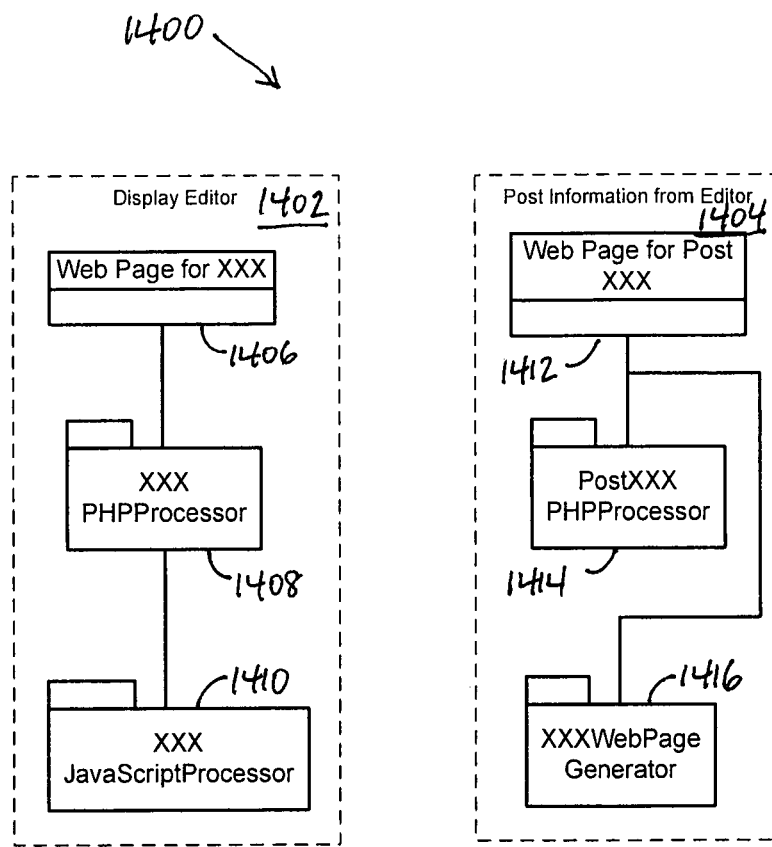
FIG. 14 is a diagram illustrating a programming package diagram of editor processor packages, according to an embodiment of the invention.

FIG. 14 is a diagram illustrating a programming package diagram of the editor processor 1304-1308 packages, according to an embodiment of the invention. According to an embodiment, the TaskAssignmentProcessor 1304, ProjectScheduleProcessor 1306, and MemberScheduleProcessor 1308 package all use this package diagram illustrated in FIG. 14. The package is divided into two major parts, the display editor 1402 being responsible for the display and management of the editor and the post information from editor 1404 being responsible for posting information in the editor and generating the web page.

The Web Page for XXX 1406 (where "XXX" refers to either TaskAssignment, ProjectSchedule, or MemberSchedule) integrates the following packages to display the editor. The web page 1406 includes all the PHP script files of a XXXPHPProcessor 1408 package and all the javascript files of a XXXJavaScriptProcessor 1410 package to display and manage the editor. All the PHP script files are processed on the web server (e.g., web server 507, 530 of FIG. 5) to obtain the task information from the database, and generate the Javascript that will interface with the XXXJavaScriptProcessor 1410 package. All the Javascript is executed in the web browser of the client processor 602 (FIG. 6) to provide for the initial display of the editor. All the JavaScript files are passed to the web browser of the client processor 602 to manage the editor, i.e., to handle all corresponding editing events.

The Web Page for PostXXX 1412 integrates the following packages that post the information and generate the post web page. The Web Page for PostXXX 1412 includes all the PHP script files of PostXXXPHPProcessor 1414 package to post the information from the editor and all the PHP script files of XXXWebPageGenerator 1416 package to create the web page. The PostXXXPHPProcessor 1414 package obtains all the task information from the editor and adds or updates the task information in the database. The XXXWebPageGenerator 1416 package obtains task information from the database to generate the appropriate web page.

Each of the packages of FIG. 14 provides a class that provides the interface for the package and manages the classes within the package. This allows the design within the package to be easily changed without affecting the other packages.

Member Schedule Processor Package

FIGS. 15 through 18 illustrate the class diagrams of the packages of FIG. 14 corresponding to the MemberScheduleProcessor 1308 package of FIG. 13, corresponding to the member schedule editor 302 (FIG. 3). These figures show the class design corresponding to the four packages of the display editor 1402 and the post information from editor 1404. The XXXPHPProcessor 1408 (FIG. 14) package obtains task assignment/schedule information from the database and generates the code for the initial display of the editor in the server processor 604 (FIG. 6). The XXXJavaScriptProcessor 1410 (FIG. 14) package displays, manages, and maintains the editor in client processor 602 (FIG. 6). The PostXXXPHPProcessor 1414 (FIG. 14) package post all the task assignment/schedule information from the editor session of the client processor 602 into the database of the server processor 604. The XXXWebPageGenerator 1416 (FIG. 14) package obtains the task assignment/schedule information from the database of the server processor 604 to generate the appropriate web page that will display the task information. These figures show the similarity in the design of the four packages among the three editors. Although the editors perform different tasks, the editors all follow a similar design pattern.

Figure 15:
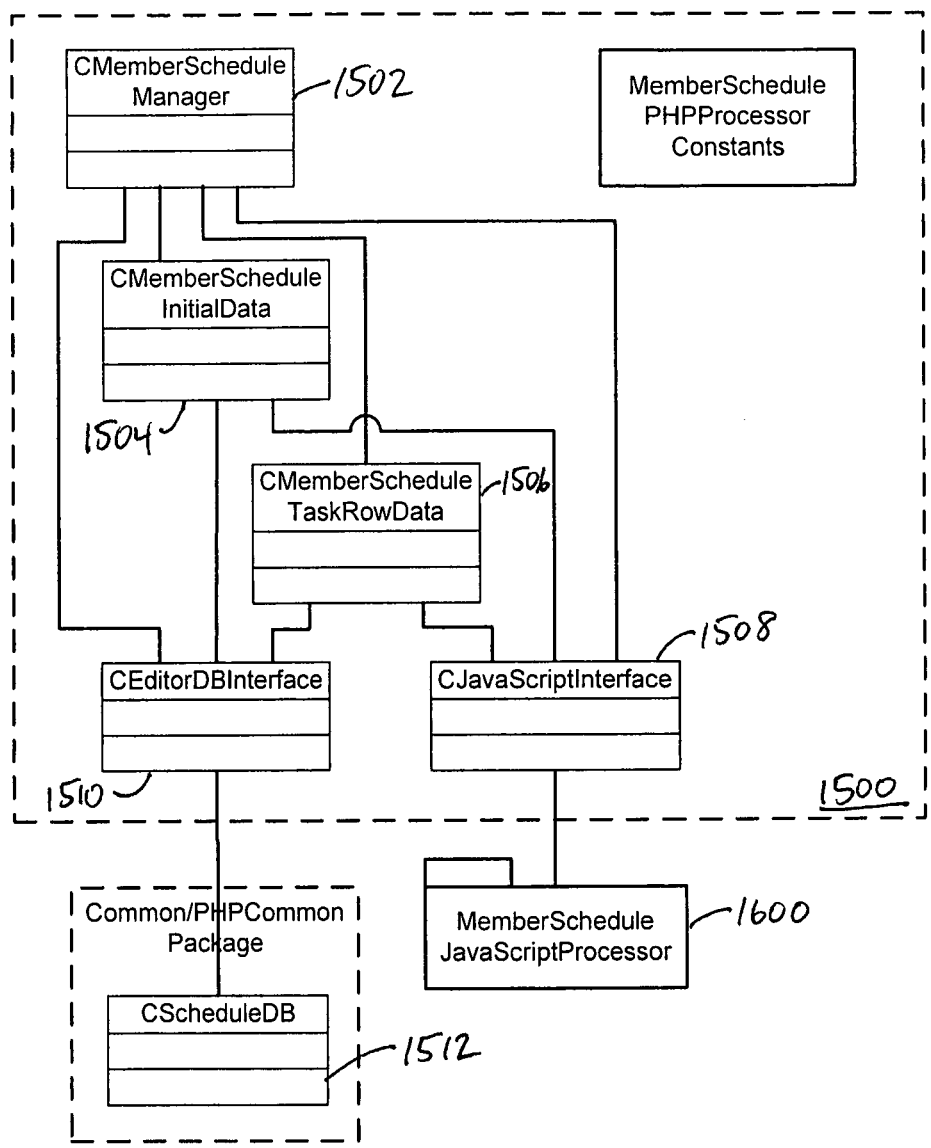
FIG. 15 illustrates a class diagram of a MemberSchedule-PHPProcessor package, according to an embodiment of the invention.

FIG. 15 illustrates a class diagram of the MemberSchedulePHPProcessor package 1500 (e.g., XXXPHPProcessor 1408 of FIG. 14), according to an embodiment of the invention. The MemberSchedulePHPProcessor package 1500 generates the Javascript interface that will display the initial member schedule editor 302 (FIG. 3A) in the web browser of the client processor 602 (FIG. 6).

The CMemberScheduleManager 1502 class provides an interface for the MemberSchedulePHPProcessor package 1500 and manages the classes in the MemberSchedulePHPProcessor package 1500 to generate the Javascript. The CMemberScheduleInitialData 1504 class generates the Javascript for setting the initial data in the editor. The initial data is the member tasks that are assigned to the project member, which the member can add to their schedule. The CMemberScheduleTaskRowData 1506 class generates the Javascript for displaying rows of member tasks that have been added to the member's schedule in previous editor sessions. The CJavaScriptInterface 1508 class generates the sequence of Javascript that creates the initial editor in the web browser and will interface with the MemberScheduleJavaScriptProcessor 1600 package of FIG. 16. The CEditorDBInterface 1510 class accesses information from the database that will be displayed in the editor. CEditorDBInterface 1510 generates the appropriate database queries to obtain the desired information for display. CEditorDBInterface 1510 interfaces with CScheduleDB 1512 to access the database. CMemberScheduleInitialData 1504 and CMemberScheduleTaskRowData 1506 obtain task information from the database through CEditorDBInterface 1510. According to one embodiment, the foregoing classes for MemberSchedulePHPProcessor package are implemented in PHP script.

Figure 16:
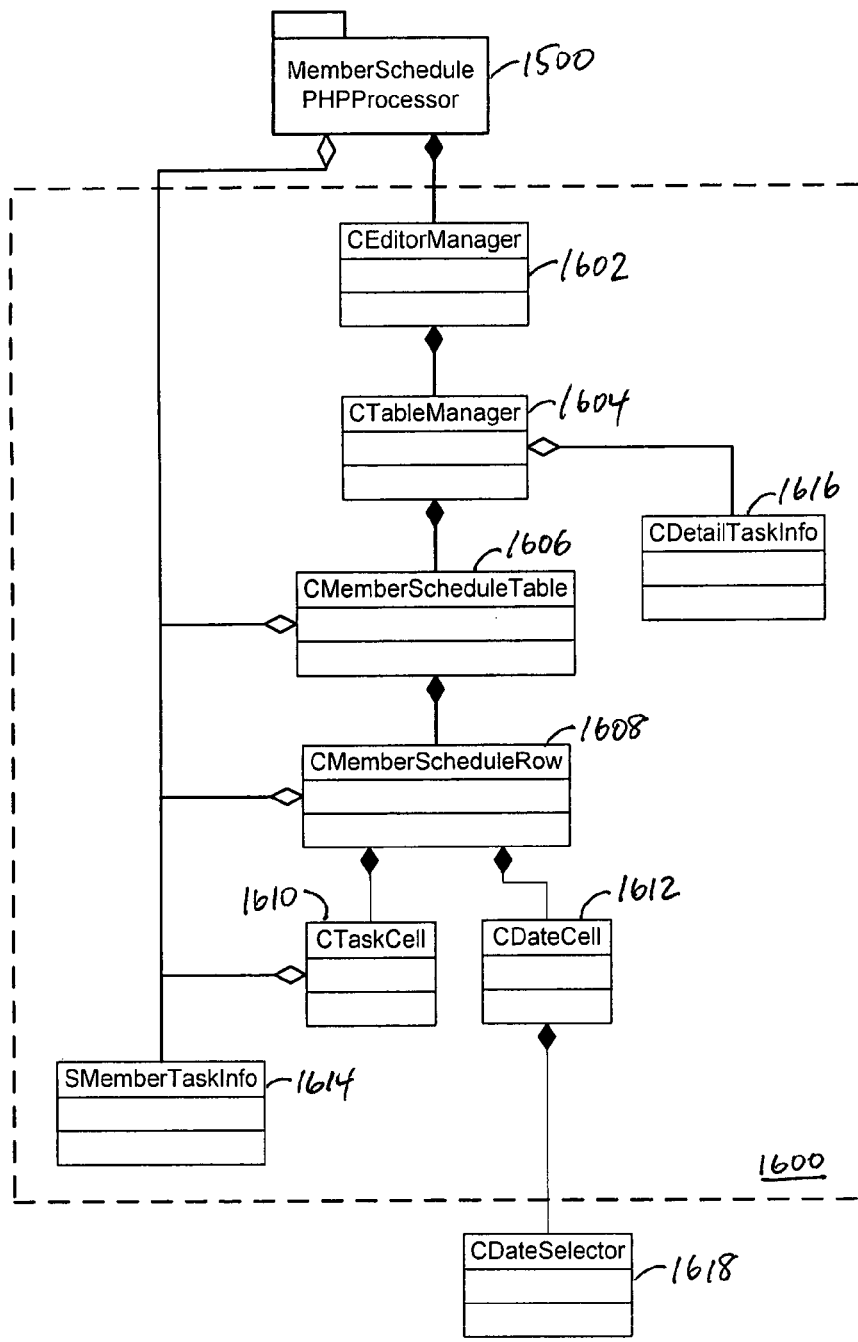
FIG. 16 illustrates a class diagram of a MemberSchedule-JavaScriptProcessor package, according to an embodiment of the invention.

FIG. 16 illustrates a class diagram of the MemberScheduleJavaScriptProcessor package 1600 (e.g., XXXJavaScriptProcessor 1410 of FIG. 14), according to an embodiment of the invention. The MemberScheduleJavaScriptProcessor package 1600 manages the member schedule editor 302 (FIG. 3A) in the web browser of the client processor 602 (FIG. 6).

The CEditorManager 1602 class provides the interface for this package and creates the web page and form for the member schedule editor 302. The CTableManager 1604 class creates the table for the member schedule editor 302 and manages all events that affect the table. The CMemberScheduleTable 1606 class initializes and manages the table for the member schedule editor 302 and creates and manages the rows of the table. The CMemberScheduleRow 1608 class initializes and manages a row of the table for the member schedule editor 302, manages all events that affect the row, and creates and manages the cells in the row. The CTaskCell 1610 class initializes and manages the task cell of a row and maintains information about a task. The CDateCell 1612 class initializes and manages the date cell of a row and maintains information about the schedule of a task. The structure SMemberTaskInfo 1614 allows member task information to be passed from the MemberSchedulePHPProcessor 1500 package to the MemberScheduleJavaScriptProcessor 1600 package to display the tasks in the editor. The CDetailTaskInfo 1616 class stores and maintains information about the detailed tasks of a task and is used to update the schedule of a task with its subtasks. CDateCell 1612 contains CDateSelector 1618 to display month, day, and year menu selections in the date cells. According to one embodiment, all the foregoing classes and structures of the MemberScheduleJavaScriptProcessor 1600 package are implemented in Javascript.

Figure 17:
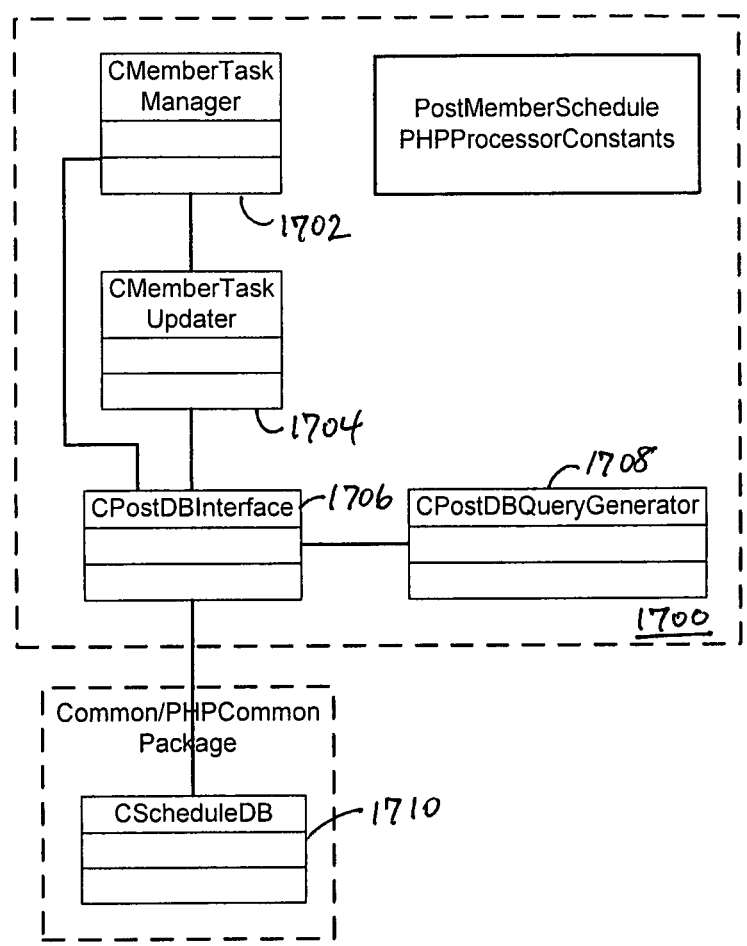
FIG. 17 illustrates a class diagram of a PostMemberSchedulePHPProcessor package, according to an embodiment of the invention.

FIG. 17 illustrates a class diagram of the PostMemberSchedulePHPProcessor package 1700 (e.g., PostXXXPHPProcessor 1414 of FIG. 14), according to an embodiment of the invention. The CMemberTaskManager 1702 class provides the interface for this package and manages all other classes in the package. CMemberTaskManager 1702 determines the actions to perform on each task from the editor. The CMemberTaskUpdater 1704 class updates the schedule of a task in the database. The updates include editing the plan dates, updating the actual dates, obsoleting a task, and adding a new task. The class CPostDBInterface 1706 provides an interface for the classes to obtain information and update information in the database. The CPostDBQueryGenerator 1708 class creates the SQL database queries for CPostDBInterface 1706. CPostDBInterface 1706 interfaces with the CScheduleDB 1710 to access the database. CMemberTaskUpdater 1704 updates task information in the database through CPostDBInterface 1706. According to an embodiment, the foregoing classes of the PostMemberSchedulePHPProcessor package 1700 are implemented in PHP script.

Figure 18:
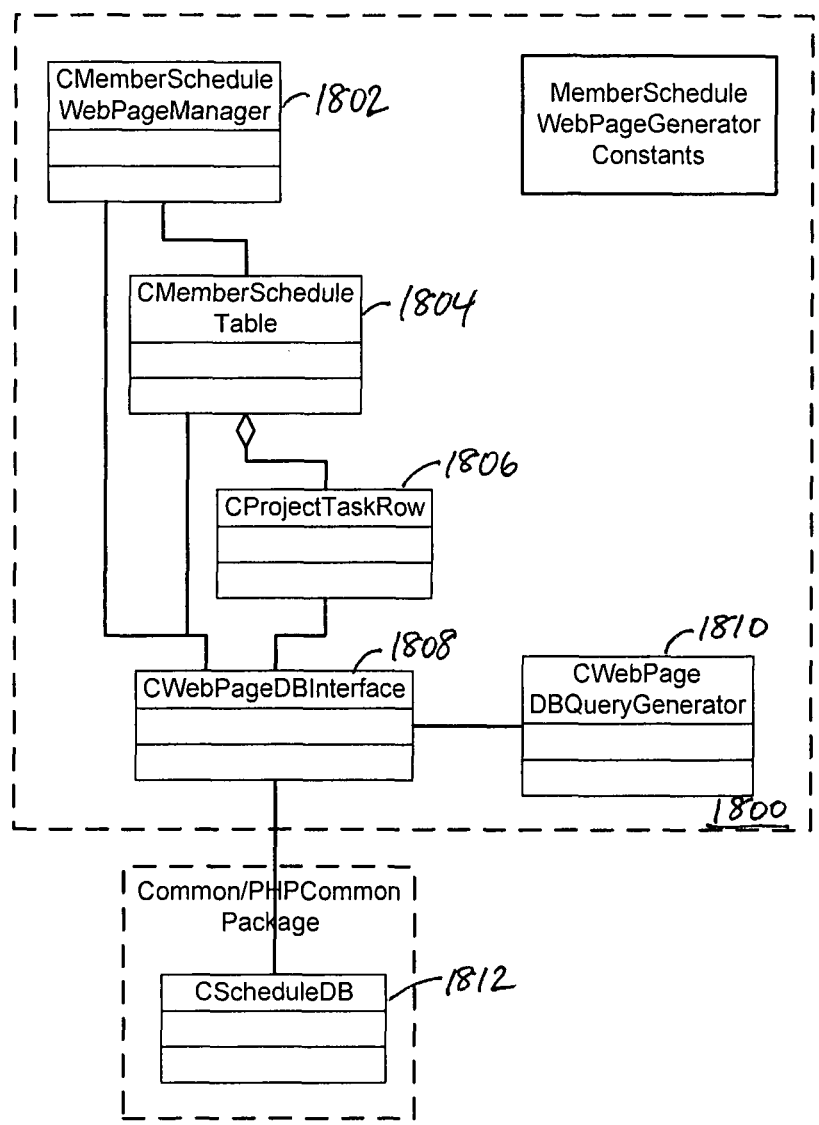
FIG. 18 illustrates a class diagram of a MemberScheduleWebPageGenerator package, according to an embodiment of the invention.

FIG. 18 illustrates a class diagram of the MemberScheduleWebPageGenerator package 1800 (e.g., XXXWebPageProcessor 1416 of FIG. 14), according to an embodiment of the invention. The CMemberScheduleWebPageManager 1802 class provides the interface for this package to generate the member schedule web page. CMemberScheduleTable 1804 creates the table for the member schedule web page. The CProjectTaskRow 1806 creates the task rows within the table. The class CWebPageDBInterface 1808 provides an interface for the classes to obtain information in the database. The class CWebPageDBQueryGenerator 1810 creates the SQL database queries for CWebPageDBInterface 1808. CWebPageDBInterface 1808 interfaces with the CScheduleDB 1812 to access the database. CMemberScheduleTable 1804 and CProjectTaskRow 1806 obtain task information from the database through CWebPageDBInterface 1808. According to an embodiment, the foregoing classes of the MemberScheduleWebPageGenerator 1800 package are implemented in PHP script.

Table 1 illustrates a document object model representation of the member schedule editor 302 (FIG. 3), according to an embodiment of the invention. Table 1 describes the elements that make up the member schedule editor 302 and corresponding element names and id properties. Some of the elements correspond to parts of the editor that are displayed in the editor such as the table element, row element, cell element, checkbox input element, input text element, and select element. Some of the elements are used to store rather than display information such as the hidden input elements. The elements that store information or receive information from the user are important for passing information to the server processor to post task information from the editor session. The Document Object Model (DOM) is described in "JavaScript: the Definitive Guide", Fourth Edition, by David Flanagan and published by O'Reilly & Associates, Inc., the content of which is incorporated by reference in its entirety for all purposes as if fully set forth herein.

Each element constituent to an editor can be accessed through its id and the properties of the elements can be set to change the value and/or the display of the element. According to an embodiment, for each of the elements in the member schedule editor 302, the element is wrapped within one of the classes of the MemberScheduleJavaScriptProcessor 1600 package of FIG. 16. The elements are attributes of the class. Hence, the member functions of the class have direct access to the elements and modify their properties as needed. With the class having direct access to the elements, there is no need to obtain the elements using their ids.

TABLE 1

Form Element
id = "MemberScheduleFormID"
Table Element
id = "MemberScheduleTableID"
Row Element
id = row_id + "_RowID"

| Task Cell Element id = row_id + "_TaskCellID" CheckBox Element id = row_id + "_CheckBoxID" name = row_id + "_CheckBox" Project Task Selection Element id = row_id + "_ProjectTaskSelectID" name = row_id + "_ProjectTaskSelect" Task Name Input Text Element id = row_id + "_TaskInputBoxID" | Set Date Cell Element id = row_id + "_SetDateCellID" Set Date Hidden Input Element id = row_id + "_HID_SetDateID" name = row_id + "_HID_SetDate" | Planned Start Date Cell Element id = row_id + "_PlanStartDateCellID" Planned Start Date Hidden Input Element id = row_id + "_HID_PlanStartDateID" name = row_id + "_HID_PlanStartDate" Selection Element id = row_id + "_PlanStartMonthID" name = row_id + | Planned End Date Cell Element id = row_id + "_PlanEndCellID" Planned End Date Hidden Input Element id = row_id + "_HID_PlanEndDateID" name = row_id + "_HID_PlanEndDate" Selection Element id = row_id + "_PlanEndMonthID" name = row_id + | Actual Start Date Cell Element id = row_id + "_ActualStartCellID" Actual Start Date Hidden Input Element id = row_id + "_HID_ActualStartDateID" name = row_id + "_HID_ActualStartDate" Selection Element id = row_id + "_ActualStartMonthID" name = row_id + | Actual End Date Cell Element id = row_id + "_ActualEndCellID" Actual End Date Hidden Input Element id = row_id + "_HID_ActualEndDateID" name = row_id + "_HID_ActualEndDate" Selection Element id = row_id + "_ActualEndMonthID" name = row_id + |
| --- | --- | --- | --- | --- | --- |

TABLE 1-continued

| | | | | |
|---|---|---|---|---|
| name = row_id + "_TaskInputBox" Action On Task Hidden Input Element id = row_id + "_HID_ActionOnTaskID" name = row_id + "_HID_ActionOnTask" ID of Task Hidden Input Element id = row_id + "_HID_IDofTaskID" name = row_id + "_HID_IDofTask" ID of Parent Task Hidden Input Element id = row_id + "_HID_IDofParentTaskID" name = row_id + "_HID_IDofParentTask" Revision Number of Task Hidden Element id = row_id + "_HID_RevNumberID" name = row_id + "_HID_RevNumber" Name of Task Hidden Input Element id = row_id + "_HID_TaskNameID" name = row_id + "_HID_TaskName" Level of Task Hidden Input Element id = row_id + "_HID_TaskLevelID" name = row_id + "_HID_TaskLevel" Number of Detailed Task Hidden Input Element id = row_id + "_HID_NumOfDetailedTaskID" name = row_id + "_HID_NumOfDetailed-Task" Number of Rows Menu Selection Element id = "AddRowSelectID" | "_PlanStartMonth" Selection Element id = row_id + "_PlanStartDayID" name = row_id + "_PlanStartDay" Selection Element id = row_id + "_PlanStartYearID" name = row_id + "_PlanStartYear" | "_PlanEndMonth" Selection Element id = row_id + "_PlanEndDayID" name = row_id + "_PlanEndDay" Selection Element id = row_id + "_PlanEndYearID" name = row_id + "_PlanEndYear" | "_ActualStartMonth" Selection Element id = row_id + "_ActualStartDayID" name = row_id + "_ActualStartDay" Selection Element id = row_id + "_ActualStartYearID" name = row_id + "_ActualStartYear" | "_ActualEndMonth" Selection Element id = row_id + "_ActualEndDayID" name = row_id + "_ActualEndDay" Selection Element id = row_id + "_ActualEndYearID" name = row_id + "_ActualEndYear" |

Table 2 below illustrates the attribute members of the CTaskCell 1610 class of the MemberScheduleJavaScript Processor 1600 package shown in FIG. 16, according to an embodiment of the invention. CTaskCell 1610 can obtain and set values of the properties of all the elements it contains.

TABLE 2

| Type | Attribute Name | Description |
|---|---|---|
| HTMLCellElement | m_TaskCellElement | This attribute member is an object for the cell element that contains task information |
| HTMLInputElement | m_TaskNameHiddenElement | This attribute member is an object for the hidden input element containing information about the task name. |
| HTMLInputElement | m_LevelOfTaskHiddenElement | This attribute member is an object for the hidden input element containing information about the level of the task. |
| HTMLInputElement | m_NumOfDetailsHiddenElement | This attribute member is an object for the hidden input element containing information about the highest possible number of detail tasks the task currently has. A task can have from 0 to the value of the hidden element of detailed tasks. |
| HTMLInputElement | m_ActionOnTaskHiddenElement | This attribute member is an object for the hidden input element containing information about the action taken on the task. |
| HTMLInputElement | m_IDOfTaskHiddenElement | This attribute member is an object for the hidden input element containing information about the ID of the task. |

TABLE 2-continued

| Type | Attribute Name | Description |
| --- | --- | --- |
| HTMLInputElement | m_IDOfParentTaskHiddenElement | This attribute member is an object for the hidden input element containing information about the task ID of its parent task. |
| HTMLInputElement | m_SelectedIndexHiddenElement | This attribute member is an object for the hidden input element containing information about the index of the selected task in the task select element. |
| HTMLInputElement | m_TaskNameInputElement | This attribute member is an object for the input element corresponding to an input text box that lets the project member input a task. |
| HTMLSelectElement | m_TaskNameSelectElement | This attribute member is an object for the select element that lets the project member select a project task to schedule. This element is initialized with unscheduled project tasks obtained from the database during the setup of the editor. |
| TextNode | m_TaskNameTextNode | This attribute member is an object for the text node that will display the task name in the task cell. |
| String | m_sRowID | This attribute member is a string for the row id of the row. |

Project Schedule Processor Package

FIGS. 19 through 22 illustrate the class diagrams of the packages of FIG. 14 corresponding to the ProjectScheduleProcessor 1310 package of FIG. 13, corresponding to the project schedule editor 202 (FIG. 2A). These figures show the class design corresponding to the four packages of the display editor 1402 and the post information from editor 1404. The XXXPHPProcessor 1408 (FIG. 14) package obtains task assignment/schedule information from the database and generates the code for the initial display of the editor in the server processor 604 (FIG. 6). The XXXJavaScriptProcessor 1410 (FIG. 14) package displays, manages, and maintains the editor in client processor 602 (FIG. 6). The PostXXXPHPProcessor 1414 (FIG. 14) package posts all the task assignment/schedule information from the editor session of the client processor 602 into the database of the server processor 604. The XXXWebPageGenerator 1416 (FIG. 14) package obtains the task assignment/schedule information from the database of the server processor 604 to generate the appropriate web page that will display the task information. These figures show the similarity in the design of the four packages among the three editors. Although the editors perform different tasks, they all follow a similar design pattern.

Figure 19:
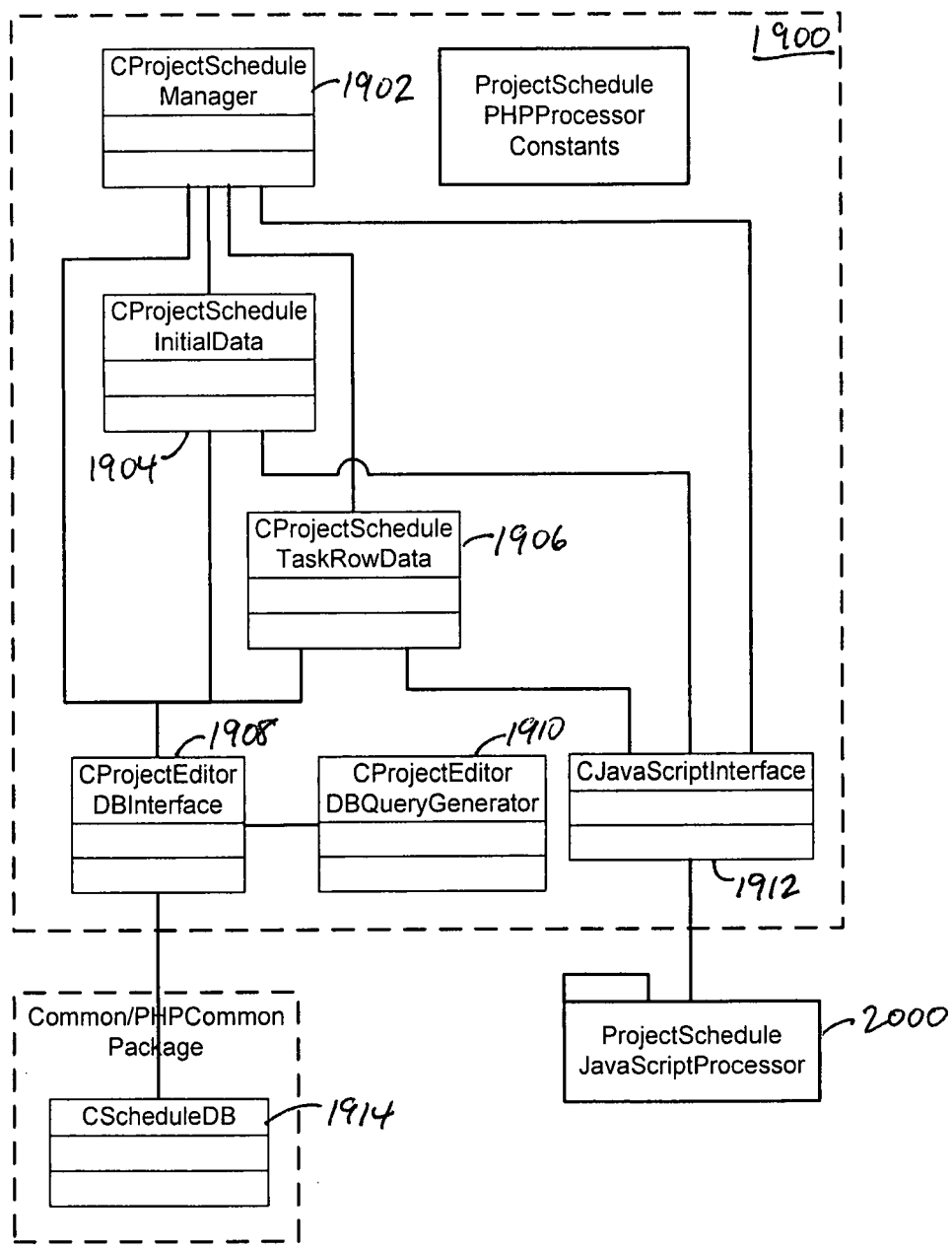
FIG. 19 illustrates a class diagram of a ProjectSchedule-PHPProcessor package, according to an embodiment of the invention.

FIG. 19 illustrates a class diagram of the ProjectSchedulePHPProcessor package 1900 (e.g., XXXPHPProcessor 1408 of FIG. 14), according to an embodiment of the invention. The ProjectSchedulePHPProcessor package 1900 generates the Javascript interface that will display the initial project schedule editor 202 (FIG. 2A) in the web browser of the client processor 602 (FIG. 6).

The CProjectScheduleManager 1902 class provides an interface for the ProjectSchedulePHPProcessor package 1900 and manages the classes in the ProjectSchedulePHPProcessor package 1900 to generate the Javascript. The CProjectScheduleInitialData 1904 class generates the Javascript for setting the initial data in the editor. The initial data is the project tasks that can be added to the project schedule. The CProjectScheduleTaskRowData 1906 class generates the Javascript for displaying rows of project tasks along with corresponding member tasks that have been added to the member's schedule in previous editor sessions. The CJavaScriptInterface 1912 class generates the sequence of Javascript that creates the initial editor in the web browser and interfaces with the ProjectScheduleJavaScriptProcessor 2000 package. The CProjectEditorDBInterface 1908 class accesses information from the database that will be displayed in the editor. The CProjectEditorDBQueryGenerator 1910 class creates the SQL database queries for CProjectEditorDBInteface 1908. CProjectEditorDBInterface 1908 interfaces with CScheduleDB 1914 to access the database. CProjectScheduleInitialData 1904 and CProjectScheduleTaskRowData 1906 obtain task information from the database through CProjectEditorDBInterface 1908. According to an embodiment, the foregoing classes for ProjectSchedulePHPProcessor 1900 package are implemented in PHP script.

Figure 20:
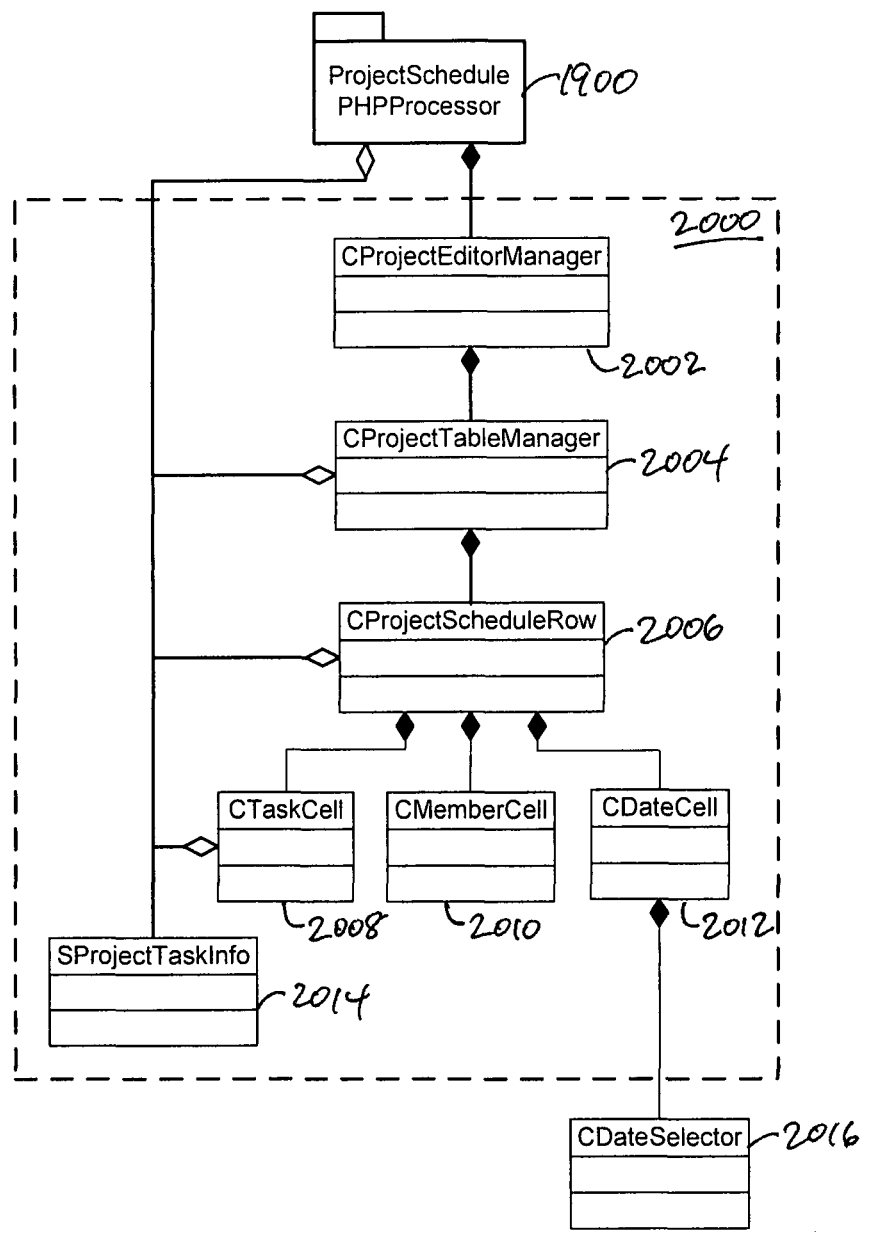
FIG. 20 illustrates a class diagram of a ProjectScheduleJavaScriptProcessor package, according to an embodiment of the invention.

FIG. 20 illustrates a class diagram of the ProjectScheduleJavaScriptProcessor package 2000 (e.g., PostXXXJavaScriptProcessor 1410 of FIG. 14), according to an embodiment of the invention. The ProjectScheduleJavaScriptProcessor package 2000 manages the project schedule editor 202 (FIG. 2A) in the browser. The CProjectEditorManager 2002 class provides the interface for this package and creates the web page and form for the project schedule editor 202. The CProjectTableManager 2004 class creates, initializes, and manages the table for the project schedule editor 202 and manages all events that affect the table. CProjectTableManager 2004 also creates and manages the rows of the table. The CProjectScheduleRow 2006 class initializes and manages a row of the table for the project schedule editor 202, manages all events that affect the row, and creates and manages the cells in the row. The CTaskCell 2008 class initializes and manages the task cell of a row. The CMemberCell 2010 class initializes and manages the member cell of a row. The CDateCell 2012 class initializes and manages the date cell of a row. The structure SProjectTaskInfo 2014 allows project/member task information to be passed from the ProjectSchedulePHPProcessor 1900 package to the ProjectScheduleJavaScriptProcessor 2000 package to display the project task and its member task schedule in the project schedule editor 202. CDateCell 2012 contains CDateSelector 2016 to display month, day, and year menu selections in the plan/actual date cells. According to an embodiment, the foregoing classes and structures of the ProjectScheduleJavaScriptProcessor package 2000 are implemented in Javascript.

Figure 21:
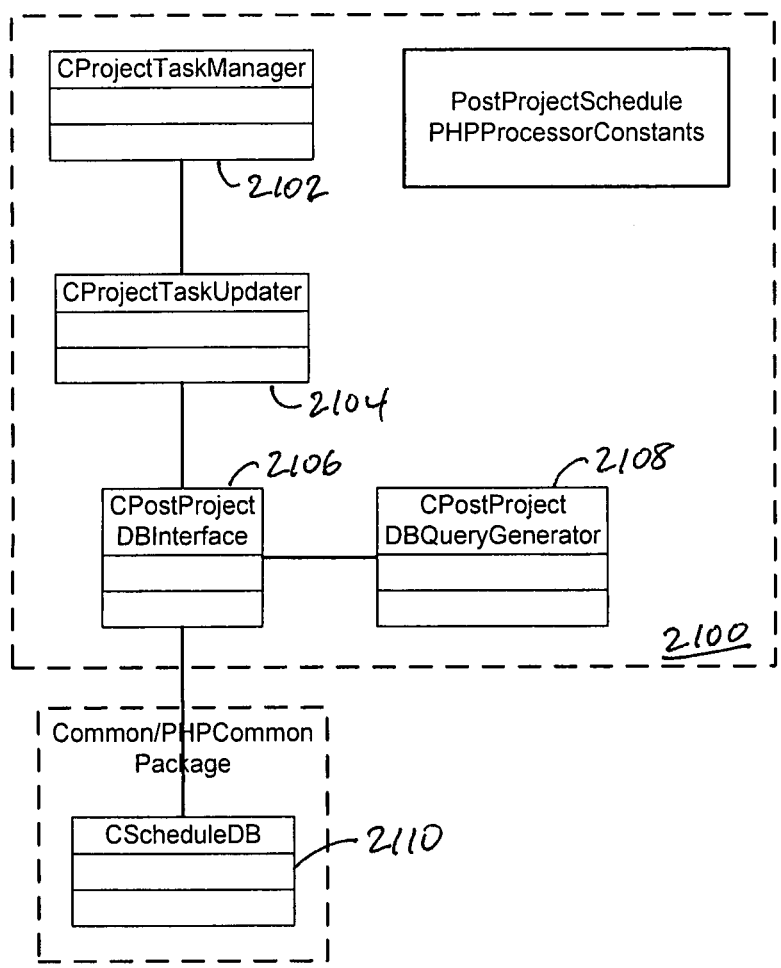
FIG. 21 illustrates a class diagram of a PostProjectSchedulePHPProcessor package, according to an embodiment of the invention.

FIG. 21 illustrates a class diagram of the PostProjectSchedulePHPProcessor 2100 package (e.g., PostXXXPHPProcessor 1414 of FIG. 14), according to an embodiment of the invention. The CProjectTaskManager 2102 class provides the interface for this package and manages all other classes in the package. CProjectTaskManager 2102 determines the actions to perform on each project task from the project schedule editor 202. The CProjectTaskUpdater 2104 class updates the schedule of a project task in the database. The updates include adding or updating the schedule of a project task. The CProjectTaskUpdater 2104 class consolidates the project tasks with the members' tasks and updates the project tasks in the database. The CPostProjectDBInterface 2106 provides an interface for the classes to obtain information and update information in the database. The CPostProjectDBQueryGenerator 2108 class creates the SQL database queries for CPostProjectDBInterface 2106. CPostProjectDBInterface 2106 interfaces with the CScheduleDB 2110 to access the database. CProjectTaskUpdater 2104 updates task information in the database through CPostProjectDBInterface 2106. According to an embodiment, the foregoing classes for PostProjectSchedulePHPProcessor 2100 package are implemented in PHP script.

Figure 22:
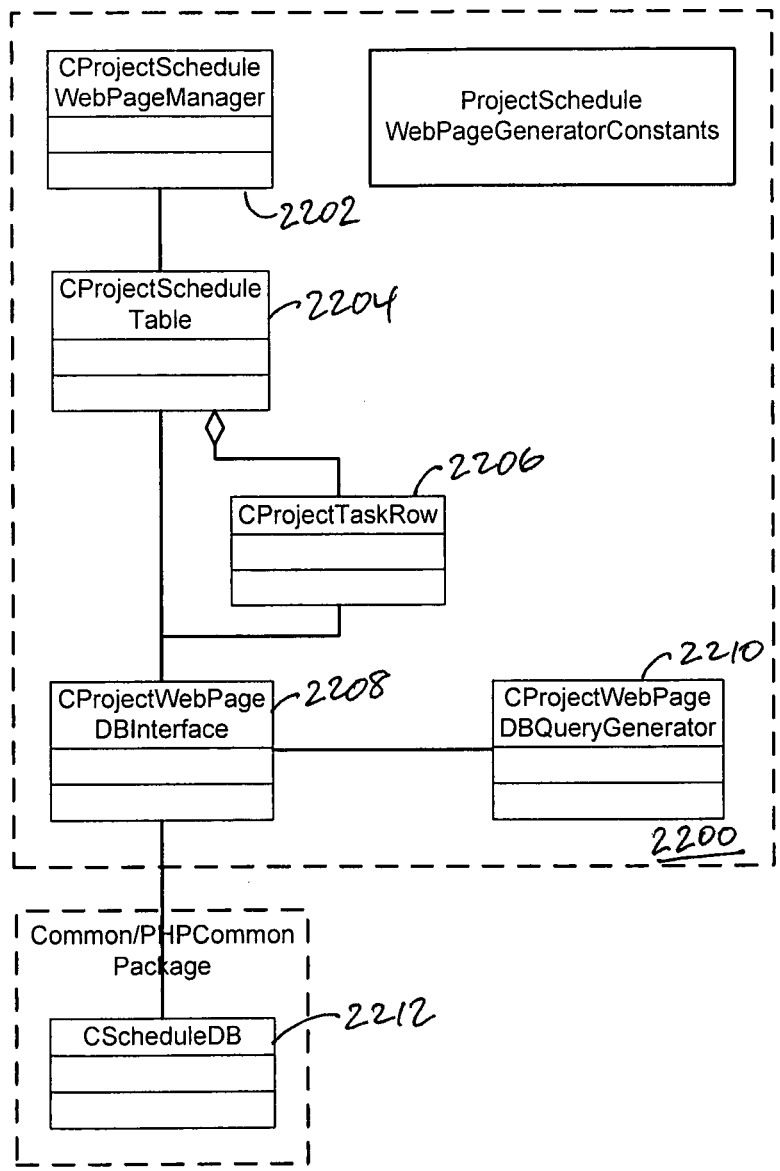
FIG. 22 illustrates a class diagram of a ProjectScheduleWebPageGenerator package, according to an embodiment of the invention.

FIG. 22 illustrates a class diagram of the ProjectScheduleWebPageGenerator 2200 package (e.g., XXX-WebPageProcessor 1416 of FIG. 14), according to an embodiment of the invention. The CProjectScheduleWebPageManager 2202 class provides the interface for this package to generate the project schedule web page. CProjectScheduleTable 2204 creates the table for the project schedule web page. The CProjectTaskRow 2206 class creates the project and member task rows within the table. The CProjectWebPageDBInteface 2208 class provides an interface for the classes to obtain information from the database. The CProjectWebPageDBQueryGenerator 2210 class creates the SQL database queries for CProjectWebPageDBInteface 2208. CProjectWebPageDBInteface 2208 interfaces with CScheduleDB 2212 to access the database. CProjectScheduleTable 2204 and CProjectTaskRow 2206 obtains task information from the database through CProjectWebPageDBInteface 2208. According to an embodiment, the foregoing classes for the ProjectScheduleWebPageGenerator 2200 package are implemented in PHP script.

Table 3 illustrates the document object model representation of the project schedule editor 202 (FIG. 2A), according to an embodiment of the invention. Table 3 describes the elements that make up the project schedule editor 202 and corresponding element names and id properties. Each element can be accessed through its id and the properties of the element can be set to change the value and/or the display of the element. According to an embodiment, for each of the elements in the project schedule editor 202, the element is wrapped within one of the classes of the ProjectScheduleJavaScriptProcessor 2000 package of FIG. 20. The elements are attributes of the class. Hence, the member functions of the class will have direct access to the elements and modify their properties as needed. With the class having direct access to the elements, there is no need to obtain the elements using their ids.

TABLE 3

Form Element
id = "ProjectScheduleFormID"
Table Element
id = "ProjectScheduleTableID"
Row Element
id = row_id + "_RowID"
Task Cell Element    Set Date Cell    Planned Start Date    Planned End Date Cell    Actual Start Date Cell    Actual End Date Cell Table 4 illustrates the attribute members of the class CTaskCell 2008 of the ProjectScheduleJavaScriptProcessor 2000 package shown in FIG. 20, according to an embodiment of the invention. CTaskCell 2008 can obtain and set values of the properties of all the elements it contains.

TABLE 4

| Type | Attribute Name | Description |
| --- | --- | --- |
| HTMLCellElement | m_TaskCellElement | This attribute member is an object for the cell element that contains task information |
| HTMLInputElement | m_TaskNameHiddenElement | This attribute member is an object for the hidden input element containing information about the task name. |
| HTMLInputElement | m_NumOfDetailsHiddenElement | This attribute member is an object for the hidden input element containing information about the number of member tasks the project task has. |
| HTMLInputElement | m_ActionOnTaskHiddenElement | This attribute member is an object for the hidden input element containing information about the action taken on the task. |
| HTMLInputElement | m_IDOfTaskHiddenElement | This attribute member is an object for the hidden input element containing information about the ID of the task. |
| HTMLInputElement | m_SelectedIndexHiddenElement | This attribute member is an object for the hidden input element containing information about the index of the selected task in the task select element. |
| HTMLInputElement | m_TaskNameInputElement | This attribute member is an object for the input element corresponding to an input text box that lets the project member input a task. |
| HTMLSelectElement | m_TaskNameSelectElement | This attribute member is an object for the select element that lets the project member select a project task to schedule. This element is initialized with unassigned project tasks obtained from the database during the setup of the editor. |

TABLE 4-continued

| Type | Attribute Name | Description |
|---|---|---|
| String | m_sRowID | This attribute member is a string for the row id of the row. |

Task Assignment Processor Package

FIGS. 23 through 26 illustrate the class diagrams of the packages of FIG. 14 corresponding to the TaskAssignmentProcessor package of FIG. 13, corresponding to the task assignment editor 102 (FIG. 1A). These figures show the class design corresponding to the four packages of the display editor 1402 and the post information from editor 1404. The XXXPHPProcessor 1408 (FIG. 14) package obtains task assignment/schedule information from the database and generates the code for the initial display of the editor in the server processor 604 (FIG. 6). The XXXJavaScriptProcessor 1410 (FIG. 14) package displays, manages, and maintains the editor in client processor 602 (FIG. 6). The PostXXXPHPProcessor 1414 (FIG. 14) package posts all the task assignment/schedule information from the editor session of the client processor 602 into the database of the server processor 604. The XXXWebPageGenerator 1416 (FIG. 14) package obtains the task assignment/schedule information from the database of the server processor 604 to generate the appropriate web page that will display the task information. These figures show the similarity in the design of the four packages among the three editors. Although the editors perform different tasks, they all follow a similar design pattern.

Figure 23:
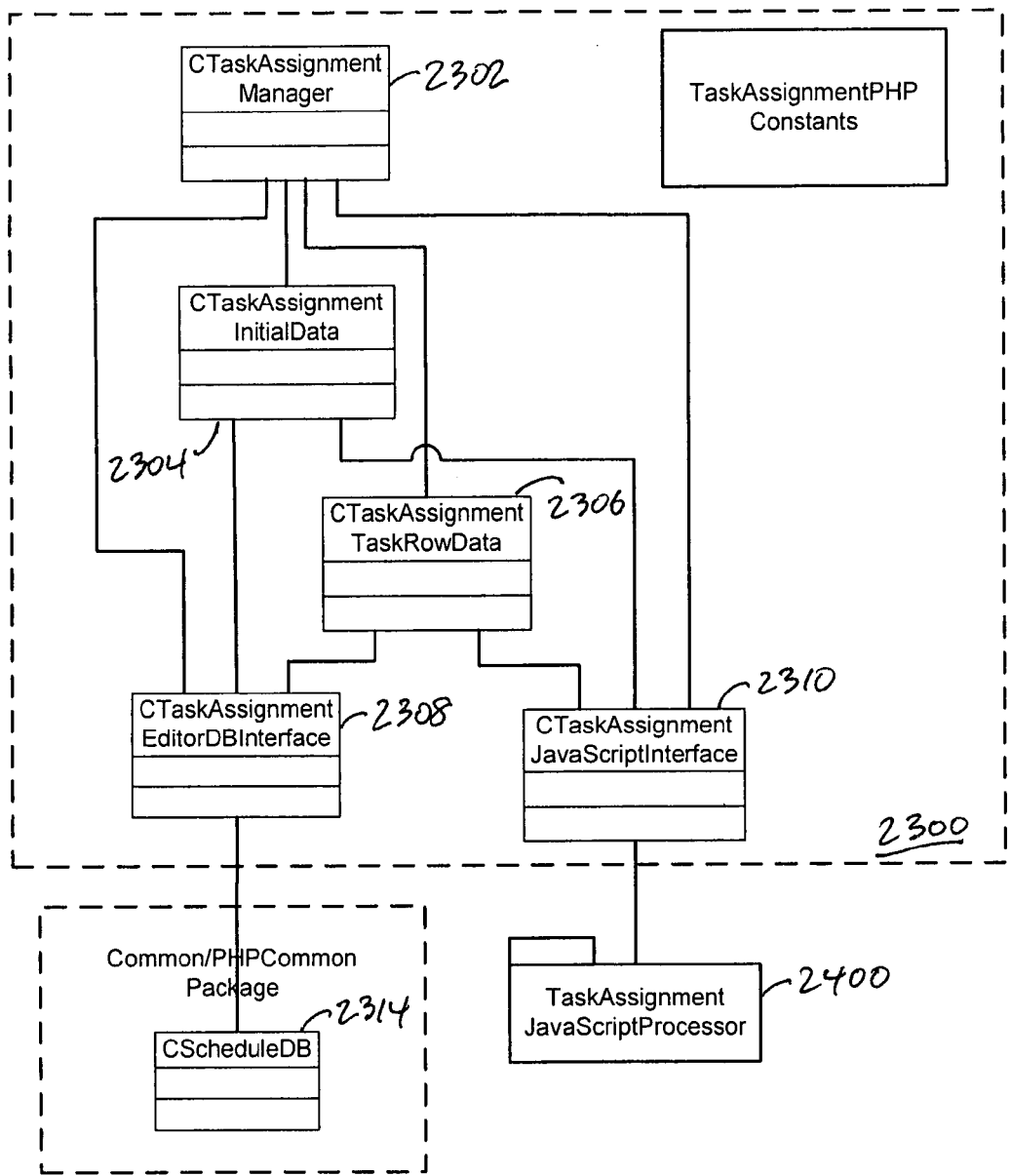
FIG. 23 illustrates a class diagram of a TaskAssignmentPHPProcessor package, according to an embodiment of the invention.

FIG. 23 illustrates a class diagram of the TaskAssignmentPHPProcessor 2300 package (e.g., XXXPHPProcessor 1408 of FIG. 14), according to an embodiment of the invention. The TaskAssignmentPHPProcessor 2300 package generates the Javascript interface that will display the initial task assignment editor 102 (FIG. 1A) in the web browser of the client processor 602 (FIG. 6).

The CTaskAssignmentManager 2302 class provides an interface for the TaskAssignmentPHPProcessor 2300 package and manages all classes in the package to generate the Javascript. The CTaskAssignmentInitialData 2304 class generates the Javascript for setting the initial data in the task assignment editor 102 (FIG. 1A). The initial data is the project tasks that can be added to the project schedule and be assigned to members. The CTaskAssignmentTaskRowData 2306 class generates the Javascript for displaying rows of project tasks along with its member tasks and the member assigned to the tasks that have been assigned in previous editor sessions. The CTaskAssignmentJavaScriptInterface 2310 class generates the sequence of Javascript that creates the initial task assignment editor 102 in the web browser and interfaces with the TaskAssignmentJavaScriptProcessor 2400 package. The CTaskAssignmentEditorDBInterface 2308 accesses information from the database that will be displayed in the editor. CTaskAssignmentEditorDBInterface 2308 generates the appropriate queries to obtain the desired information for display. CTaskAssignmentEditorDBInterface 2308 interfaces with CScheduleDB 2314 to access the database. CTaskAssignmentInitialData 2304 and CTaskAssignmentTaskRowData 2306 obtain task information from the database through CTaskAssignmentEditorDBInterface 2308. According to an embodiment, the foregoing classes for the TaskAssignmentPHPProcessor 2300 package are implemented in PHP script.

Figure 24:
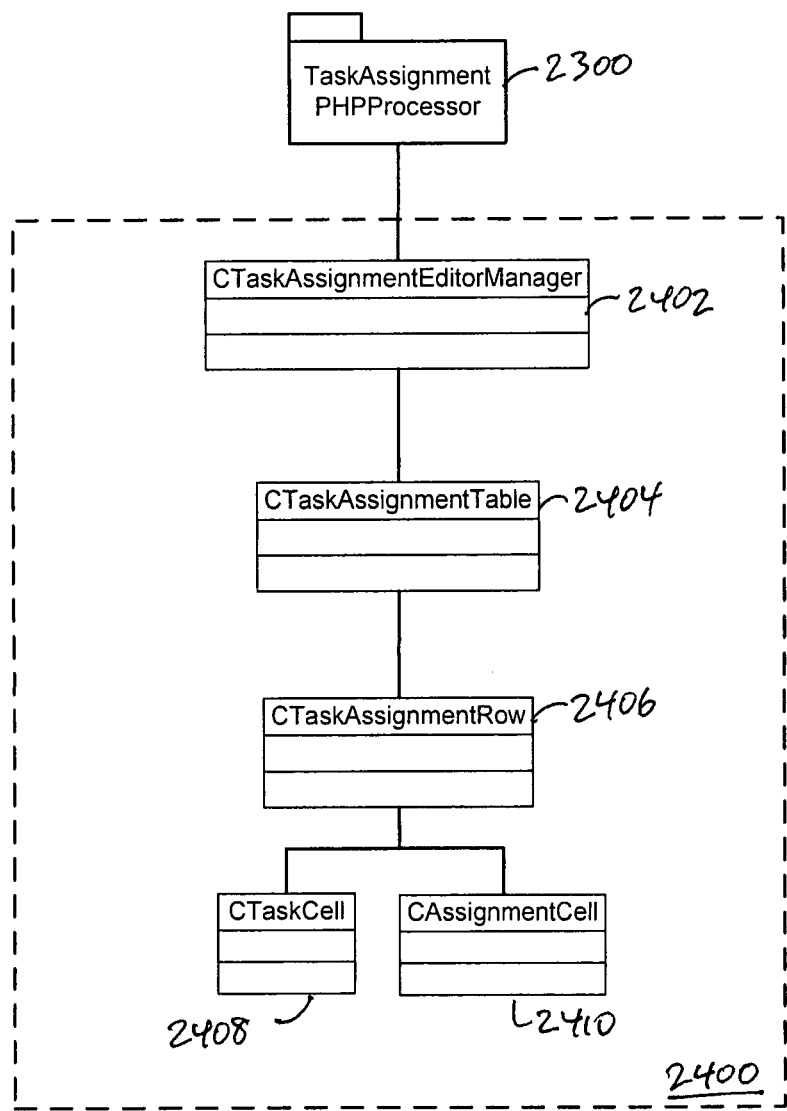
FIG. 24 illustrates a class diagram of a TaskAssignmentJavaScriptProcessor package, according to an embodiment of the invention.

FIG. 24 illustrates a class diagram of the TaskAssignmentJavaScriptProcessor 2400 package (e.g., PostXXXJavaScriptProcessor 1410 of FIG. 14), according to an embodiment of the invention. The TaskAssignmentJavaScriptProcessor 2400 package manages the task assignment editor 102 (FIG. 1A) in the browser. The CTaskAssignmentEditorManager 2402 class provides the interface for this package and creates the web page and form for the task assignment editor 102. The CTaskAssignmentTable 2404 class creates, initializes, and manages the table for the task assignment editor 102 and manages all events that affect the table. CTaskAssignmentTable 2404 also creates and manages the rows of the table. The CTaskAssignmentRow 2406 class initializes and manages a row of the table for the task assignment editor 102, manages all events that affect the row, and creates and manages the cells in the row. The CTaskCell 2408 class initializes and manages the task cell of a row. The CAssignmentCell 2410 class initializes and manages the assignment cell of a row. According to an embodiment, the foregoing classes and structures for the TaskAssignmentJavaScriptProcessor 2400 package are implemented in Javascript.

Figure 25:
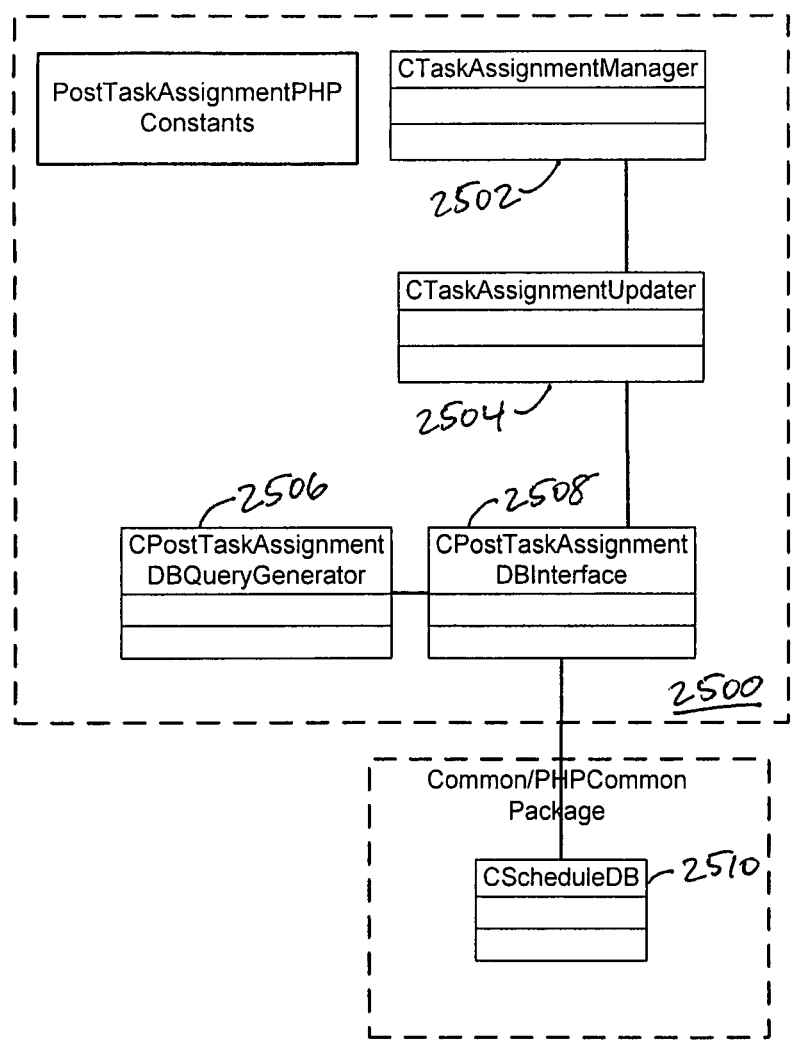
FIG. 25 illustrates a class diagram of a PostTaskAssignmentPHPProcessor package, according to an embodiment of the invention.

FIG. 25 illustrates a class diagram of the PostTaskAssignmentPHPProcessor 2500 package (e.g., PostXXXPHPProcessor 1414 of FIG. 14), according to an embodiment of the invention. The CTaskAssignmentManager 2502 class provides the interface for this package and manages all other classes in the package. CTaskAssignmentManager 2502 determines the actions to perform on each project task from the task assignment editor 102 (FIG. 1A). The CTaskAssignmentUpdater 2504 class updates the assignment of a project task in the database. The updates include adding or obsoleting the assignment of a project task. The CPostTaskAssignmentDBInterface 2508 class provides an interface for the class to obtain information and update information in the database. The CPostTaskAssignmentDBQueryGenerator 2506 class creates the SQL database queries for CPostTaskAssignmentDBInterface 2508. CPostTaskAssignmentDBInterface 2508 interfaces with the CScheduleDB 2510 to access the database. CTaskAssignmentUpdater 2504 updates task information in the database through CPostTaskAssignmentDBInterface 2508. According to an embodiment, the foregoing classes for the PostTaskAssignmentPHPProcessor 2500 package are implemented in PHP script.

Figure 26:
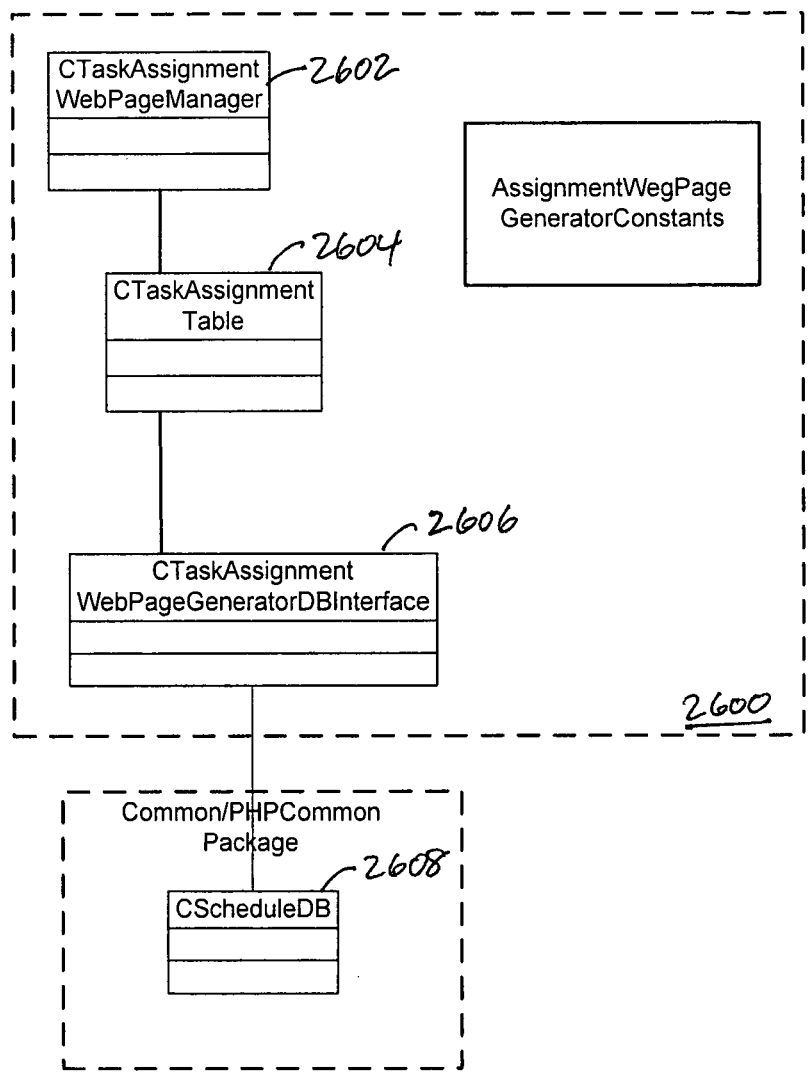
FIG. 26 illustrates a class diagram of the TaskAssignmentWebPageGenerator package, according to an embodiment of the invention.

FIG. 26 illustrates a class diagram of the TaskAssignmentWebPageGenerator 2600 package (e.g., XXXWebPageProcessor 1416 of FIG. 14), according to an embodiment of the invention. The CTaskAssignmentWebPageManager 2602 class provides the interface for this package to generate the task assignment web page. CTaskAssignmentTable 2604 class creates the table for the task assignment web page. The CTaskAssignmentWebPageGeneratorDBInterface 2606 class provides an interface for the classes to obtain information from the database. CTaskAssignmentWebPageGeneratorDBInterface 2606 generates the appropriate queries to obtain the desired information. CTaskAssignmentWebPageGeneratorDBInterface 2606 interfaces with CScheduleDB 2608 to access the database. CTaskAssignmentTable 2604 obtains task information from the database through CTaskAssignmentWebPageGeneratorDBInterface 2606. According to an embodiment, the foregoing classes for the TaskAssignmentWebPageGenerator 2600 package are implemented in PHP script.

Table 5 illustrates the document object model representation of the task assignment editor 102 (FIG. 1A). Table 5 describes the elements that make up the task assignment editor 102 and corresponding element names and id properties. Each element can be accessed through its id and the properties of the element can be set to change the value and/or the display of the element. According to an embodiment, for each of the elements in the task assignment editor 102, the element is wrapped within one of the classes of the TaskAssignmentJavaScriptProcessor 2400 package of FIG. 24. The elements are attributes of the class. Hence, the member functions of the class will have direct access to the elements and modify its properties as needed. With the class having direct access to the elements, there is no need to obtain the elements using their ids.

TABLE 5

Form Element
id = "TaskAssignmentFormID"
Table Element
id = "TaskAssignmentTableID"
Row Element
id = row_id + "_RowID"
Task Cell Element
id = row_id + "_TaskCellID"
CheckBox Element
id = row_id + "_CheckBoxID"
name = row_id + "_CheckBox"
Project Task Selection Element
id = row_id + "_ProjectTaskSelectID"
name = row_id + "_ProjectTaskSelect"
Task Name Input Text Element
id = row_id + "_TaskInputBoxID"
name = row_id + "_TaskInputBox"
Action On Task Hidden Input Element
id = row_id + "_HID_ActionOnTaskID"
name = row_id + "_HID_ActionOnTask"
ID of Task Hidden Input Element
id = row_id + "_HID_IDofTaskID"
name = row_id + "_HID_IDofTask"
ID of Parent Task Hidden Input Element
id = row_id + "_HID_IDofParentTaskID"
name = row_id + "_HID_IDofParentTask"
Name of Task Hidden Input Element
id = row_id + "_HID_TaskNameID"
name = row_id + "_HID_TaskName"
Number of Detailed Task Hidden Element
id = row_id + "_HID_NumOfDetailedTaskID"
name = row_id + "_HID_NumOfDetailedTask"
Number of Rows Menu Selection Element
id = "AddRowSelectID"

Member Assignment Cell Element
id = row_id + "_MemberAssignmentCellID"
Member Assignment Hidden Input Element
id = row_id + "_HID_MemberAssignmentID"
name = row_id + "_HID_MemberAssignment"
Member Assignment Selection Element
id = row_id + "_MemberAssignmentID"
name = row_id + "_MemberAssignment"

Table 6 below illustrates the attribute members of the class CTaskCell 2408 of the TaskAssignmentJavaScriptProcessor package shown in FIG. 24, according to an embodiment of the invention. CTaskCell 2408 can obtain and set values of the properties of all the elements it contains.

TABLE 6

| Type | Attribute Name | Description |
| --- | --- | --- |
| HTMLCellElement | m_TaskCellElement | This attribute member is an object for the cell element that contains task information |
| HTMLInputElement | m_TaskNameHiddenElement | This attribute member is an object for the hidden input element containing information about the task name. |
| HTMLInputElement | m_LevelOfTaskHiddenElement | This attribute member is an object for the hidden input element containing information about the level of the task. |
| HTMLInputElement | m_NumOfDetailsHiddenElement | This attribute member is an object for the hidden input element containing information about the highest possible number of detail tasks the task currently has. A task can have from 0 to the value of the hidden element of detailed tasks. |
| HTMLInputElement | m_ActionOnTaskHiddenElement | This attribute member is an object for the hidden input element containing information about the action taken on the task. |
| HTMLInputElement | m_IDOfTaskHiddenElement | This attribute member is an object for the hidden input element containing information about the ID of the task. |

TABLE 6-continued

| Type | Attribute Name | Description |
|---|---|---|
| HTMLInputElement | m__IDOfParentTaskHiddenElement | This attribute member is an object for the hidden input element containing information about the task ID of its parent task. |
| HTMLInputElement | m__SelectedIndexHiddenElement | This attribute member is an object for the hidden input element containing information about the index of the selected task in the task select element. |
| HTMLInputElement | m__TaskNameInputElement | This attribute member is an object for the input element corresponding to an input text box that lets the project member input a task. |
| HTMLSelectElement | m__TaskNameSelectElement | This attribute member is an object for the select element that lets the project member select a project task to schedule. This element is initialized with unscheduled project tasks obtained from the database during the setup of the editor. |
| TextNode | m__TaskNameTextNode | This attribute member is an object for the text node that will display the task name in the task cell. |
| String | m__sRowID | This attribute member is a string for the row id of the row. |

As can be appreciated from FIGS. 15 through 26, which describe the PHPProcessor, JavaScriptProcessor, PostPHP-Processor, and WebPageGenerator for each of the member schedule editor 302 (FIG. 3A), project schedule editor 202 (FIG. 2A), and task assignment editor 102 (FIG. 1A), the design of each editor follows a similar pattern. Hence, any new editors that are added to the system can follow a similar design pattern.

Table 7 illustrates the indexing of the software design specification of the object-oriented scheduling system described herein, to see the similarity in design. Table 7 lists the packages and classes within the packages, and shows the similarity of the design of the three editors.

TABLE 7

| | | |
|---|---|---|
| Common | PHP Common | CScheduleDB, DateUtility, DebugUtility, phpSystemConstants |
| | JavaScript Common | CDateSelector, EditorUtility, DateUtility, CalendarUtility, DebugUtility, JavaScriptSystemConstants |
| Login Processor | login.htm, PostLogin.htm, CPostLoginPHP, CProjectTeamAccess | |
| Task Assignment Processor | TaskAssignEditor.htm, PostTaskAssignment.htm | |
| | TaskAssignmentPHPProcessor | CTaskAssignmentManager, CTaskAssignmentInitialData, CTaskAssignmentTaskRowData, CTaskAssignmentJavaScriptInterface CTaskAssignmentEditorDBInterface, TaskAssignmentPHPProcessorConstants |
| | TaskAssignmentJavaScriptProcessor | CTaskAssignmentEditorManager, CTaskAssignmentTable, CTaskAssignmentRow, CTaskCell, CAssignmentCell |
| | PostTaskAssignmentPHPProcessor | CTaskAssignmentManager, CTaskAssignmentUpdater, CPostTaskAssignmentDBInterface, CPostTaskAssignmentDBQueryGenerator, PostTaskAssignmentPHPConstants |
| | TaskAssignmentWebPageGenerator | CTaskAssignmentWebPageManager, CTaskAssignmentTable, CTaskAssignmentWebPageGeneratorDBInterface, AssignmentWebPageGeneratorConstants |
| Project Schedule Processor | ProjScheduleEditor.htm, PostProjSchedule.htm | |
| | ProjectSchedulePHPProcessor | CProjectScheduleManager, CProjectScheduleInitialData, CProjectScheduleTaskRowData, CProjectEditorDBInterface, CProjectEditorDBQueryGenerator, CJavaScriptInterface, ProjectSchedulePHPProcessorConstants |
| | ProjectScheduleJavaScriptProcessor | CProjectEditorManager, CProjectTableManager, CProjectScheduleRow, CTaskCell, CMemberCell, CDateCell, SProjectTaskInfo |
| | PostProjectSchedulePHPProcessor | CProjectTaskManager, CProjectTaskUpdater, CPostProjectDBInterface, CPostProjectDBQueryGenerator, PostProjectSchedulePHPProcessorConstants |
| | ProjectScheduleWebPageGenerator | CProjectScheduleWebPageManager, CProjectScheduleTable, CProjectTaskRow, CProjectWebPageDBInterface, CProjectWebPageDBQueryGenerator, ProjectScheduleWebPageGeneratorConstants |
| Member Schedule Processor | MembScheduleEditor.htm, PostMembSchedule.htm | |
| | MemberSchedulePHPProcessor | CMemberScheduleManager, CMemberScheduleInitialData, CMemberScheduleTaskRowData, CEditorDBInterface, CJavaScriptInterface, MemberSchedulePHPProcessorConstants |

TABLE 7-continued

| | |
|---|---|
| MemberScheduleJavaScriptProcessor | CEditorManager, CTableManager, CMemberScheduleTable, CMemberScheduleRow, CTaskCell, CDateCell, CDetailTaskInfo, SMemberTaskInfo |
| PostMemberSchedulePHPProcessor | CMemberTaskManager, CMemberTaskUpdater, CPostDBInterface, CPostDBQueryGenerator, PostMemberSchedulePHPProcessorConstants |
| MemberScheduleWebPageGenerator | CMemberScheduleWebPageManager, CMemberScheduleTable, CProjectTaskRow, CWebPageDBInterface, CWebPageDBQueryGenerator, MemberScheduleWebPageGeneratorConstants |

Database Query Generation from Constant Strings with Placeholder Strings

FIG. 27 illustrates example constant strings that are used to generate database queries, according to an embodiment of the invention. Two types of constant strings are used. The "constant query string" contains the entire query string with placeholder strings, where the placeholder strings are replaced with values for a given query. The constant query string shows the entire query and the placeholder strings show what values need to be put into the query. The "constant for placeholder strings" are used for searching and for replacing the placeholder strings in the constant query string with actual values. The placeholder strings in the query apply restrictions to limit the results of a query. The example shown in FIG. 27 corresponds to PHP script but can be used in any language.

Using constant query strings having placeholder strings provides an improvement from building the string through a series of string concatenations, which is difficult to read and comprehend. Each of the class diagrams for packages which access the database contain package constants that are used within the package, as shown in FIGS. 15, 17, 18, 19, 21, 22, 23, 25, and 26. The constant query strings are defined within the package so that they are easy to locate. Another advantage of constant query strings is testing them in a database tool such as Navicat MySQL. The constant query string can be copied into such a tool with the placeholder strings replaced with values, to test if the query string is a valid string.

FIG. 28 illustrates an example script used to generate the database query from the constant strings of FIG. 27, according to an embodiment of the invention. The example shown in FIG. 28 corresponds to PHP script but any language can be used to implement the sequence. The example shows the value of the query string after each statement of the script is executed. In the execution of the first statement, the constant string is assigned to a variable string, $loc_sQuery. The variable $loc_sQuery will contain the query that will be used to for the database query. In the execution of the second, third, and fourth statements, the placeholder strings "%%ProjectNumber%%", "%%MemberLabel%%", and "%%MemberLabel%%" are replaced with the values "J17", "T1", and "40" respectively. The execution of the fourth step shows the resulting query string. This example shows the replacement of the placeholder by a simple value such as project number, member label, and project task id. Some values that replace the placeholder strings are static, such as the project number and member label, which do not change over a session with the editors. The example query is restricted to the records of the table of the database with the specified project number, member label, and project task id.

Figure 29:
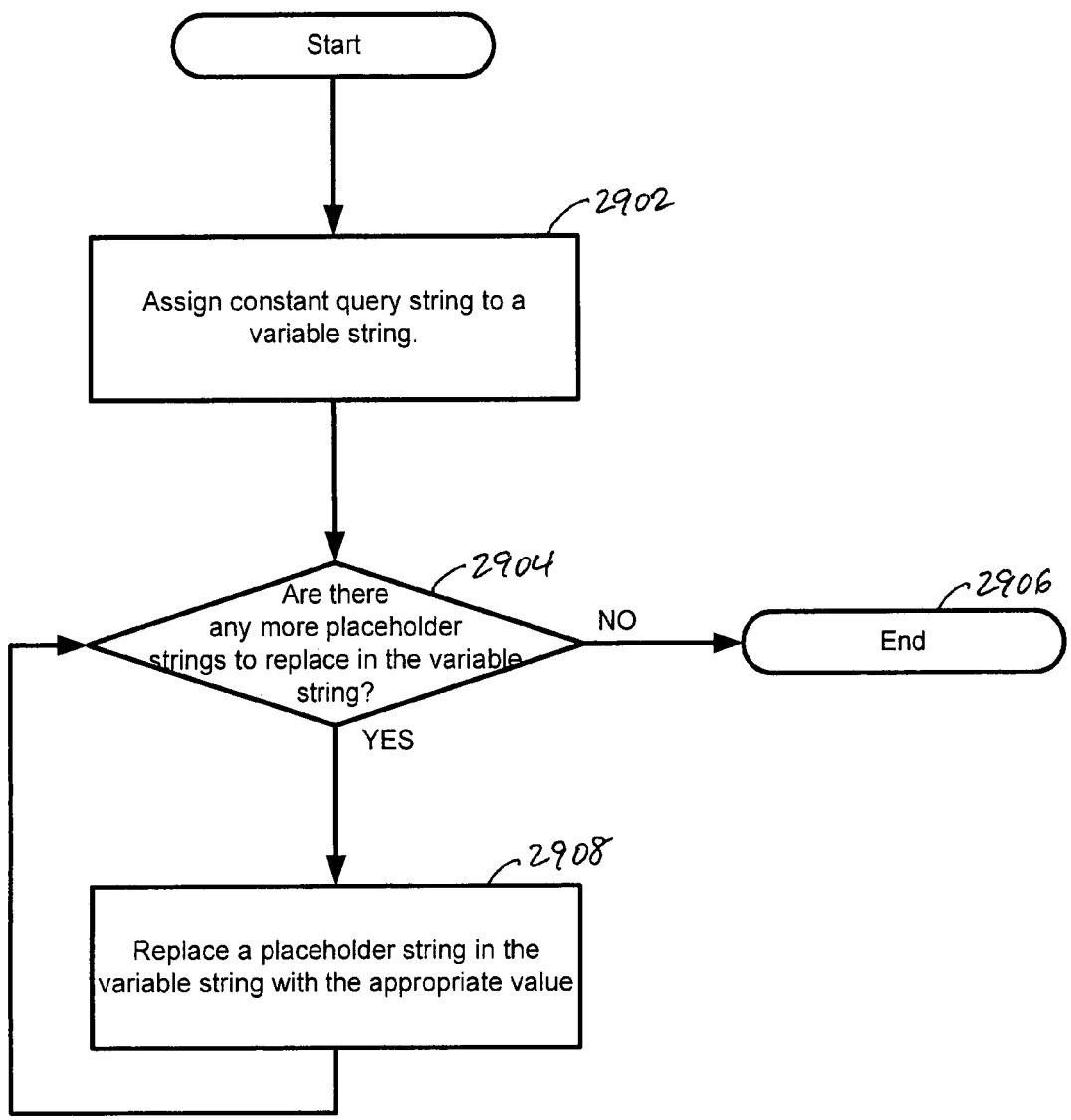
FIG. 29 is a flow diagram illustrating a process for generating a query string from a constant string, according to an embodiment of the invention.

FIG. 29 is a flow diagram illustrating a process for generating a query string from a constant string, according to an embodiment of the invention. At block 2902, a constant query string is assigned to a variable string. A variable string is needed to allow the replacement of the placeholder strings with values, whereas the values of the constant string do not change. At block 2904, the variable string is checked to see if it contains any placeholder strings. If the variable string does not contain any more placeholder strings, then the query string corresponds to the original constant query string, and the process ends at block 2906. If the variable string does contain more placeholder strings, then at block 2908 a placeholder string in the variable string is replaced with a value. After the replacement of block 2908, control returns to block 2904 to determine whether the variable string contains any more placeholder strings. When all the placeholder strings in the variable are replaced with values, the query string is generated and is ready for submission to the database. Once the query is submitted to the database, the database produces results which can be returned to the requester, passed to another process, or otherwise processed as appropriate for the purpose.

The CXXXDBInterface class (e.g., CPostDBInterface 1706 class from FIG. 17 and CWebPageDBInterface 1808 class of FIG. 18) and the CYYYDBQueryGenerator class (e.g., CPostDBQueryGenerator 1708 class from FIG. 17 and CWebPageDBQueryGenerator 1810 class of FIG. 18) create and use the query. In some cases, the CXXXDBInterface class contains private functions that generate the query strings from the constants and values obtained from the user, via the editor, and from the database. An example is CEditorDBInterface 1510 of FIG. 15. In most cases, the CXXXDBInterface class will use the public functions of CYYYDBQueryGenerator to generate the query string. An example is CPostDBInterface 1706 and CPostDBQueryGenerator 1708 of FIG. 17.

Editor Web Page Components

Figure 30:
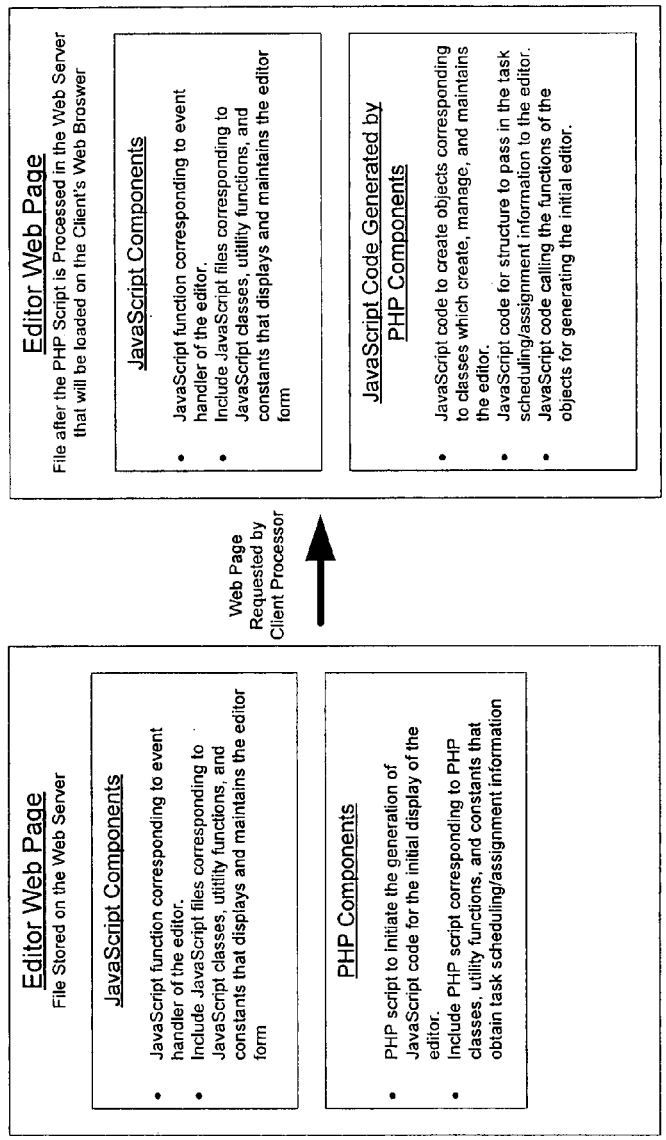
FIG. 30 illustrates components of a web page for the project schedule editors, according to an embodiment of the invention.

FIG. 30 illustrates the components of the web page for the editors (e.g., the member schedule editor 302, project schedule editor 202, and task assignment editor 102), according to an embodiment of the invention. The web page is a file stored in the server processor 604 (FIG. 6), such as a web server. The web page contains a JavaScript component and a PHP component. The JavaScript component contains JavaScript functions that handle events that occur in the editor. The JavaScript component includes other JavaScript files that correspond to classes, utilities, and constants for the display, management, and maintenance of the editor. The PHP component of the web page contains PHP script to initiate the generation of JavaScript code that will display, in the editor, task assignment/schedule information obtained from the database. The PHP component includes files with PHP script that correspond to classes, utilities, and constants to obtain task assignment/schedule information from the database and to generate the JavaScript code for the editor.

When the web page is requested by the client processor 602 (FIG. 6), such as a web browser requesting an editor web page, only the PHP component of the web page is processed by the server processor 604. For example, the PHP script is executed in the web server, such as web servers 507 and 530 (FIG. 5). The PHP script accesses and obtains task assignment/schedule information from the database. The PHP script generates structures in JavaScript code to store and pass the task information to JavaScript. The PHP script generates JavaScript code that will create the object of a JavaScript class that creates, manages, and maintains the editor, and calls the member functions of the object to create the initial display of the editor with the task information. The JavaScript code generated by the PHP script is added to the editor web page as the web page is passed to the client processor 602. The PHP code will not be in the web page as it is passed to the client processor 602. The client processor executes all the JavaScript code in the web page to display the initial editor and to manage and maintain the editor as the user interacts with the editor. The PHP script is not passed to the client processor 602, but is server-side code.

Figure 31:
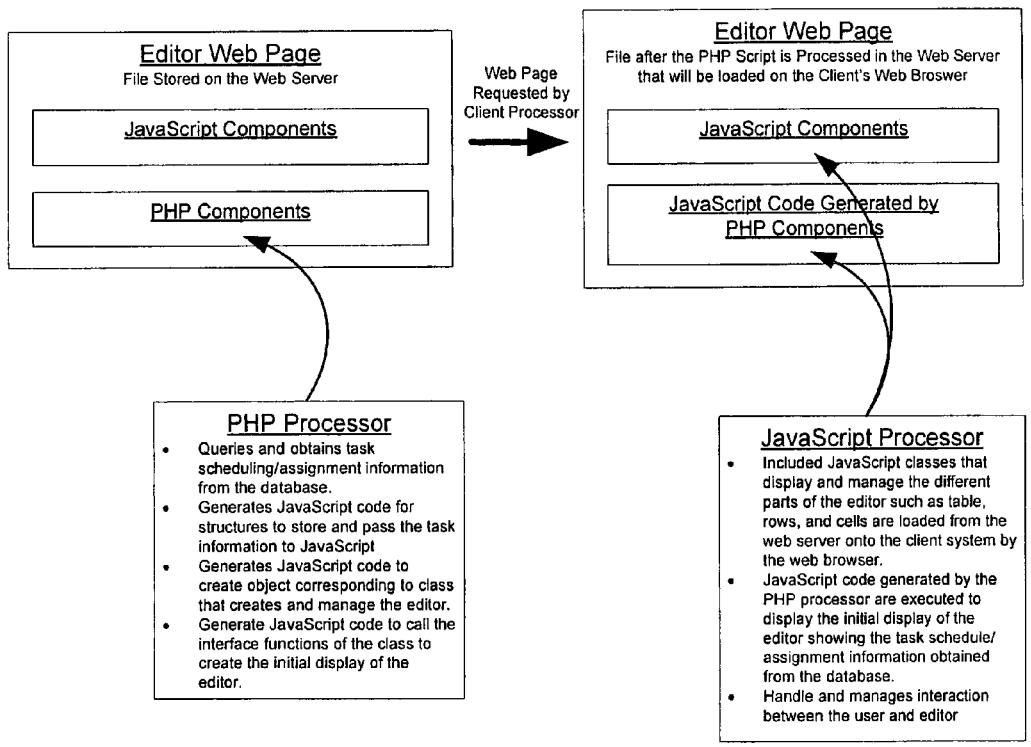
FIG. 31 illustrates components of a web page for the editors along with the processors that process the components of the web page, according to an embodiment of the invention.

FIG. 31 illustrates components of the web page for the editors (e.g., the member schedule editor 302, project schedule editor 202, and task assignment editor 102), along with the processors that process the components of the web page, according to an embodiment of the invention. The PHP processor occurs on the server side and the JavaScript processor occurs on the client side. The PHP processor on the server executes the PHP components to generate the JavaScript code that will be executed by the JavaScript processor on the client.

Figure 32:
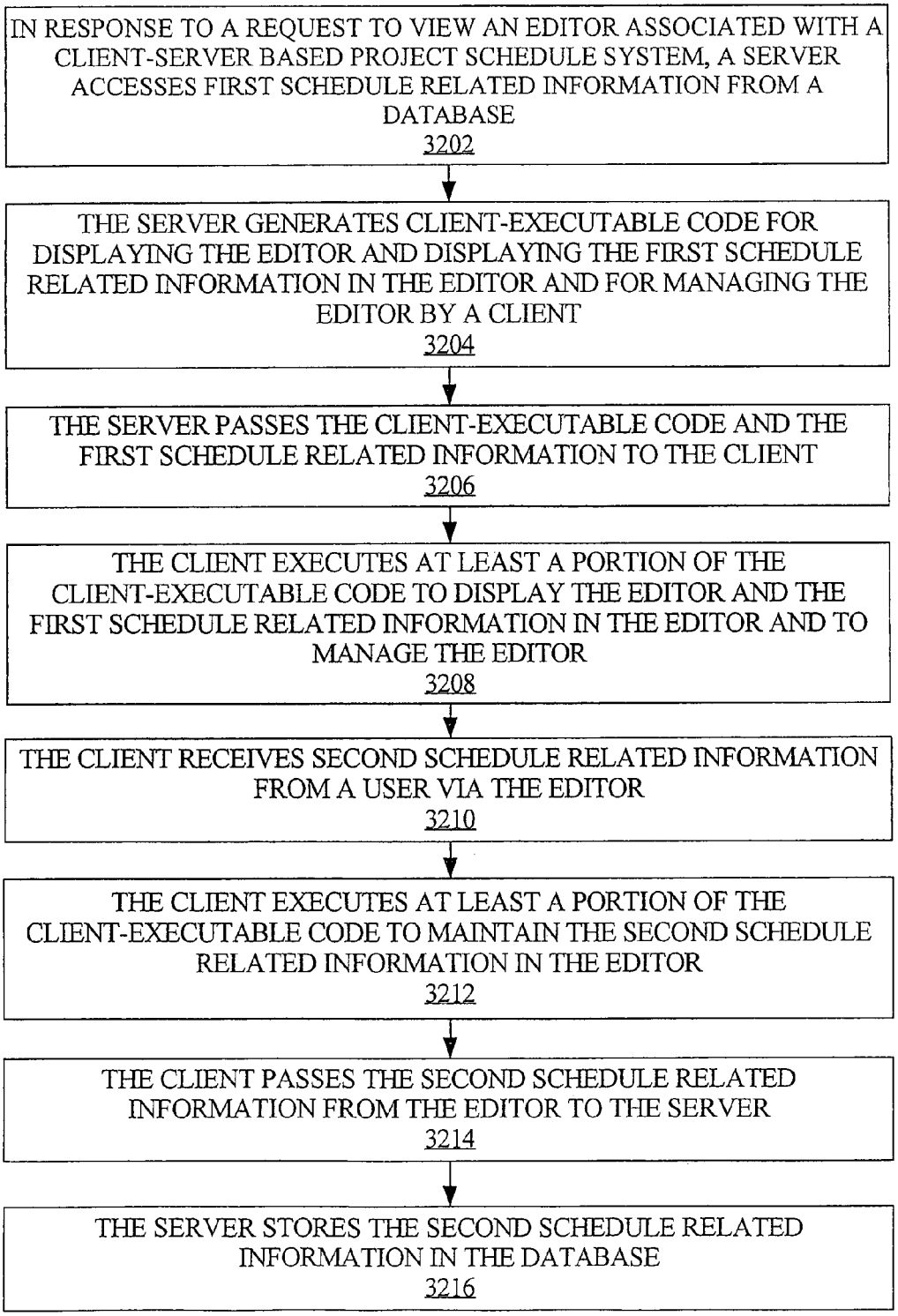
FIG. 32 is a flow diagram illustrating a method for managing a project schedule with a client-server based project schedule management system, according to an embodiment of the invention.

A Method for Managing a Project Schedule with a Client-Server Based Project Schedule System FIG. 32 is a flow diagram illustrating a method for managing a project schedule with a client-server based project schedule management system, according to an embodiment of the invention. An embodiment of the method depicted in FIG. 32 is implemented as a computer and/or machine-implemented method in which a computer or machine performs the method steps, such as by one or more processors executing instructions. For example, the method may be performed on or by a computer system such as computer system 3500 of FIG. 35.

At block 3202, in response to a request to view an editor associated with a client-server based project schedule system, a server accesses first schedule-related information from a database. For example, a user at client processor 602 (FIG. 6) interacts with a user interface to request one of the task assignment editor 102 (FIG. 1A), member schedule editor 302 (FIG. 3A), or project schedule editor 202 (FIG. 2A). In response to the request, server processor 604 (FIG. 6) accesses data from a database, such as data 508 (FIG. 5) from database 506 (FIG. 5) and/or data 536 (FIG. 5) from database 538 (FIG. 5). For example, server processor 604 executes PHP script code to retrieve the appropriate data from the database for populating the requested editor specifically for the requesting user and corresponding project. The data that the server retrieves from the database is specific to the editor that the user requested, and specific to various information input by the user in association with the request, such as the user id and project id. The data that the server retrieves from the database in response to a request for an editor includes initial information, if any, for populating fields in the requested editor.

At block 3204, the server generates client-executable code for execution by the requesting client. This client-executable code generated by the server is for displaying the requested editor at the client, displaying the retrieved information in the appropriate fields of the editor, and for managing the editor at the client. For example, server processor 604 (FIG. 6) executes PHP script code to convert the retrieved data into a format that the client processor 602 (FIG. 6) can use. For example, the client processor 602 does not understand server script code so the server needs to process the retrieved information into a format that the client does understand and can use, such as wrapping the information in JavaScript code executable by the client processor 602. At block 3206, the server passes the client-executable code and the first schedule-related information to the client for execution.

Appendices A, C, and E present example code listings for the respective editors, where the example code listings show the JavaScript denoted by the <script> tag and the PHP script enclosed within <?php and ?> tag. The editor pages are stored in the server processor 604, such as web servers 507, 530 (FIG. 5). When the client processor 602, such as a web browser, accesses the editor pages, the PHP script is executed in the server processor 604 and the entire PHP script is replaced with JavaScript code that the PHP script generates. All the JavaScript code, including that generated by the PHP script, is passed to the client processor 602 for execution.

At block 3208, the client executes the client-executable code, or at least some of such code, in order to display the first schedule-related information in the requested editor and to manage the data and editor, generally. Thus, initial display of the requested editor is now complete, based on the foregoing actions associated with each of the client and server processors.

Once the editor page is loaded at the client by executing the client-executable code (e.g., JavaScript) generated by the server, the user can begin to edit and/or add information associated with the editor. Thus, at block 3210, the client receives second schedule-related information from a user via the editor. For example, depending on the particular editor, the client processor 602 (FIG. 6) receives task assignment information, member schedule information, or project schedule information from a user, which was input via the editor.

At block 3212, the client executes at least some of the client-executable code to manage and/or maintain the second schedule-related information in the editor at the client side. For example, execution of the code creates data structures and associations for managing the new or updated data at the client prior to submission of such data to the server, and provides the functionalities embodied in the editor page objects (e.g., HTML buttons, text entry objects, etc.).

At block 3214, the client passes the second schedule-related information from the editor to the server. Thus, at block 3216, the server stores the second schedule-related information in the database, from which it can be subsequently accessed for passing back to clients in response to requests. For example, schedule-related information may be passed from the server to a client in response to a request for a respective editor page (e.g., FIGS. 1A, 2A, 3A) or a request for a web page associated with a respective editor (e.g., FIGS. 1B, 2B, 3B).

Figure 33:
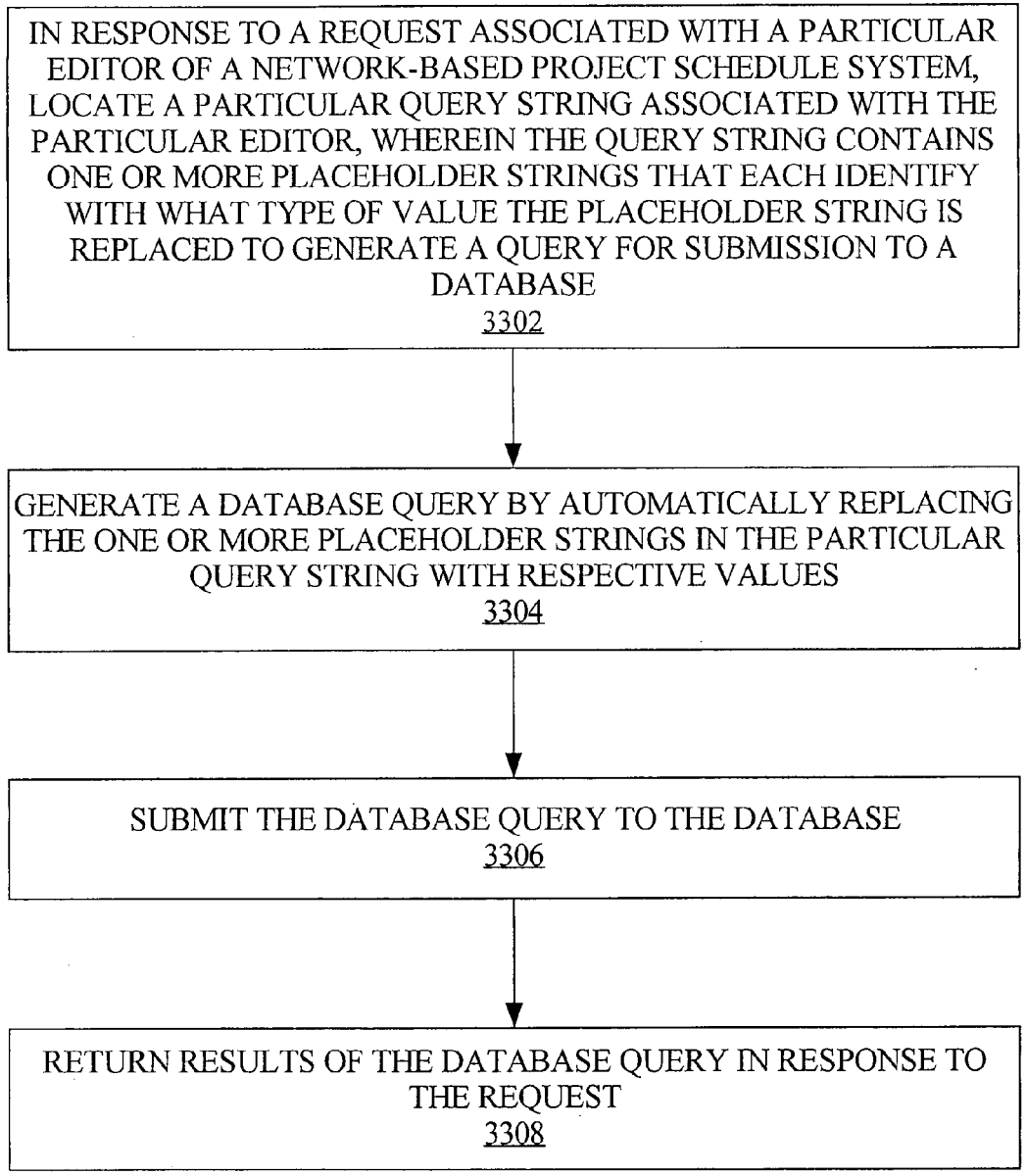
FIG. 33 is a flow diagram illustrating a method for automatically generating a database query in a network-based project schedule management system, according to an embodiment of the invention.

A Method for Automatic Generation of Database Queries in a Network-Based Project Schedule System FIG. 33 is a flow diagram illustrating a method for automatically generating a database query in a network-based project schedule management system, according to an embodiment of the invention. An embodiment of the method depicted in FIG. 33 is implemented as a computer and/or machine-implemented method in which a computer or machine performs the method steps, such as by one or more processors executing instructions. For example, the method may be performed on or by a computer system such as computer system 3500 of FIG. 35.

At block 3302, in response to a request associated with a particular editor of a network-based project schedule system, a particular query string associated with the particular editor is located. The query string, also referred to herein as a "constant query string" (e.g., FIGS. 27 through 29), contains one or more placeholder strings. The placeholder strings function as placeholders, within the constant query string, for values that are passed in as replacements for the placeholder strings.

Thus, each placeholder string identifies the type of value with which the placeholder string is replaced in order to generate a query for submission to a database, such as database 506 and/or database 536. The "type of value" is not referring to a data type but to a variable name corresponding to which a value is used to replace a corresponding placeholder string. Referring to FIGS. 27 and 28 for an example, the placeholder string '%%ProjectNumber%%' is to be replaced with a value for the project number (e.g., the value "J17"); the placeholder string '%%MemberLabel%%' is to be replaced with a value for the label of a project member (e.g., the value "T1"); the placeholder string '%%ProjectTaskID%%' is to be replaced with a value for the id of the project task (e.g., the value "40"), and so on as illustrated in these figures. The constants for the placeholder strings such as C_ProjectNumberKey, C_MemberLabelKey, and C_ProjectTaskIDKey will be used by a string function (e.g., str_replace( ) for PHP) to locate the placeholder strings in the constant query strings to replace the placeholder strings with the appropriate value.

At block 3304, a database query is generated by automatically replacing the one or more placeholder strings in the particular query string with corresponding values. For example, the placeholder string '%%ProjectNumber%%' is replaced with value "J17"; the placeholder string '%%MemberLabel%%' is replaced with the value "T1"; and the placeholder string '%%ProjectTaskID%%' is replaced with the value "40".

As discussed in reference to FIG. 27 and according to an embodiment, the "constant for placeholder strings" are used to search the "constant query string" for any placeholder strings and to replace placeholder strings with a value.

As discussed in reference to FIG. 29 and according to an embodiment, the CXXXDBInterface class and the CYYYDBQueryGenerator class, which are associated with server processor 604 (FIG. 6), are used to create the database query at block 3304, where the query generation process may be based on private functions of the CXXXDBInterface class or may be based on public functions of the CYYYDBQueryGenerator class. According to an embodiment, the particular query string is assigned to a variable string (e.g., "$loc_sQuery" of FIG. 28) to allow replacement of the placeholder strings while not changing the underlying constant query string which functions as a reuseable query template for automatically generating similar database queries for accessining data from the database.

At block 3306, the automatically generated database query is submitted to the database and, at block 3308, results of the database query are returned in response to the request.

A Method for Managing Tasks in a Project Schedule System

Figure 34:
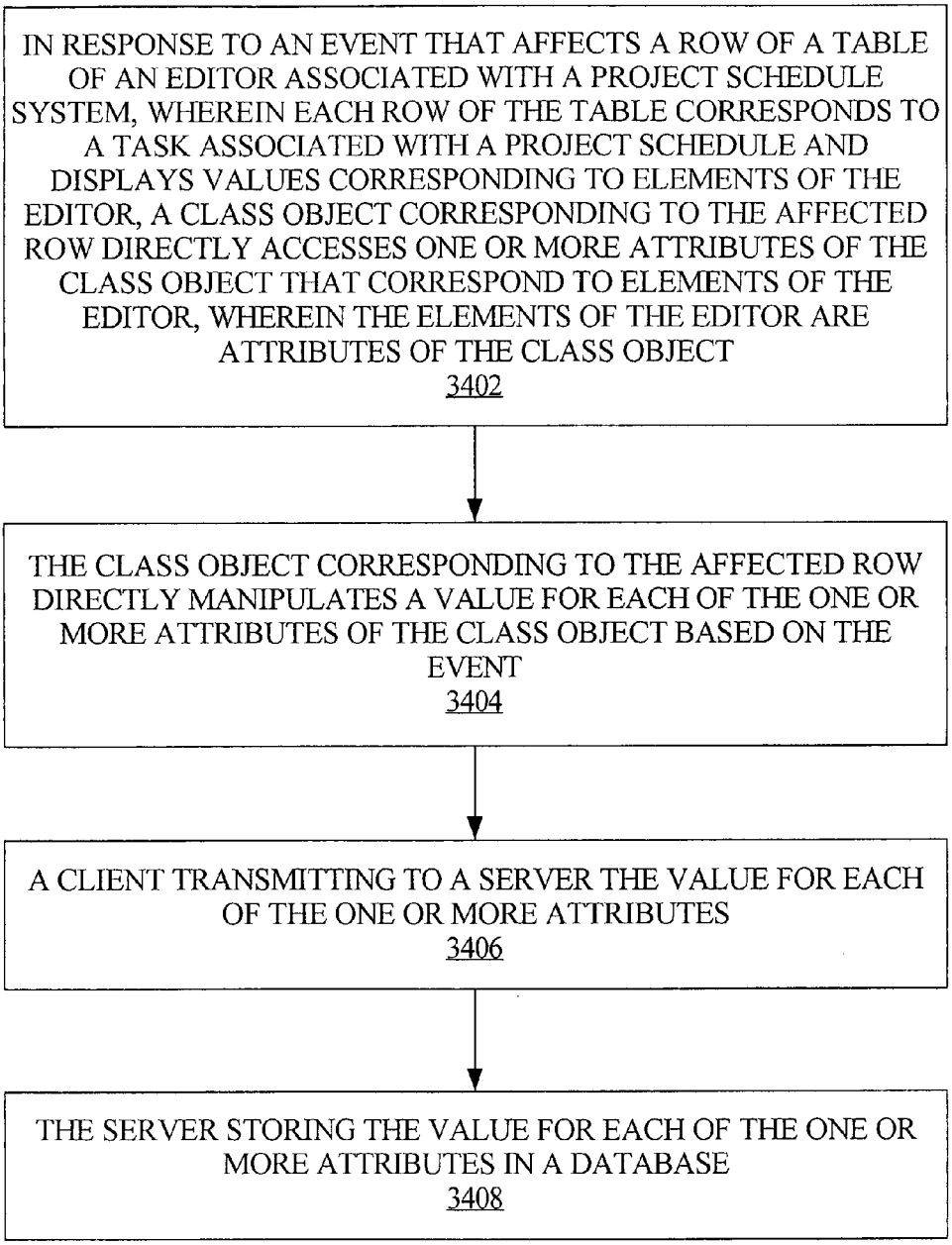
FIG. 34 is a flow diagram illustrating a method for managing tasks in a project schedule management system, according to an embodiment of the invention.

FIG. 34 is a flow diagram illustrating a method for managing tasks in a project schedule management system, according to an embodiment of the invention. An embodiment of the method depicted in FIG. 34 is implemented as a computer and/or machine-implemented method in which a computer or machine performs the method steps, such as by one or more processors executing instructions. For example, the method may be performed on or by a computer system such as computer system 3500 of FIG. 35.

At block 3402, in response to an event that affects a row of a display table of an editor, a class object corresponding to the affected row directly accesses one or more attributes, of the class object, which correspond to elements of an editor associated with a project schedule system. Each row of the display table corresponds to a schedule task associated with a project schedule and displays values corresponding to elements of the editor. Significantly, the class object can directly access the attributes because the elements of the editor are configured as attributes of the class object. Thus, the class object does not have to construct the element id for the affected elements of the affected row and does not have to obtain such elements.

For example, a user edits schedule data for a particular task via the member schedule editor 302 (FIG. 3A). The user edit comprises an event that affects a row in the table of the member schedule editor. A member function of a class (e.g., CMemberScheduleTaskRowData 1506 of FIG. 15) of the XXXJavaScriptProcessor 1410 (FIG. 14) for the member schedule editor 302 has direct access to the elements, as attributes of an object of the class, for modifying the properties of the elements as appropriate based on the event. The elements maintain information about the task in the row that can be passed to the server processor when the editor session is completed.

At block 3404, the class object corresponding to the affected row directly manipulates a value for each of the one or more attributes of the class object based on the event. Continuing with the example, a member function of an object of the CMemberScheduleTaskRowData 1506 class of the XXXJavaScriptProcessor 1410 for the member schedule editor 302 sets the values of attributes of the object and thereby manipulates the values of elements of the member schedule editor 302.

At block 3406, a client transmits to a server the value for each of the one or more attributes, including the values for the attributes that were manipulated at block 3404. For example, the client processor 602 (FIG. 6), which comprises the XXXJavaScriptProcessor 1410 for the member schedule editor 302, posts the manipulated data to the server processor 604 (FIG. 6). At block 3408, the server stores the value for each of the one or more attributes in a database. For example, the server processor 604 stores the data back in a database such as databases 506, 536 (FIG. 5). When the editor session is completed, the tasks for which the event on the rows of a table changed, or added information about the tasks, are updated or added to the database.

Design Pattern

"Design Pattern" refers to a general design that addresses a recurring design problem in object-oriented systems. The general design of the member schedule editor is applied to the task assignment editor and project schedule editor. Design Pattern is described in "Design Patterns: Elements of Reusable Object-Oriented Software" by Erich Gamma, et al., published by Addison-Wesley, the content of which is incorporated by reference in its entirety for all purposes as if fully set forth herein. FIGS. 15 to 18 show the design of the classes of the various packages of the member schedule editor. The design is similarly used in the project schedule editor as shown in FIGS. 19 to 22 and the task assignment editor as shown in FIGS. 23 to 26. Though the characteristics and behavior of the editors differ, the design pattern can be used by all editors in the system. If additional editors are added to the project schedule management system, the effort and work in the design and implementation of the new editors can be greatly reduced by following the design pattern of the existing editors.

FIG. 36 is a diagram illustrating part of the indexing of Table 7 focusing on the three major packages of the system corresponding to the editors, according to an embodiment of the invention. Each editor has four subpackages as described in FIG. 14. Each of the subpackages has similar class structures to perform their processes. A description of the classes from the different packages helps to illustrate the design pattern of the editors.

Classes CTaskAssignmentTaskRowData 3602, CProjectScheduleTaskRowData 3612, and CMemberScheduleTaskRowData 3622 are parts of their respective XXXPHPProcessor packages that obtain task information from the database and generate the client code to display the task information in a row in its corresponding editor. CTaskAssignmentTaskRowData 3602 obtains information about the project tasks and corresponding member tasks and the assignment of the member task to a member. CTaskAssignmentTaskRowData 3602 generates the client code to display the project task rows and the member task rows with member assignment in the task assignment editor. CProjectScheduleTaskRowData 3612 obtains information about the project tasks and corresponding member tasks and the schedule of the tasks. CProjectScheduleTaskRowData 3612 generates the client code to display the row for the project task schedules along with corresponding member task schedules in the project schedule editor. CMemberScheduleTaskRowData 3622 obtains information about the member tasks and all detailed tasks (down to level 4 tasks) and the schedule of the tasks. CMemberScheduleTaskRowData 3622 generates the client code to display the rows for the member task schedules along with corresponding detailed task schedules in the member schedule editor. The package XXXPHPProcessor for each editor uses a class to generate code to display the task row in the editor in the client processor even though the information is different.

Classes CTaskAssignmentTable 3604, CProjectTableManager 3614, and the combination of CTableManager and CMemberScheduleTable 3624 are parts of their respective XXXJavaScriptProcessor packages that create, manage, and maintain the table and rows of a corresponding editor. Since the member schedule editor is relatively more complex (i.e., adding and deleting tasks at different levels, setting actual dates, updating lower level task schedules with higher level task schedules) than the task assignment editor and project schedule editor, two classes are used to manage the table and rows. The components of the table and the type of events that can occur in the table of the editors differ, but can all be represented by one or two classes in the design of the package. The XXXJavaScriptProcessor packages contain classes corresponding to the different parts of the editors such as table, rows, and cells.

Classes CTaskAssignmentUpdater 3606, CProjectTaskUpdater 3616, and CMemberTaskUpdater 3626 are parts of their respective PostXXXPHPProcessor packages that update the task information in the database with the information passed from the corresponding editor sessions on the client processor. Depending upon the action performed on a task in the editor, the appropriate action is taken to update the information about the task in the database. The type of action varies among the different editors and the details of the action are handled within the design of the class, whereas the overall function of the class is to update the task information in the database. Therefore, the design pattern can be used for posting the information from the editor session to the database for all the editors.

Classes CTaskAssignmentWebPageManager 3608, CProjectScheduleWebPageManager 3618, and CMemberScheduleWebPageManager 3628 are parts of their respective XXXWebPageGenerator packages that manage the classes that generate the web page for the task assignment, project schedule, and member schedule, respectively. CTaskAssignmentWebPageManager 3608 uses various classes to create the web page with a table showing the project tasks and member tasks, where the member tasks show the member assigned to the tasks and the tasks' history.

CProjectScheduleWebPageManager 3618 uses the various classes to create the web page with a table showing the project task schedule and its member task schedules along with the history of the schedules. CMemberScheduleWebPageManager 3628 uses the various classes to create the web page with tables showing the task schedule with its detailed task along with the history of the schedule. The same design pattern is used by all the editors that generate web pages containing different information.

Classes CTaskAssignmentWebPageGeneratorDBInterface 3610, the combination of CProjectWebPageDBInterface and CProjectWebPageDBQueryGenerator 3620, and the combination of CWebPageDBInterface and CWebPageDBQueryGenerator 3630 are part of respective XXXWebPageGenerator packages that handle the interface with the database, to access task information needed for generating the web pages for the task assignment, project schedule, and member schedule, respectively. Each class or combination of classes for the editors represents a database interface that generates the database queries and obtains information in response to the queries.

In the description of the classes of the packages of FIG. 36, classes in the member schedule editor have similar classes in the other editors. Thus, the design pattern used in the member schedule can be used in the other editors. Each of the packages for the editors has different behaviors, however, the same design pattern can still be used.

APPENDICES

Appendix A shows an example code listing of a web page for the project schedule editor, according to an embodiment of the invention. The example code listing shows the JavaScript denoted by the <script> tag and the PHP script enclosed within <?php and ?> tag. The web page is stored in the server processor 604 (FIG. 6), such as web servers 507, 530 (FIG. 5). When the client processor 602 (FIG. 6), such as a web browser, accesses the web page, the PHP script is executed in the server processor 604 and the entire PHP script is replaced with JavaScript code that the PHP script generates. All the JavaScript code, including that generated by the PHP script, is passed to the client processor 602 for execution.

APPENDIX A

```
<!--
///////////////////////////////////////////////////////////////////////////////
//                    Copyright 2006 by Ricoh Corporation
//                           All Rights Reserved
//                        Confidential and Proprietary
///////////////////////////////////////////////////////////////////////////////
// File:          ProjScheduleEditor.htm
//_____
// Description:   This file is the web page for the project schedule
//                editor.
// Author:
// History:
///////////////////////////////////////////////////////////////////////////-->
<html>
<head>
  <title>Project Schedule Editor</title>
</head>
```

APPENDIX A-continued

```
<script>
const C_DEBUG = true;
</script>
<script src="ProjectScheduleJavaScriptProcessor/cProjectEditorManager.js"></script>
<script src="ProjectScheduleJavaScriptProcessor/cProjectTableManager.js"></script>
<script src="ProjectScheduleJavaScriptProcessor/cProjectScheduleTable.js"></script>
<script src="ProjectScheduleJavaScriptProcessor/cProjectScheduleRow.js"></script>
<script src="ProjectScheduleJavaScriptProcessor/cProjectTaskCell.js"></script>
<script src="ProjectScheduleJavaScriptProcessor/cProjectDateCell.js"></script>
<script src="ProjectScheduleJavaScriptProcessor/sProjectTaskInfo.js"></script>
<script src="../Common/JavaScriptCommon/debugUtility.js"></script>
<script src="../Common/JavaScriptCommon/dateUtility.js"></script>
<script src="../Common/JavaScriptCommon/editorUtility.js"></script>
<script src="../Common/JavaScriptCommon/javaScriptSystemConstants.js"></script>
<script src="../Common/JavaScriptCommon/cDateSelector.js"></script>
<script src="../Common/JavaScriptCommon/calendarUtility.js"></script>
<script>
////////////////////////////////////////////////////////////////////////////
// Global Function: fglo_deleteTask( )
//----------------------------------------------------------------------
// Description:        This function is the event handler for Delete button
//                     that will delete the selected project task and its
//                     member subtasks.
// Input:              None
// Output:             None
// Preconditions:      glo_EditorManager cannot be null.
// Postconditions:     None
// Security:           None
// Algorithm:
//                     1  if preconditions are not met, return.
//                     2  call glo_EditorManager.deleteSelectedTask( ).
////////////////////////////////////////////////////////////////////////////
function fglo_deleteTask( ) {
    fglo_PrintDebug("fglo_deleteTasks)");
    if (glo_EditorManager == null) {
        return;
    }
    glo_EditorManager.deleteSelectedTask( );
}
////////////////////////////////////////////////////////////////////////////
// Global Function:    fglo_addTasks( )
//----------------------------------------------------------------------
// Description:        This function is the event handler for the AddXXX button.
//                     This function adds empty task rows to the editor for
//                     the project to add project tasks to the schedule.
// Input:              None
// Output:             None
// Preconditions:      glo_EditorManager cannot be null.
// Postconditions:     None
// Security:           None
// Algorithm:
//                     1 if preconditions are not met, return.
//                     2 if this.name is empty, return
//                     3 call glo_EditorManager.addTasks(this.name).
////////////////////////////////////////////////////////////////////////////
function fglo_addTasks( ) {
    fglo_PrintDebug("fglo_addTasks( )");
    if (glo_EditorManager == null) {
        return;
    }
    if (this.name.length == 0)   {
        return;
    }
    glo_EditorManager.addTasks(this.name);
}
////////////////////////////////////////////////////////////////////////////
// Global Function:    fglo_consolidateSchedule( )
//----------------------------------------------------------------------
// Description:        This function is the event handler for Consolidate
//                     button which consolidate the project schedule with the
//                     member schedules and redisplays the project schedule
//                     editor after posting the project schedule.
// Input:              None
// Output:             None
// Preconditions:      glo_EditorManager cannot be null.
// Postconditions:     None
// Security:           None
// Algorithm:
//                     1  if preconditions are not met, return.
```

APPENDIX A-continued

```
//                   2    call glo_EditorManager.consolidateSchedule( ).
//////////////////////////////////////////////////////////////////////////////////////
function fglo_consolidateSchedule( ) {
    fglo_PrintDebug("fglo_consolidateSchedule( )");
    if (glo_EditorManager == null) {
        return;
    }
    glo_EditorManager.consolidateSchedule( );
}
//////////////////////////////////////////////////////////////////////////////////////
// Global Function:    fglo_submitSchedule( )
//----------------------------------------------------------------------------------------
// Description:        This function is the onsubmit event handler when the
//                     Finish or Consolidate button is selected for posting
//                     the project schedule. This function validates the
//                     schedule.
// Input:              None
// Output:             bool indiciating if the task schedule is valid.
// Preconditions:      glo_EditorManager cannot be null.
// Postconditions:     None
// Security:           None
// Algorithm:
//                   1    if preconditions are not met, return false.
//                   2    return glo_EditorManager.submitSchedule( ).
//////////////////////////////////////////////////////////////////////////////////////
function fglo_submitSchedule( ) {
    fglo_PrintDebug("fglo_submitSchedule( )");
    if (glo_EditorManager == null) {
        return false;
    }
    return glo_EditorManager.submitSchedule( );
}
</script>
<style type="text/css">
<!--
span.label {color:black;width:30;height:16;text-align:center;margin-
top:0;background:#ffF;font:bold 13px Arial}
span.c1 {cursor:hand;color:black;width:30;height:16;text-
align:center;margin-top:0;background:#ffF;font:bold 13px Arial}
span.c2 {cursor:hand;color:red;width:30;height:16;text-align:center;margin-
top:0;background:#ffF;font:bold 13px Arial}
span.c3 {cursor:hand;color:#b0b0b0;width:30;height:16;text-
align:center;margin-top:0;background:#ffF;font:bold 12px Arial}
-->
</style>
<body id="ProjSchedBodyID">
    <p id="WorkingID" align="center"><font size="7">Working ....</font><br>
        <img border="0" src="working.gif" width="59" height="52"><br>
    </p>
    <?php
include_once("ProjectSchedulePHPProcessor/cProjectScheduleManager.php");
include_once("ProjectSchedulePHPProcessor/cProjectScheduleInitialData.php");
include_once("ProjectSchedulePHPProcessor/cProjectScheduleTaskRowData.php");
include_once("ProjectSchedulePHPProcessor/cProjectEditorDBInterface.php");
include_once("ProjectSchedulePHPProcessor/cProjectEditorDBQueryGenerator.php");
include_once("ProjectSchedulePHPProcessor/cJavaScriptInterface.php");
include_once("ProjectSchedulePHPProcessor/
projectSchedulePHPProcessorConstants.php");
include_once("../Common/PHPCommon/debugUtility.php");
include_once("../Common/PHPCommon/phpSystemConstants.php");
include_once("../Common/PHPCommon/dateUtility.php");
include_once("../Common/PHPCommon/cScheduleDB.php");
//////////////////////////////////////////////////////////////////////////////////////
// Main
//----------------------------------------------------------------------------------------
// Description:        This function will create the object that will generate
//                     the initial display of the project schedule editor.
// Input:              None
// Output:             None
// Preconditions:      None
// Postconditions:     None
// Security:           None
// Algorithm:
//                   1    create and assign a CProjectScheduleManager object
//                        to $glo_ProjectScheduleManager.
//                   2    call createProjectScheduleEditor( ) of
//                        $glo_ProjectScheduleManager.
//////////////////////////////////////////////////////////////////////////////////////
fglo_debugPrint("ProjScheduleEditor.htm Main");
fglo_debugPrintVar("$_GET", $_GET);
```

APPENDIX A-continued

```
$glo_ProjectScheduleManager = new CProjectScheduleManager( );
$glo_ProjectScheduleManager->createProjectScheduleEditor( );
?>
<p align="center">
    <script type=text/javascript>
////////////////////////////////////////////////////////////////////////////////////////////////
// Main
//--------------------------------------------------------------------------------------------
// Description:      This function removes the working display and displays
//                   the calendar at the bottom of the web page.
// Input:            None
// Output:           None
// Preconditions:    None
// Postconditions:   None
// Security:         None
// Algorithm:
//               1   get the body element and assign it to a local
//                   element loc_BodyElement.
//               2   get the paragraph element containing the working
//                   display and assign it to a local element
//                   loc_ParagraphElement.
//               3   call loc_BodyElement.removeChild( ) with
//                   loc_ParagraphElement passed in.
//               4   call writeCalendar( ).
////////////////////////////////////////////////////////////////////////////////////////////////
var loc_BodyElement = document.getElementById("ProjSchedBodyID");
var loc_ParagraphElement = document.getElementById("WorkingID");
loc_BodyElement.removeChild(loc_ParagraphElement);
writeCalendar( );
    </script>
</p>
</body>
</html>
```

Appendix B shows example JavaScript code generated by the PHP script of Appendix A, according to an embodiment of the invention. The JavaScript code replaces the PHP code in the web page. The JavaScript code includes task scheduling information obtained from the database. The task information is assigned to a data structure to pass the information to JavaScript for processing (for example, var glo_ProjectTaskInfo=new SProjectTaskInfo( ) and glo_ProjectTaskInfo.xxx="value"). Also, JavaScript code is generated to create an object and to call the member function of the object to provide the initial display of the project schedule editor (for example, var glo_EditorManager=new CprojectEditorManager( ), glo_EditorManager.setup_createEditor("J99"), and glo_EditorManager.setup_addTaskToEditor(glo_ProjectTaskInfo).

APPENDIX B

```
<body id="ProjSchedBodyID">
    <p id="WorkingID" align="center"><font size="7">Working ....</font><br>
        <img border="0" src="working.gif" width="59" height="52"><br>
    </p>
<script>
var glo_TaskOptionList = null;
var glo_EditorManager = new CProjectEditorManager( );
glo_EditorManager.setup_createEditor("J99");
var loc_UnassignedProjectTaskList = new Array( );
loc_UnassignedProjectTaskList.push("Class Specification");
loc_UnassignedProjectTaskList.push("Implementation and Unit Test Plan");
loc_UnassignedProjectTaskList.push("Iteration 1");
loc_UnassignedProjectTaskList.push("Iteration 2");
loc_UnassignedProjectTaskList.push("Iteration 3");
loc_UnassignedProjectTaskList.push("Planning");
loc_UnassignedProjectTaskList.push("Project Closing Documents");
loc_UnassignedProjectTaskList.push("System Test");
loc_UnassignedProjectTaskList.push("Post Documents");
glo_EditorManager.setup_addUnassignedProjectTasks(loc_UnassignedProjectTaskList);
var glo_ProjectTaskInfo = new SProjectTaskInfo( );
glo_ProjectTaskInfo.m_bIsProjectTask = true;
glo_ProjectTaskInfo.m_sMemberLabel = "";
glo_ProjectTaskInfo.m_sTaskName = "Project Preparation";
glo_ProjectTaskInfo.m_sTaskID = "10";
glo_ProjectTaskInfo.m_SetDate = "2006-08-18";
glo_ProjectTaskInfo.m_PlanStart = "2006-08-25";
glo_ProjectTaskInfo.m_PlanEnd = "2006-09-01";
glo_ProjectTaskInfo.m_ActualStart = "2006-08-25";
glo_ProjectTaskInfo.m_ActualEnd = "2006-09-02";
glo_EditorManager.setup_addTaskToEditor(glo_ProjectTaskInfo);
glo_ProjectTaskInfo.reset( );
glo_ProjectTaskInfo.m_bIsProjectTask = false;
```

APPENDIX B-continued

```
glo_ProjectTaskInfo.m_sMemberLabel = "T1";
glo_ProjectTaskInfo.m_sTaskName = "Project Plan";
glo_ProjectTaskInfo.m_sTaskID = "12";
glo_ProjectTaskInfo.m_SetDate = "2006-09-07";
glo_ProjectTaskInfo.m_PlanStart = "2006-08-25";
glo_ProjectTaskInfo.m_PlanEnd = "2006-08-27";
glo_ProjectTaskInfo.m_ActualStart = "2006-08-25";
glo_ProjectTaskInfo.m_ActualEnd = "2006-08-29";
glo_EditorManager.setup_addTaskToEditor(glo_ProjectTaskInfo);
glo_ProjectTaskInfo.reset( );
glo_ProjectTaskInfo.m_bIsProjectTask = true;
glo_ProjectTaskInfo.m_sMemberLabel = "";
glo_ProjectTaskInfo.m_sTaskName = "Requirements";
glo_ProjectTaskInfo.m_sTaskID = "20";
glo_ProjectTaskInfo.m_SetDate = "2007-01-18";
glo_ProjectTaskInfo.m_PlanStart = "2006-09-01";
glo_ProjectTaskInfo.m_PlanEnd = "2006-09-15";
glo_ProjectTaskInfo.m_ActualStart = "2006-08-31";
glo_ProjectTaskInfo.m_ActualEnd = "2006-09-15";
glo_EditorManager.setup_addTaskToEditor(glo_ProjectTaskInfo);
glo_ProjectTaskInfo.reset( );
glo_ProjectTaskInfo.m_bIsProjectTask = false;
glo_ProjectTaskInfo.m_sMemberLabel = "T1";
glo_ProjectTaskInfo.m_sTaskName = "Reqt Doc";
glo_ProjectTaskInfo.m_sTaskID = "22";
glo_ProjectTaskInfo.m_SetDate = "2006-09-08";
glo_ProjectTaskInfo.m_PlanStart = "2006-09-01";
glo_ProjectTaskInfo.m_PlanEnd = "2006-09-09";
glo_ProjectTaskInfo.m_ActualStart = "2006-08-31";
glo_ProjectTaskInfo.m_ActualEnd = "2006-09-08";
glo_EditorManager.setup_addTaskToEditor(glo_ProjectTaskInfo);
glo_ProjectTaskInfo.reset( );
glo_ProjectTaskInfo.m_bIsProjectTask = false;
glo_ProjectTaskInfo.m_sMemberLabel = "T1";
glo_ProjectTaskInfo.m_sTaskName = "Reqt Matrix";
glo_ProjectTaskInfo.m_sTaskID = "32";
glo_ProjectTaskInfo.m_SetDate = "2006-09-11";
glo_ProjectTaskInfo.m_PlanStart = "2006-09-11";
glo_ProjectTaskInfo.m_PlanEnd = "2006-09-15";
glo_ProjectTaskInfo.m_ActualStart = "2006-09-11";
glo_ProjectTaskInfo.m_ActualEnd = "2006-09-15";
glo_EditorManager.setup_addTaskToEditor(glo_ProjectTaskInfo);
glo_ProjectTaskInfo.reset( );
glo_ProjectTaskInfo.m_bIsProjectTask = true;
glo_ProjectTaskInfo.m_sMemberLabel = "";
glo_ProjectTaskInfo.m_sTaskName = "Document Guidelines";
glo_ProjectTaskInfo.m_sTaskID = "30";
glo_ProjectTaskInfo.m_SetDate = "2007-01-22";
glo_ProjectTaskInfo.m_PlanStart = "2006-09-08";
glo_ProjectTaskInfo.m_PlanEnd = "2006-09-11";
glo_ProjectTaskInfo.m_ActualStart = "";
glo_ProjectTaskInfo.m_ActualEnd = "";
glo_EditorManager.setup_addTaskToEditor(glo_ProjectTaskInfo);
glo_ProjectTaskInfo.reset( );
glo_ProjectTaskInfo.m_bIsProjectTask = false;
glo_ProjectTaskInfo.m_sMemberLabel = "T1";
glo_ProjectTaskInfo.m_sTaskName = "Code Conv";
glo_ProjectTaskInfo.m_sTaskID = "42";
glo_ProjectTaskInfo.m_SetDate = "2006-09-08";
glo_ProjectTaskInfo.m_PlanStart = "2006-09-08";
glo_ProjectTaskInfo.m_PlanEnd = "2006-09-11";
glo_ProjectTaskInfo.m_ActualStart = "";
glo_ProjectTaskInfo.m_ActualEnd = "";
glo_EditorManager.setup_addTaskToEditor(glo_ProjectTaskInfo);
glo_ProjectTaskInfo.reset( );
glo_ProjectTaskInfo.m_bIsProjectTask = true;
glo_ProjectTaskInfo.m_sMemberLabel = "";
glo_ProjectTaskInfo.m_sTaskName = "Top Level Design";
glo_ProjectTaskInfo.m_sTaskID = "40";
glo_ProjectTaskInfo.m_SetDate = "2007-01-22";
glo_ProjectTaskInfo.m_PlanStart = "2006-09-08";
glo_ProjectTaskInfo.m_PlanEnd = "2006-09-11";
glo_ProjectTaskInfo.m_ActualStart = "2006-09-07";
glo_ProjectTaskInfo.m_ActualEnd = "";
glo_EditorManager.setup_addTaskToEditor(glo_ProjectTaskInfo);
glo_ProjectTaskInfo.reset( );
glo_ProjectTaskInfo.m_bIsProjectTask = false;
glo_ProjectTaskInfo.m_sMemberLabel = "T1";
glo_ProjectTaskInfo.m_sTaskName = "Major Packages";
glo_ProjectTaskInfo.m_sTaskID = "62";
```

APPENDIX B-continued

```
glo_ProjectTaskInfo.m_SetDate = "2006-09-08";
glo_ProjectTaskInfo.m_PlanStart = "2006-09-08";
glo_ProjectTaskInfo.m_PlanEnd = "2006-09-11";
glo_ProjectTaskInfo.m_ActualStart = "2006-09-07";
glo_ProjectTaskInfo.m_ActualEnd = "";
glo_EditorManager.setup_addTaskToEditor(glo_ProjectTaskInfo);
glo_ProjectTaskInfo.reset( );
glo_ProjectTaskInfo.m_bIsProjectTask = true;
glo_ProjectTaskInfo.m_sMemberLabel = "";
glo_ProjectTaskInfo.m_sTaskName = "Package Design";
glo_ProjectTaskInfo.m_sTaskID = "50";
glo_ProjectTaskInfo.m_SetDate = "2007-01-09";
glo_ProjectTaskInfo.m_PlanStart = "2007-01-10";
glo_ProjectTaskInfo.m_PlanEnd = "";
glo_ProjectTaskInfo.m_ActualStart = "";
glo_ProjectTaskInfo.m_ActualEnd = "";
glo_EditorManager.setup_addTaskToEditor(glo_ProjectTaskInfo);
glo_ProjectTaskInfo.reset( );
glo_ProjectTaskInfo.m_bIsProjectTask = true;
glo_ProjectTaskInfo.m_sMemberLabel = "";
glo_ProjectTaskInfo.m_sTaskName = "Class Design";
glo_ProjectTaskInfo.m_sTaskID = "60";
glo_ProjectTaskInfo.m_SetDate = "2007-01-18";
glo_ProjectTaskInfo.m_PlanStart = "2007-01-17";
glo_ProjectTaskInfo.m_PlanEnd = "2007-01-20";
glo_ProjectTaskInfo.m_ActualStart = "";
glo_ProjectTaskInfo.m_ActualEnd = "";
glo_EditorManager.setup_addTaskToEditor(glo_ProjectTaskInfo);
glo_ProjectTaskInfo.reset( );
glo_ProjectTaskInfo.m_bIsProjectTask = true;
glo_ProjectTaskInfo.m_sMemberLabel = "";
glo_ProjectTaskInfo.m_sTaskName = "Unit Test Plan";
glo_ProjectTaskInfo.m_sTaskID = "70";
glo_ProjectTaskInfo.m_SetDate = "2007-01-18";
glo_ProjectTaskInfo.m_PlanStart = "2007-01-18";
glo_ProjectTaskInfo.m_PlanEnd = "";
glo_ProjectTaskInfo.m_ActualStart = "";
glo_ProjectTaskInfo.m_ActualEnd = "";
glo_EditorManager.setup_addTaskToEditor(glo_ProjectTaskInfo);
glo_ProjectTaskInfo.reset( );
glo_ProjectTaskInfo.m_bIsProjectTask = true;
glo_ProjectTaskInfo.m_sMemberLabel = "";
glo_ProjectTaskInfo.m_sTaskName = "Implementation";
glo_ProjectTaskInfo.m_sTaskID = "80";
glo_ProjectTaskInfo.m_SetDate = "2007-01-18";
glo_ProjectTaskInfo.m_PlanStart = "2007-02-01";
glo_ProjectTaskInfo.m_PlanEnd = "2007-03-16";
glo_ProjectTaskInfo.m_ActualStart = "";
glo_ProjectTaskInfo.m_ActualEnd = "";
glo_EditorManager.setup_addTaskToEditor(glo_ProjectTaskInfo);
glo_ProjectTaskInfo.reset( );
</script>
<p align="center">
```

The task assignment editor (Appendices C and D) and member schedule editor (Appendices E and F) follows a similar format for its web page to generate the editor, as shown in Appendices A and B for the project schedule editor.

Appendix C shows an example code listing of a web page for the task assignment editor, according to an embodiment of the invention. The example code listing shows the JavaScript denoted by the <script> tag and the PHP script enclosed within <?php and ?> tag. The web page is stored in the server processor 604 (FIG. 6), such as web servers 507, 530 (FIG. 5). When the client processor 602 (FIG. 6), such as a web browser, accesses the web page, the PHP script is executed in the server processor 604 and the entire PHP script is replaced with JavaScript code that the PHP script generates. All the JavaScript code, including that generated by the PHP script, is passed to the client processor 602 for execution.

APPENDIX C

```
<!--
////////////////////////////////////////////////////////////////////////////////
//                    Copyright 2006 by Ricoh Corporation
//                           All Rights Reserved
//                        Confidential and Proprietary
////////////////////////////////////////////////////////////////////////////////
// File:          TaskAssignEditor.htm
//_____
// Description:   This file is the web page for the task assignment
//                editor.
// Author:
// History:
```

APPENDIX C-continued

```
////////////////////////////////////////////////////////////////////////////////////////////////////////-->
<html>
<head>
    <title>Task Assignment Editor</title>
</head>
<script>
const C_DEBUG = false;
</script>
<script src="TaskAssignmentJavaScriptProcessor/cTaskAssignmentEditorManager.js"></script>
<script src="TaskAssignmentJavaScriptProcessor/cTaskAssignmentTable.js"></script>
<script src="TaskAssignmentJavaScriptProcessor/cTaskAssignmentRow.js"></script>
<script src="TaskAssignmentJavaScriptProcessor/cTaskCell.js"></script>
<script src="TaskAssignmentJavaScriptProcessor/cAssignmentCell.js"></script>
<script src="../Common/JavaScriptCommon/debugUtility.js"></script>
<script src="../Common/JavaScriptCommon/editorUtility.js"></script>
<script src="../Common/JavaScriptCommon/javaScriptSystemConstants.js"></script>
<script>
///////////////////////////////////////////////////////////////////////////////////////////////////
// Global Function:    fglo_deleteTask( )
//-----------------------------------------------------------------------------------------------
// Description:        This function is the event handler for Delete button
//                     that will delete the selected task and its subtasks.
// Input:              None
// Output:             None
// Preconditions:      glo_EditorManager cannot be null.
// Postconditions:     None
// Security:           None
// Algorithm:
//                     1    if preconditions are not met, return.
//                     2    call glo_EditorManager.deleteSelectedTask( ).
///////////////////////////////////////////////////////////////////////////////////////////////////
    function fglo_deleteTask( ) {
        fglo_PrintDebug("fglo_deleteTask( )");
        if (glo_EditorManager == null) {
            return;
        }
        glo_EditorManager.deleteSelectedTask( );
    }
///////////////////////////////////////////////////////////////////////////////////////////////////
// Global Function:    fglo_addTasks( )
//-----------------------------------------------------------------------------------------------
// Description:        This function is the event handler for the AddXXX button.
//                     This function adds empty task rows to the editor for
//                     the member to add tasks to the schedule.
// Input:              None
// Output:             None
// Preconditions:      glo_EditorManager cannot be null.
// Postconditions:     None
// Security:           None
// Algorithm:
//                     1    if preconditions are not met, return.
//                     2    if this.name is empty, return
//                     3    call glo_EditorManager.addTasks(this.name).
///////////////////////////////////////////////////////////////////////////////////////////////////
    function fglo_addTasks( ) {
        fglo_PrintDebug("fglo_addTasks( )");
        if (glo_EditorManager == null) {
            return;
        }
        if (this.name.length == 0) {
            return;
        }
        glo_EditorManager.addTasks(this.name);
    }
///////////////////////////////////////////////////////////////////////////////////////////////////
// Global Function:    fglo_addDetailTasks( )
//-----------------------------------------------------------------------------------------------
// Description:        This function is the event handler for Add Details
//                     button which adds empty task rows to the editor
//                     corresponding to detailed tasks of the selected task.
// Input:              None
// Output:             None
// Preconditions:      glo_EditorManager cannot be null.
// Postconditions:     None
// Security:           None
// Algorithm:
//                     1    if preconditions are not met, return.
//                     2    call glo_EditorManager.addDetailTasks( ).
///////////////////////////////////////////////////////////////////////////////////////////////////
```

APPENDIX C-continued

```
function fglo_addDetailTasks( ) {
    fglo_PrintDebug("fglo_addDetailTasks( )");
    if (glo_EditorManager == null) {
        return;
    }
    glo_EditorManager.addDetailTasks( );
}
////////////////////////////////////////////////////////////////////////////////////////////////
// Global Function:    fglo_submitAssignment( )
//------------------------------------------------------------------------------
// Description:       This function is the onsubmit event handler when the
//                    Finish button is selected for posting the task assignment.
// Input:             None
// Output:            bool indiciating if the task assignment is valid.
// Preconditions:     glo_EditorManager cannot be null.
// Postconditions:    None
// Security:          None
// Algorithm:
//                    1  if preconditions are not met, return false.
//                    2  return glo_EditorManager.submitAssignment( ).
////////////////////////////////////////////////////////////////////////////////////////////////
function fglo_submitAssignment( ) {
    fglo_PrintDebug("fglo_submitAssignment( )");
    if (glo_EditorManager == null) {
        return false;
    }
    return glo_EditorManager.submitTaskAssignment( );
}
</script>
<body id="AssignmentBodyID">
    <p id="WorkingID" align="center"><font size="7">Working ....</font><br>
        <img border="0" src="working.gif" width="59" height="52"><br>
    </p>
<?php
include_once("TaskAssignmentPHPProcessor/cTaskAssignmentManager.php");
include_once("TaskAssignmentPHPProcessor/cTaskAssignmentInitialData.php");
include_once("TaskAssignmentPHPProcessor/cTaskAssignmentTaskRowData.php");
include_once("TaskAssignmentPHPProcessor/cTaskAssignmentEditorDBInterface.php");
include_once("TaskAssignmentPHPProcessor/cTaskAssignmentJavaScriptInterface.php");
include_once("TaskAssignmentPHPProcessor/taskAssignmentPHPProcessorConstants.php");
include_once("../Common/PHPCommon/debugUtility.php");
include_once("../Common/PHPCommon/phpSystemConstants.php");
include_once("../Common/PHPCommon/cScheduleDB.php");
////////////////////////////////////////////////////////////////////////////////////////////////
// Main
//------------------------------------------------------------------------------
// Description:       This function will create the object that will generate
//                    the initial display of the task assignment editor.
// Input:             None
// Output:            None
// Preconditions:     None
// Postconditions:    None
// Security:          None
// Algorithm:
//                    1  create and assign a CTaskAssignmentManager object
//                       to $glo_TaskAssignmentManager.
//                    2  call createTaskAssignmentEditor( ) of
//                       $glo_TaskAssignmentManager.
////////////////////////////////////////////////////////////////////////////////////////////////
    fglo_debugPrint("TaskAssignEditor.htm PHP Main");
    fglo_debugPrintVar("$_GET", $_GET);
    $glo_TaskAssignmentManager = new CTaskAssignmentManager( );
    $glo_TaskAssignmentManager->createTaskAssignmentEditor( );
?>
    <p align="center">
    <script type=text/javascript>
////////////////////////////////////////////////////////////////////////////////////////////////
// Main
//------------------------------------------------------------------------------
// Description:       This function removes the working display.
// Input:             None
// Output:            None
// Preconditions:     None
// Postconditions:    None
// Security:          None
// Algorithm:
//                    1  get the body element and assign it to a local
//                       element loc_BodyElement.
//                    2  get the paragraph element containing the working
//                       display and assign it to a local element
```

APPENDIX C-continued

```
//                      loc_ParagraphElement.
//                    3 call loc_BodyElement.removeChild( ) with
//                      loc_ParagraphElement passed in.
////////////////////////////////////////////////////////////////////////////////////////
        fglo_PrintDebug("TaskAssignEditor.htm JavaScript Main");
        var loc_BodyElement = document.getElementById("AssignmentBodyID");
        var loc_ParagraphElement = document.getElementById("WorkingID");
        loc_BodyElement.removeChild(loc_ParagraphElement);
     </script>
     </p>
</body>
</html>
```

Appendix D shows example JavaScript code generated by the PHP script of Appendix C, according to an embodiment of the invention. The JavaScript code replaces the PHP code in the web page. The JavaScript code includes task scheduling information obtained from the database. The task information is passed to JavaScript for processing. Also, JavaScript code is generated to create an object and to call the member function of the object to provide the initial display of the task assignment editor (for example, var glo_EditorManager=new CTaskAssignmentEditorManager( ), glo_EditorManager.setup_createEditor("J99"), and glo_EditorManager.setup_addTopLevelTaskToEditor("10", "Project Preparation").

APPENDIX D

```
<body id="AssignmentBodyID">
    <p id="WorkingID" align="center"><font size="7">Working ....</font><br>
       <img border="0" src="working.gif" width="59" height="52"><br>
    </p>
    <h2 align="center">J99 Task Assignment Editor</h2>
<script>
    var glo_TaskList = new Array( );
    var glo_TaskOptionList = new Array( );
    glo_TaskList.push("Class Specification");
    glo_TaskList.push("Implementation and Unit Test Plan");
    glo_TaskList.push("Iteration 1");
    glo_TaskList.push("Iteration 2");
    glo_TaskList.push("Iteration 3");
    glo_TaskList.push("Planning");
    glo_TaskList.push("Project Closing Documents");
    glo_TaskList.push("System Test");
    glo_TaskList.push("Post Documents");
    var glo_MemberList = new Array( );
    glo_MemberList.push("T1");
    glo_MemberList.push("MGR");
    var glo_EditorManager = new CTaskAssignmentEditorManager( );
    glo_EditorManager.setup_createEditor("J99");
    glo_EditorManager.setup_addTopLevelTaskToEditor("10", "Project Preparation");
    glo_EditorManager.setup_addLevelOneTaskToEditor("10", "Project Initiation", "MGR");
    glo_EditorManager.setup_addLevelOneTaskToEditor("10", "Project Plan", "MGR");
    glo_EditorManager.setup_addLevelOneTaskToEditor("10", "Resource Plan", "MGR");
    glo_EditorManager.setup_addTopLevelTaskToEditor("20", "Requirements");
    glo_EditorManager.setup_addLevelOneTaskToEditor("20", "Reqt Doc", "T1");
    glo_EditorManager.setup_addLevelOneTaskToEditor("20", "Reqt Matrix", "T1");
    glo_EditorManager.setup_addTopLevelTaskToEditor("30", "Document Guidelines");
    glo_EditorManager.setup_addLevelOneTaskToEditor("30", "Des Doc Guide", "MGR");
    glo_EditorManager.setup_addLevelOneTaskToEditor("30", "Code Conv", "T1");
    glo_EditorManager.setup_addLevelOneTaskToEditor("30", "Impl Plan Guide", "T1");
    glo_EditorManager.setup_addTopLevelTaskToEditor("40", "Top Level Design");
    glo_EditorManager.setup_addLevelOneTaskToEditor("40", "Database", "MGR");
    glo_EditorManager.setup_addLevelOneTaskToEditor("40", "Major Interfaces", "T1");
    glo_EditorManager.setup_addLevelOneTaskToEditor("40", "Major Packages", "T1");
    glo_EditorManager.setup_addTopLevelTaskToEditor("50", "Package Design");
    glo_EditorManager.setup_addLevelOneTaskToEditor("50", "Task Assignment", "");
```

APPENDIX D-continued

```
  glo_EditorManager.setup_addTopLevelTaskToEditor("60", "Class Design");
  glo_EditorManager.setup_addLevelOneTaskToEditor("60", "Task
Assignment", "MGR");
  glo_EditorManager.setup_addTopLevelTaskToEditor("70", "Unit Test
Plan");
  glo_EditorManager.setup_addLevelOneTaskToEditor("70", "MemberSchedule
Package", "");
  glo_EditorManager.setup_addLevelOneTaskToEditor("70", "ProjectSchedule
Package", "MGR");
  glo_EditorManager.setup_addTopLevelTaskToEditor("80",
"Implementation");
  glo_EditorManager.setup_addLevelOneTaskToEditor("80", "Project
Schedule", "");
  glo_EditorManager.setup_addLevelOneTaskToEditor("80", "Task
Assignment", "MGR");
  glo_EditorManager.setup_addLevelOneTaskToEditor("80", "Member
Schedule", "T1");
  glo_EditorManager.setup_addTopLevelTaskToEditor("90", "2nd Iteration");
</script>
```

Appendix E shows an example code listing of a web page for the member schedule editor, according to an embodiment of the invention. The example code listing shows the JavaScript denoted by the <script> tag and the PHP script enclosed within <?php and ?> tag. The web page is stored in the server processor 604 (FIG. 6), such as web servers 507, 530 (FIG. 5). When the client processor 602 (FIG. 6), such as a web browser, accesses the web page, the PHP script is executed in the server processor 604 and the entire PHP script is replaced with JavaScript code that the PHP script generates. All the JavaScript code, including that generated by the PHP script, is passed to the client processor 602 for execution.

APPENDIX E

```
<!--
///////////////////////////////////////////////////////////////////////////////
//                     Copyright 2006 by Ricoh Corporation
//                              All Rights Reserved
//                          Confidential and Proprietary
///////////////////////////////////////////////////////////////////////////////
// File:            MembScheduleEditor.htm
//_____
// Description:     This file is the web page for the member schedule
//                  editor.
// Author:
// History:
///////////////////////////////////////////////////////////////////////////////
<html>
<head>
   <title>Member Schedule Editor</title>
</head>
<script>
const C_DEBUG = false;
</script>
<script src="MemberScheduleJavaScriptProcessor/cEditorManager.js"></script>
<script src="MemberScheduleJavaScriptProcessor/cTableManager.js"></script>
<script src="MemberScheduleJavaScriptProcessor/cMemberScheduleTable.js"></script>
<script src="MemberScheduleJavaScriptProcessor/cMemberScheduleRow.js"></script>
<script src="MemberScheduleJavaScriptProcessor/cTaskCell.js"></script>
<script src="MemberScheduleJavaScriptProcessor/cDateCell.js"></script>
<script src="MemberScheduleJavaScriptProcessor/sMemberTaskInfo.js"></script>
<script src="MemberScheduleJavaScriptProcessor/cDetailTaskInfo.js"></script>
<script src="../Common/JavaScriptCommon/debugUtility.js"></script>
<script src="../Common/JavaScriptCommon/dateUtility.js"></script>
<script src="../Common/JavaScriptCommon/editorUtility.js"></script>
<script src="../Common/JavaScriptCommon/javaScriptSystemConstants.js"></script>
<script src="../Common/JavaScriptCommon/cDateSelector.js"></script>
<script src="../Common/JavaScriptCommon/calendarUtility.js"></script>
<script>
///////////////////////////////////////////////////////////////////////////////
// Global Function: fglo_deleteTask( )
//---------------------------------------------------------------------------
// Description:     This function is the event handler for Delete button
//                  that will delete the selected task and its subtasks.
// Input:           None
// Output:          None
// Preconditions:   glo_EditorManager cannot be null.
// Postconditions:  None
// Security:        None
// Algorithm:
```

```
//                  1    if preconditions are not met, return.
//                  2    call glo_EditorManager.deleteSelectedTask( ).
/////////////////////////////////////////////////////////////////////////////////////////////////////
function fglo_deleteTask( ) {
    fglo_PrintDebug("fglo_deleteTask( )");
    if (glo_EditorManager == null) {
        return;
    }
    glo_EditorManager.deleteSelectedTask( );
}
/////////////////////////////////////////////////////////////////////////////////////////////////////
// Global Function:   fglo_addTasks( )
//----------------------------------------------------------------------------------------------------
// Description:       This function is the event handler for the AddXXX button.
//                    This function adds empty task rows to the editor for
//                    the member to add tasks to the schedule.
// Input:             None
// Output:            None
// Preconditions:     glo_EditorManager cannot be null.
// Postconditions:    None
// Security:          None
// Algorithm:
//                    1    if preconditions are not met, return.
//                    2    if this.name is empty, return
//                    3    call glo_EditorManager.addTasks(this.name).
/////////////////////////////////////////////////////////////////////////////////////////////////////
function fglo_addTasks( ) {
    fglo_PrintDebug("fglo_addTasks( )");
    if (glo_EditorManager == null) {
        return;
    }
    if (this.name.length == 0) {
        return;
    }
    glo_EditorManager.addTasks(this.name);
}
/////////////////////////////////////////////////////////////////////////////////////////////////////
// Global Function:   fglo_addDetailTasks( )
//----------------------------------------------------------------------------------------------------
// Description:       This function is the event handler for Add Details
//                    button which adds empty task rows to the editor
//                    corresponding to detailed tasks of the selected task.
// Input:             None
// Output:            None
// Preconditions:     glo_EditorManager cannot be null.
// Postconditions:    None
// Security:          None
// Algorithm:
//                    1    if preconditions are not met, return.
//                    2    call glo_EditorManager.addDetailTasks( ).
/////////////////////////////////////////////////////////////////////////////////////////////////////
function fglo_addDetailTasks( ) {
    fglo_PrintDebug("fglo_addDetailTasks( )");
    if (glo_EditorManager == null) {
        return;
    }
    glo_EditorManager.addDetailTasks( );
}
/////////////////////////////////////////////////////////////////////////////////////////////////////
// Global Function:   fglo_updateTasks( )
//----------------------------------------------------------------------------------------------------
// Description:       This function is the event handler for Update button
//                    which updates all the task rows of the editor such
//                    that the schedules of the tasks are consolidated
//                    with the schedules of its subtasks.
// Input:             None
// Output:            None
// Preconditions:     glo_EditorManager cannot be null.
// Postconditions:    None
// Security:          None
// Algorithm:
//                    1    if preconditions are not met, return.
//                    2    call glo_EditorManager.updateTasks( ).
/////////////////////////////////////////////////////////////////////////////////////////////////////
function fglo_updateTasks( ) {
    fglo_PrintDebug("fglo_updateTasks( )");
    if (glo_EditorManager == null) {
        return;
```

APPENDIX E-continued

```
        }
        glo_EditorManager.updateTasks( );
}
///////////////////////////////////////////////////////////////////////////////////////////////////////////////////////////
// Global Function:    fglo_submitSchedule( )
//---------------------------------------------------------------------------------------------------------------
// Description:        This function is the onsubmit event handler when the
//                     Finish button is selected for posting the task schedule.
//                     This function updates and validates the schedule.
// Input:              None
// Output:             bool indiciating if the task schedule is valid and
//                     could be updated.
// Preconditions:      glo_EditorManager cannot be null.
// Postconditions:     None
// Security:           None
// Algorithm:
//                     1    if preconditions are not met, return false.
//                     2    return glo_EditorManager.submitSchedule( ).
///////////////////////////////////////////////////////////////////////////////////////////////////////////////////////////
function fglo_submitSchedule( ) {
    fglo_PrintDebug("fglo_submitSchedule( )");
    if (glo_EditorManager == null) {
        return false;
    }
    return glo_EditorManager.submitSchedule( );
}
</script>
<style type="text/css">
<!--
span.label {color:black;width:30;height:16;text-align:center;margin-
top:0;background:#ffF;font:bold 13px Arial}
span.c1 {cursor:hand;color:black;width:30;height:16;text-
align:center;margin-top:0;background:#ffF;font:bold 13px Arial}
span.c2 {cursor:hand;color:red;width:30;height:16;text-align:center;margin-
top:0;background:#ffF;font:bold 13px Arial}
span.c3 {cursor:hand;color:#b0b0b0;width:30;height:16;text-
align:center;margintop:0;background:#ffF;font:bold 12px Arial}
-->
</style>
<body id="MembSchedBodyID">
    <p id="WorkingID" align="center"><font size="7">Working ....</font><br>
        <img border="0" src="working.gif" width="59" height="52"><br>
    </p>
    <?php
include_once('MemberSchedulePHPProcessor/cMemberScheduleManager.php');
include_once("MemberSchedulePHPProcessor/cMemberScheduleInitialData.php");
include_once("MemberSchedulePHPProcessor/cMemberScheduleTaskRowData.php");
include_once("MemberSchedulePHPProcessor/cEditorDBInterface.php");
include_once("MemberSchedulePHPProcessor/cJavaScriptInterface.php");
include_once("MemberSchedulePHPProcessor/memberSchedulePHPProcessorConstants.php");
include_once("../Common/PHPCommon/debugUtility.php");
include_once("../Common/PHPCommon/phpSystemConstants.php");
include_once("../Common/PHPCommon/dateUtility.php");
include_once("../Common/PHPCommon/cScheduleDB.php");
///////////////////////////////////////////////////////////////////////////////////////////////////////////////////////////
// Main
//---------------------------------------------------------------------------------------------------------------
// Description:        This function will create the object that will generate
//                     the initial display of the member schedule editor.
// Input:              None
// Output:             None
// Preconditions:      None
// Postconditions:     None
// Security:           None
// Algorithm:
//                     1    create and assign a CMemberScheduleManager object
//                          to $glo_MemberScheduleManager.
//                     2    call createMemberScheduleEditor( ) of
//                          $glo_MemberScheduleManager.
///////////////////////////////////////////////////////////////////////////////////////////////////////////////////////////
    fglo_debugPrint("MembScheduleEditor.htm Main");
    fglo_debugPrintVar("$_GET", $_GET);
    $glo_MemberScheduleManager = new CMemberScheduleManager( );
    $glo_MemberScheduleManager->createMemberScheduleEditor( );
?>
    <p align="center">
        <script type=text/javascript>
///////////////////////////////////////////////////////////////////////////////////////////////////////////////////////////
// Main
//---------------------------------------------------------------------------------------------------------------
```

APPENDIX E-continued

```
// Description:    This function removes the working display and displays
//                 the calendar at the bottom of the web page.
// Input:          None
// Output:         None
// Preconditions:  None
// Postconditions: None
// Security:       None
// Algorithm:
//              1  get the body element and assign it to a local
//                    element loc_BodyElement.
//              2  get the paragraph element containing the working
//                    display and assign it to a local element
//                    loc_ParagraphElement.
//              3  call loc_BodyElement.removeChild( ) with
//                    loc_ParagraphElement passed in.
//              4  call writeCalendar( ).
////////////////////////////////////////////////////////////////////////////////
var loc_BodyElement = document.getElementById("MembSchedBodyID");
var loc_ParagraphElement = document.getElementById("WorkingID");
loc_BodyElement.removeChild(loc_ParagraphElement);
writeCalendar( );
        </script>
    </p>
</body>
</html>
```

Appendix F shows example JavaScript code generated by the PHP script of Appendix E, according to an embodiment of the invention. The JavaScript code replaces the PHP code in the web page. The JavaScript code includes task scheduling information obtained from the database. The task information is assigned to a data structure to pass the information to JavaScript for processing (for example, var glo_MemberTaskInfo=SMemberTaskInfo( ) and glo_MemberTaskInfo.xxx="value"). Also, JavaScript code is generated to create an object and to call the member function of the object to provide the initial display of the member schedule editor (for example, var glo_EditorManager=new CEditorManager( ), glo_EditorManager.setup_createEditor ("J99", "test1"), and glo_EditorManager.setup_addTaskToEditor(glo_MemberTaskInfo).

APPENDIX F

```
<body id="MembSchedBodyID">
    <p id="WorkingID" align="center"><font size="7">Working
....</font><br>
        <img border="0" src="working.gif" width="59"
height="52"><br>
    </p>
    <h2 align="center">test1's J99 Schedule</h2>
    <script>
        var glo_TaskOptionList = null;
        var glo_EditorManager = new CEditorManager( );
        glo_EditorManager.setup_createEditor("J99", "test1");
        var loc_MemberTaskNameList = new Array( );
        loc_MemberTaskNameList.push("Impl Plan Guide");
        glo_EditorManager.setup_addUnscheduledTasks(30, "Document
Guidelines", loc_MemberTaskNameList);
        loc_MemberTaskNameList.splice(0, 1);
        loc_MemberTaskNameList.push("Major Interfaces");
        glo_EditorManager.setup_addUnscheduledTasks(40, "Top Level
Design", loc_MemberTaskNameList);
        loc_MemberTaskNameList.splice(0, 1);
        loc_MemberTaskNameList.push("Member Schedule");
        glo_EditorManager.setup_addUnscheduledTasks(80,
"Implementation", loc_MemberTaskNameList);
        loc_MemberTaskNameList.splice(0, 1);
        var glo_MemberTaskInfo = new SMemberTaskInfo( );
        glo_MemberTaskInfo.m_nTaskLevel = 1;
        glo_MemberTaskInfo.m_nParentTaskID = 30;
        glo_MemberTaskInfo.m_nTaskID = 42;
        glo_MemberTaskInfo.m_sTaskName = "Code Conv";
        glo_MemberTaskInfo.m_SetDate = "2006-09-08";
```

APPENDIX F-continued

```
        glo_MemberTaskInfo.m_PlanStart = "2006-09-08";
        glo_MemberTaskInfo.m_PlanEnd = "2006-09-11";
        glo_MemberTaskInfo.m_ActualStart = "2006-09-08";
        glo_MemberTaskInfo.m_ActualEnd = "";
        glo_MemberTaskInfo.m_nRev = 1;
    glo_EditorManager.setup_addTaskToEditor(glo_MemberTaskInfo);
        glo_MemberTaskInfo.reset( );
        glo_MemberTaskInfo.m_nTaskLevel = 2;
        glo_MemberTaskInfo.m_nParentTaskID = 42;
        glo_MemberTaskInfo.m_nTaskID = 32;
        glo_MemberTaskInfo.m_sTaskName = "draft";
        glo_MemberTaskInfo.m_SetDate = "2006-09-08";
        glo_MemberTaskInfo.m_PlanStart = "2006-09-11";
        glo_MemberTaskInfo.m_PlanEnd = "2006-09-13";
        glo_MemberTaskInfo.m_ActualStart = "";
        glo_MemberTaskInfo.m_ActualEnd = "";
        glo_MemberTaskInfo.m_nRev = 1;
    glo_EditorManager.setup_addTaskToEditor(glo_MemberTaskInfo);
        glo_MemberTaskInfo.reset( );
        glo_MemberTaskInfo.m_nTaskLevel = 2;
        glo_MemberTaskInfo.m_nParentTaskID = 42;
        glo_MemberTaskInfo.m_nTaskID = 42;
        glo_MemberTaskInfo.m_sTaskName = "review/inspection";
        glo_MemberTaskInfo.m_SetDate = "2006-09-08";
        glo_MemberTaskInfo.m_PlanStart = "2006-09-14";
        glo_MemberTaskInfo.m_PlanEnd = "2006-09-15";
        glo_MemberTaskInfo.m_ActualStart = "";
        glo_MemberTaskInfo.m_ActualEnd = "";
        glo_MemberTaskInfo.m_nRev = 1;
    glo_EditorManager.setup_addTaskToEditor(glo_MemberTaskInfo);
        glo_MemberTaskInfo.reset( );
        glo_MemberTaskInfo.m_nTaskLevel = 1;
        glo_MemberTaskInfo.m_nParentTaskID = 40;
        glo_MemberTaskInfo.m_nTaskID = 62;
        glo_MemberTaskInfo.m_sTaskName = "Major Packages";
        glo_MemberTaskInfo.m_SetDate = "2006-09-08";
        glo_MemberTaskInfo.m_PlanStart = "2006-09-08";
        glo_MemberTaskInfo.m_PlanEnd = "2006-09-11";
        glo_MemberTaskInfo.m_ActualStart = "2006-09-07";
        glo_MemberTaskInfo.m_ActualEnd = "";
        glo_MemberTaskInfo.m_nRev = 2;
    glo_EditorManager.setup_addTaskToEditor(glo_MemberTaskInfo);
        glo_MemberTaskInfo.reset( );
        glo_MemberTaskInfo.m_nTaskLevel = 2;
        glo_MemberTaskInfo.m_nParentTaskID = 62;
        glo_MemberTaskInfo.m_nTaskID = 92;
        glo_MemberTaskInfo.m_sTaskName = "Component";
        glo_MemberTaskInfo.m_SetDate = "2006-09-08";
        glo_MemberTaskInfo.m_PlanStart = "2006-09-08";
```

APPENDIX F-continued

```
        glo_MemberTaskInfo.m_PlanEnd = "2006-09-11";
        glo_MemberTaskInfo.m_ActualStart = "2006-09-07";
        glo_MemberTaskInfo.m_ActualEnd = "";
        glo_MemberTaskInfo.m_nRev = 2;
    glo_EditorManager.setup_addTaskToEditor(glo_MemberTaskInfo);
        glo_MemberTaskInfo.reset( );
        glo_MemberTaskInfo.m_nTaskLevel = 3;
        glo_MemberTaskInfo.m_nParentTaskID = 92;
        glo_MemberTaskInfo.m_nTaskID = 12;
        glo_MemberTaskInfo.m_sTaskName = "Interfaces";
        glo_MemberTaskInfo.m_SetDate = "2006-09-08";
        glo_MemberTaskInfo.m_PlanStart = "2006-09-08";
        glo_MemberTaskInfo.m_PlanEnd = "2006-09-11";
        glo_MemberTaskInfo.m_ActualStart = "2006-09-07";
        glo_MemberTaskInfo.m_ActualEnd = "";
        glo_MemberTaskInfo.m_nRev = 2;
    glo_EditorManager.setup_addTaskToEditor(glo_MemberTaskInfo);
        glo_MemberTaskInfo.reset( );
        glo_MemberTaskInfo.m_nTaskLevel = 4;
        glo_MemberTaskInfo.m_nParentTaskID = 12;
        glo_MemberTaskInfo.m_nTaskID = 12;
        glo_MemberTaskInfo.m_sTaskName = "Structures";
        glo_MemberTaskInfo.m_SetDate = "2006-09-07";
        glo_MemberTaskInfo.m_PlanStart = "2006-09-08";
        glo_MemberTaskInfo.m_PlanEnd = "2006-09-10";
        glo_MemberTaskInfo.m_ActualStart = "2006-09-08";
        glo_MemberTaskInfo.m_ActualEnd = "";
        glo_MemberTaskInfo.m_nRev = 1;
    glo_EditorManager.setup_addTaskToEditor(glo_MemberTaskInfo);
        glo_MemberTaskInfo.reset( );
        glo_MemberTaskInfo.m_nTaskLevel = 4;
        glo_MemberTaskInfo.m_nParentTaskID = 12;
        glo_MemberTaskInfo.m_nTaskID = 22;
        glo_MemberTaskInfo.m_sTaskName = "Drawings";
        glo_MemberTaskInfo.m_SetDate = "2006-09-08";
        glo_MemberTaskInfo.m_PlanStart = "2006-09-08";
        glo_MemberTaskInfo.m_PlanEnd = "2006-09-11";
        glo_MemberTaskInfo.m_ActualStart = "2006-09-07";
        glo_MemberTaskInfo.m_ActualEnd = "";
        glo_MemberTaskInfo.m_nRev = 1;
    glo_EditorManager.setup_addTaskToEditor(glo_MemberTaskInfo);
        glo_MemberTaskInfo.reset( );
        glo_MemberTaskInfo.m_nTaskLevel = 1;
        glo_MemberTaskInfo.m_nParentTaskID = 20;
        glo_MemberTaskInfo.m_nTaskID = 32;
        glo_MemberTaskInfo.m_sTaskName = "Reqt Matrix";
        glo_MemberTaskInfo.m_SetDate = "2006-09-11";
        glo_MemberTaskInfo.m_PlanStart = "2006-09-11";
        glo_MemberTaskInfo.m_PlanEnd = "2006-09-15";
        glo_MemberTaskInfo.m_ActualStart = "2006-09-11";
        glo_MemberTaskInfo.m_ActualEnd = "2006-09-15";
        glo_MemberTaskInfo.m_nRev = 3;
    glo_EditorManager.setup_addTaskToEditor(glo_MemberTaskInfo);
        glo_MemberTaskInfo.reset( );
</script>
```

Hardware Overview

FIG. 35 is a block diagram that illustrates a computer system 3500 upon which embodiments of the invention can be implemented. Computer system 3500 additionally illustrates a non-limiting example of a system configuration of the workstation 102 (FIG. 1) and the web server 104 (FIG. 1). Computer system 3500 includes a bus 3502 or other communication mechanism for communicating information, and a processor 3504 coupled with bus 3502 for processing information. Computer system 3500 also includes a main memory 3506, such as a random access memory (RAM) or other dynamic storage device, coupled to bus 3502 for storing information and instructions to be executed by processor 3504. Main memory 3506 also may be used for storing temporary variables or other intermediate information during execution of instructions to be executed by processor 3504. Computer system 3500 further includes a read only memory (ROM) 3508 or other static storage device coupled to bus 3502 for storing static information and instructions for processor 3504. A storage device 3510, such as a magnetic disk, optical disk, or magneto-optical disk, is provided and coupled to bus 3502 for storing information and instructions.

Computer system 3500 may be coupled via bus 3502 to a display 3512, such as a cathode ray tube (CRT) or a liquid crystal display (LCD), for displaying information to a computer user. An input device 3514, including alphanumeric and other keys, is coupled to bus 3502 for communicating information and command selections to processor 3504. Another type of user input device is cursor control 3516, such as a mouse, a trackball, or cursor direction keys for communicating direction information and command selections to processor 3504 and for controlling cursor movement on display 3512. This input device typically has two degrees of freedom in two axes, a first axis (e.g., x) and a second axis (e.g., y), that allows the device to specify positions in a plane.

Embodiments of the invention are related to the use of computer system 3500 for implementing the techniques described herein. According to one embodiment of the invention, those techniques are performed by computer system 3500 in response to processor 3504 executing one or more sequences of one or more instructions contained in main memory 3506. Such instructions may be read into main memory 3506 from another computer-readable medium, such as storage device 3510. Execution of the sequences of instructions contained in main memory 3506 causes processor 3504 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 3504 for execution. Such a medium may take many forms, including but not limited to, non-volatile media, volatile media, and transmission media. Examples of non-volatile media include, without limitation, optical, magnetic disks, or magneto-optical disks, such as storage device 3510. Volatile media includes dynamic memory, such as main memory 3506. Transmission media includes coaxial cables, copper wire and fiber optics, including the wires that comprise bus 3502. Transmission media can also take the form of acoustic or light waves, such as those generated during radio-wave and infra-red data communications.

Common forms of computer-readable media include, without limitation, a floppy disk, a flexible disk, hard disk, magnetic tape, any other magnetic medium; a CD-ROM, DVD, any other optical or magneto-optical medium; punch-cards, papertape, any other physical medium with patterns of holes; a RAM, a PROM, an EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 3504 for execution. For example, the instructions may initially be carried on a magnetic disk of a remote computer. The remote computer can load the instructions into its dynamic memory and send the instructions over a telephone line using a modem. A modem local to computer system 3500 can receive the data on the telephone line and use an infra-red transmitter to convert the data to an infra-red signal. An infra-red detector can receive the data carried in the infra-red signal and appropriate circuitry can place the data on bus 3502. Bus 3502 carries the data to main memory 3506, from which processor 3504 retrieves and executes the instructions. The instructions received by main memory 3506 may optionally be stored on storage device 3510 either before or after execution by processor 3504.

Computer system 3500 also includes a communication interface 3518 coupled to bus 3502. Communication interface 3518 provides a two-way data communication coupling to a network link 3520 that is connected to a local network 3522. For example, communication interface 3518 may be an integrated services digital network (ISDN) card or a modem to provide a data communication connection to a corresponding type of telephone line. As another example, communication interface 3518 may be a local area network (LAN) card to provide a data communication connection to a compatible LAN. Wireless links may also be implemented. In any such implementation, communication interface 3518 sends and receives electrical, electromagnetic or optical signals that carry digital data streams representing various types of information.

Network link 3520 typically provides data communication through one or more networks to other data devices. For example, network link 3520 may provide a connection through local network 3522 to a host computer 3524 or to data equipment operated by an Internet Service Provider (ISP) 3526. ISP 3526 in turn provides data communication services through the world wide packet data communication network now commonly referred to as the "Internet" 3528. Local network 3522 and Internet 3528 both use electrical, electromagnetic or optical signals that carry digital data streams. The signals through the various networks and the signals on network link 3520 and through communication interface 3518, which carry the digital data to and from computer system 3500, are exemplary forms of carrier waves transporting the information.

Computer system 3500 can send messages and receive data, including program code, through the network(s), network link 3520 and communication interface 3518. In the Internet example, a server 3530 might transmit a requested code for an application program through Internet 3528, ISP 3526, local network 3522 and communication interface 3518.

The received code may be executed by processor 3504 as it is received, and/or stored in storage device 3510, or other non-volatile storage for later execution. In this manner, computer system 3500 may obtain application code in the form of a carrier wave.

EXTENSIONS AND ALTERNATIVES

Alternative embodiments of the invention are described throughout the foregoing description, and in locations that best facilitate understanding the context of the embodiments. Furthermore, the invention has been described with reference to specific embodiments thereof. It will, however, be evident that various modifications and changes may be made thereto without departing from the broader scope of embodiments of the invention. Therefore, the specification and drawings are, accordingly, to be regarded in an illustrative rather than a restrictive sense.

In addition, in this description certain process steps are set forth in a particular order, and alphabetic and alphanumeric labels may be used to identify certain steps. Unless specifically stated in the description, embodiments of the invention are not necessarily limited to any particular order of carrying out such steps. In particular, the labels are used merely for convenient identification of steps, and are not intended to specify or require a particular order of carrying out such steps.

What is claimed is:

1. A computer-implemented method for managing a project schedule with a Web-based client-server based project schedule system, the method comprising:
   receiving, from a client, a request to access a particular editor that is one of a task assignment editor, a project schedule editor and a member schedule editor, wherein the request includes project identification data that indicates a particular project and member identification data that corresponds to a particular member and wherein:
      the task assignment editor is accessible only by project managers and allows project tasks to be defined and assigned to project members,
      the project schedule editor is accessible only by project managers and allows schedule data to be defined and updated for defined project tasks,
      the member schedule editor is accessible by project members to which one or more project tasks have been assigned, allows the particular member to edit schedule data for one or more uncompleted project tasks assigned to at least the particular member and
      the client-server based project schedule system supports at least the task assignment editor, the project schedule editor and the member schedule editor;
   a server verifying the member identification data with respect to the project identification data and the particular editor specified in the request to determine whether the particular member that corresponds to the member identification data is authorized to access the particular project using the particular editor specified in the request; and
   in response to determining that the particular member that corresponds to the member identification data is authorized to access the particular project using the particular editor specified in the request, then
      the server accessing first schedule-related information from a database,
      the server generating first client-executable code for execution by the client for displaying the particular editor and displaying the first schedule-related information in the particular editor and for managing the particular editor by the client,
      the server passing the first client-executable code and the first schedule-related information to the client, and
      the client executing at least a portion of the first client-executable code to display the particular editor and display the first schedule-related information in the particular editor and to manage the editor.

2. The method of claim 1, further comprising:
   the client receiving second schedule-related information from a user via the editor;
   the client executing at least a portion of the client-executable code to maintain the second schedule-related information in the particular editor;
   the client passing the second schedule-related information from the particular editor to the server; and
   the server storing the second schedule-related information in the database.

3. The method of claim 2, further comprising:
   in response to the client requesting a web page associated with the particular editor, the server accessing at least the second schedule-related information from the database; and
   the server generating second client-executable code for execution by the client for displaying the web page associated with the particular editor and displaying the second schedule-related information in the web page associated with the particular editor;

the server passing the second client-executable code and the second schedule-related information to the client;

the client executing the second client-executable code to display the web page associated with the particular editor and displaying the second schedule-related information in the web page associated with the particular editor.

4. The method of claim 3, wherein one or more of the steps are performed in association with one or more of the task assignment editor, the project schedule editor and the member schedule editor.

5. The method of claim 3, wherein the server accessing the first schedule-related information and generating the first client-executable code are performed by a first module associated with the server of the project schedule system;

wherein the client displaying the editor and the first schedule-related information in the particular editor and managing the particular editor and maintaining the second schedule-related information in the particular editor are performed by a second module associated with the client of the project schedule system;

wherein the server storing the second schedule-related information in the database is performed by a third module associated with the server of the project schedule system; and wherein the server accessing at least the second schedule-related information and generating the second client-executable code are performed by a fourth module associated with the server of the project schedule system.

6. The method of claim 5, wherein one or more of the task assignment editor, the project schedule editor and the member schedule editor comprise the first module, the second module, the third module and the fourth module.

7. The method of claim 1, wherein the step of accessing comprises the server executing Hypertext Preprocessor (PHP) code to access the first schedule-related information from the database and the step of generating comprises the server executing PHP code to generate the first client-executable code as JavaScript code.

8. The method of claim 1, wherein the project schedule editor is configured to generate a project schedule Web page which, when processed at the client, displays a change in one or more dates for a project task by displaying changed dates using strikethrough.

9. The method of claim 1, wherein the step of generating comprises the server executing Hypertext Preprocessor (PHP) code to generate the first client-executable code as JavaScript code and to generate structures in the JavaScript code for storing and passing the first schedule-related information to the client.

10. The method of claim 1, wherein the step of generating comprises the server generating the first client-executable code as JavaScript code for instantiating an object of a JavaScript class that creates, manages, and maintains the particular editor.

11. The method of claim 10, wherein the step of generating comprises the server generating the first client-executable code as JavaScript code for calling member functions of the object to display the first schedule-related information in the particular editor.

12. A system comprising:

one or more processors; and one or more memories communicatively coupled to the one or more processors and storing instructions which, when processed by the one or more processors, causes:

receiving, from a client, a request to access a particular editor that is one of a task assignment editor, a project schedule editor and a member schedule editor, wherein the request includes project identification data that indicates a particular project and member identification data that corresponds to a particular member and wherein:

the task assignment editor is accessible only by project managers and allows project tasks to be defined and assigned to project members, the project schedule editor is accessible only by project managers and allows schedule data to be defined and updated for defined project tasks, the member schedule editor is accessible by project members to which one or more project tasks have been assigned, allows the particular member to edit schedule data for one or more uncompleted project tasks assigned to at least the particular member and the client-server based project schedule system supports at least the task assignment editor, the project schedule editor and the member schedule editor;

a server verifying the member identification data with respect to the project identification data and the particular editor specified in the request to determine whether the particular member that corresponds to the member identification data is authorized to access the particular project using the particular editor specified in the request; and in response to determining that the particular member that corresponds to the member identification data is authorized to access the particular project using the particular editor specified in the request, then the server accessing first schedule-related information from a database, the server generating first client-executable code for execution by the client for displaying the particular editor and displaying the first schedule-related information in the particular editor and for managing the particular editor by the client, the server passing the first client-executable code and the first schedule-related information to the client, and the client executing at least a portion of the first client-executable code to display the particular editor and display the first schedule-related information in the particular editor and to manage the editor.

13. The system of claim 12, wherein one or more of the steps are performed in association with one or more of the task assignment editor, the project schedule editor and the member schedule editor.

14. A non-transitory computer-readable medium for managing a project schedule with a Web-based client-server based project schedule system, the computer-readable medium storing instructions which, when processed by one or more processors, causes:

receiving, from a client, a request to access a particular editor that is one of a task assignment editor, a project schedule editor and a member schedule editor, wherein the request includes project identification data that indicates a particular project and member identification data that corresponds to a particular member and wherein:

the task assignment editor is accessible only by project managers and allows project tasks to be defined and assigned to project members, the project schedule editor is accessible only by project managers and allows schedule data to be defined and updated for defined project tasks, the member schedule editor is accessible by project members to which one or more project tasks have been assigned, allows the particular member to edit schedule data for one or more uncompleted project tasks assigned to at least the particular member and the client-server based project schedule system supports at least the task assignment editor, the project schedule editor and the member schedule editor;

a server verifying the member identification data with respect to the project identification data and the particular editor specified in the request to determine whether the particular member that corresponds to the member identification data is authorized to access the particular project using the particular editor specified in the request; and in response to determining that the particular member that corresponds to the member identification data is authorized to access the particular project using the particular editor specified in the request, then the server accessing first schedule-related information from a database, the server generating first client-executable code for execution by the client for displaying the particular editor and displaying the first schedule-related information in the particular editor and for managing the particular editor by the client, the server passing the first client-executable code and the first schedule-related information to the client, and the client executing at least a portion of the first client-executable code to display the particular editor and display the first schedule-related information in the particular editor and to manage the editor.

15. The non-transitory computer-readable medium of claim 14, further comprising additional instructions which, when processed by one or more processors, causes:

the client receiving second schedule-related information from a user via the editor;

the client executing at least a portion of the client-executable code to maintain the second schedule-related information in the particular editor;

the client passing the second schedule-related information from the particular editor to the server; and the server storing the second schedule-related information in the database.

16. The non-transitory computer-readable medium of claim 15, further comprising additional instructions which, when processed by one or more processors, causes:

in response to the client requesting a web page associated with the particular editor, the server accessing at least the second schedule-related information from the database; and the server generating second client-executable code for execution by the client for displaying the web page associated with the particular editor and displaying the second schedule-related information in the web page associated with the particular editor;

the server passing the second client-executable code and the second schedule-related information to the client;

the client executing the second client-executable code to display the web page associated with the particular editor and displaying the second schedule-related information in the web page associated with the particular editor.

17. The non-transitory computer-readable medium of claim 16, wherein one or more of the steps are performed in association with one or more of the task assignment editor, the project schedule editor and the member schedule editor.

18. The non-transitory computer-readable medium of claim 16, wherein the server accessing the first schedule-related information and generating the first client-executable code are performed by a first module associated with the server of the project schedule system;

wherein the client displaying the editor and the first schedule-related information in the particular editor and managing the particular editor and maintaining the second schedule-related information in the particular editor are performed by a second module associated with the client of the project schedule system;

wherein the server storing the second schedule-related information in the database is performed by a third module associated with the server of the project schedule system; and wherein the server accessing at least the second schedule-related information and generating the second client-executable code are performed by a fourth module associated with the server of the project schedule system.

19. The non-transitory computer-readable medium of claim 18, wherein one or more of the task assignment editor, the project schedule editor and the member schedule editor comprise the first module, the second module, the third module and the fourth module.

20. The non-transitory computer-readable medium of claim 14, wherein the step of accessing comprises the server executing Hypertext Preprocessor (PHP) code to access the first schedule-related information from the database and the step of generating comprises the server executing PHP code to generate the first client-executable code as JavaScript code.

21. The non-transitory computer-readable medium of claim 14, wherein the project schedule editor is configured to generate a project schedule Web page which, when processed at the client, displays a change in one or more dates for a project task by displaying changed dates using strikethrough.

22. The non-transitory computer-readable medium of claim 14, wherein the step of generating comprises the server executing Hypertext Preprocessor (PHP) code to generate the first client-executable code as JavaScript code and to generate structures in the JavaScript code for storing and passing the first schedule-related information to the client.

23. The non-transitory computer-readable medium of claim 14, wherein the step of generating comprises the server generating the first client-executable code as JavaScript code for instantiating an object of a JavaScript class that creates, manages, and maintains the particular editor.

24. The non-transitory computer-readable medium of claim 23, wherein the step of generating comprises the server generating the first client-executable code as JavaScript code for calling member functions of the object to display the first schedule-related information in the particular editor.

* * * * *